United States Patent
Watanabe et al.

(10) Patent No.: US 7,277,372 B2
(45) Date of Patent: Oct. 2, 2007

(54) METHOD AND APPARATUS FOR RECOGNIZING OPTICAL DISCS, OPTICAL DISC DRIVE, AND METHOD AND APPARATUS FOR DISTINGUISHING DATA STORAGE LAYER

(75) Inventors: Katsuya Watanabe, Nara (JP); Takashi Kishimoto, Nara (JP); Rie Takahashi, Osaka (JP); Masayoshi Shioya, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 490 days.

(21) Appl. No.: 10/805,965

(22) Filed: Mar. 22, 2004

(65) Prior Publication Data

US 2004/0190417 A1   Sep. 30, 2004

(30) Foreign Application Priority Data

Mar. 25, 2003  (JP)  ............................. 2003-082401

(51) Int. Cl.
*G11B 7/00* (2006.01)

(52) U.S. Cl. ............. 369/53.2; 369/44.27; 369/112.01; 369/94

(58) Field of Classification Search ...................... None
See application file for complete search history.

(56) References Cited

U.S. PATENT DOCUMENTS

| | | | |
|---|---|---|---|
| 5,202,875 A * | 4/1993 | Rosen et al. ................... 369/94 |
| 5,235,581 A | 8/1993 | Miyagawa et al. | |
| 5,446,565 A | 8/1995 | Komma et al. | |
| 5,587,981 A | 12/1996 | Kamatani | |
| 5,671,203 A * | 9/1997 | Ra ........................... 369/53.23 |
| 5,903,531 A * | 5/1999 | Satoh et al. ............. 369/53.23 |
| 6,011,762 A | 1/2000 | Watanabe et al. | |
| 6,016,301 A * | 1/2000 | Takasawa et al. .......... 369/53.2 |
| 6,026,065 A | 2/2000 | Kim et al. | |
| 6,111,832 A * | 8/2000 | Tsuchiya et al. ......... 369/53.23 |

(Continued)

FOREIGN PATENT DOCUMENTS

EP    0 731 457 A2    9/1996

(Continued)

OTHER PUBLICATIONS

Katayama et al., "Blue NAO.85/DVD/CD Compatible Optical Head"; Optical memory and Optical Data Storage Topical Meeting, International Symposium, Piscataway, NJ pp. 168-170 (2002).

(Continued)

*Primary Examiner*—Thang V. Tran
(74) *Attorney, Agent, or Firm*—Akin Gump Strauss Hauer & Feld LLP

(57) ABSTRACT

A method for recognizing at least two types of optical discs, which are associated with multiple different numerical apertures, includes the step of setting the numerical aperture of a focusing mechanism equal to a first one of the multiple different numerical apertures. The focusing mechanism is used to focus a light beam on a data storage layer of a given optical disc. The first numerical aperture is smaller than any of the other numerical apertures. The method further includes the step of recognizing the type of the given optical disc by the first numerical aperture that has been selected in the step of setting the numerical aperture.

15 Claims, 46 Drawing Sheets

U.S. PATENT DOCUMENTS

| | | |
|---|---|---|
| 6,229,778 B1 | 5/2001 | Ikegame et al. |
| 6,285,635 B1 | 9/2001 | Watanabe et al. |
| 6,424,605 B1 * | 7/2002 | Iida ..................... 369/53.23 |
| 6,449,235 B1 * | 9/2002 | Kim et al. ................ 369/94 |
| 6,469,965 B1 | 10/2002 | Horita |
| 6,501,712 B1 | 12/2002 | Masuda et al. |
| 6,700,846 B2 | 3/2004 | Furuichi et al. |
| 6,735,157 B2 * | 5/2004 | Hirai et al. ............. 369/53.19 |
| 6,829,203 B2 * | 12/2004 | Yonezawa et al. ....... 369/44.27 |
| 6,934,226 B2 * | 8/2005 | Yasuda et al. ............ 369/53.2 |
| 2002/0154582 A1 | 10/2002 | Yonezawa et al. |
| 2003/0095487 A1 * | 5/2003 | Nishizawa et al. ...... 369/53.23 |
| 2004/0105358 A1 | 6/2004 | Watanabe et al. |

FOREIGN PATENT DOCUMENTS

| | | |
|---|---|---|
| EP | 1 253 587 A2 | 10/2002 |
| JP | 04-372734 A | 12/1992 |
| JP | 11-306650 | 11/1999 |

OTHER PUBLICATIONS

R. Katayama, "Blue/DVD/CD Compatible Optical Head", Microopics News, vol. 20, No. 3, pp. 19-23.

* cited by examiner

Light Beam

*FIG.21A*     *FIG.21B*
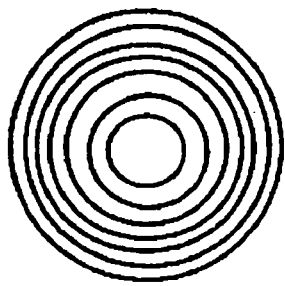 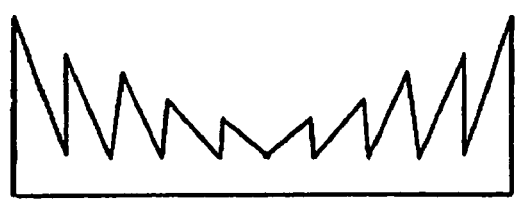
*FIG.22A*     *FIG.22B*
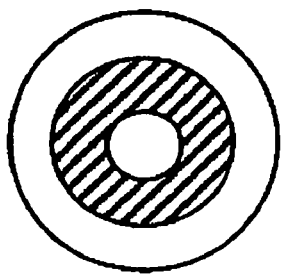 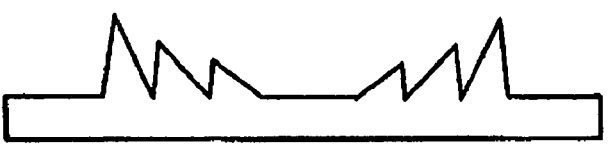
*FIG.23*
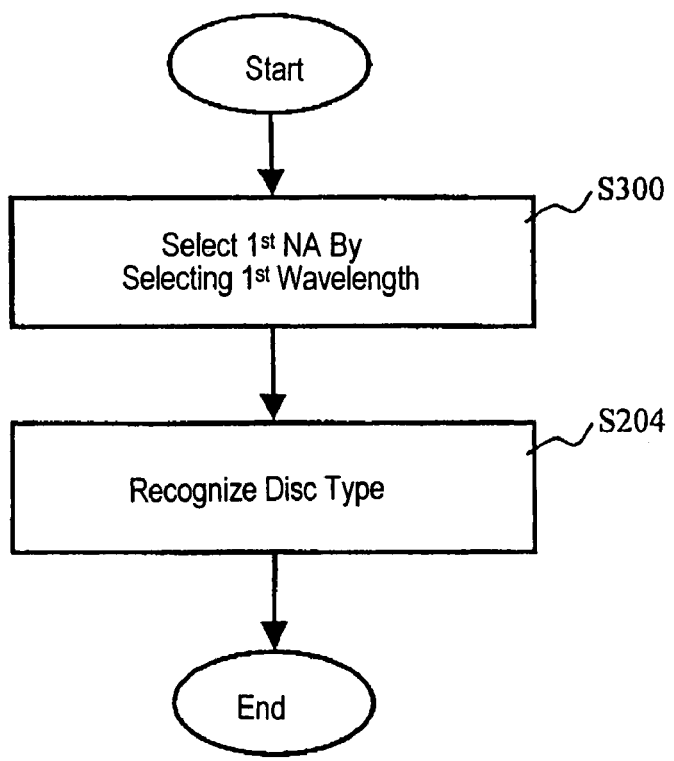

METHOD AND APPARATUS FOR RECOGNIZING OPTICAL DISCS, OPTICAL DISC DRIVE, AND METHOD AND APPARATUS FOR DISTINGUISHING DATA STORAGE LAYER

BACKGROUND OF THE INVENTION

1. Field of the Invention

The present invention relates to a method for recognizing at least two types of optical discs that are associated with mutually different numerical apertures (NAs), an apparatus for recognizing the type of a given optical disc by controlling an optical disc drive, an optical disc drive for accessing at least two types of optical discs or data storage layers that are associated with respectively different NAs, a method for distinguishing at least two types of data storage layers that are associated with mutually different NAs, and an apparatus for distinguishing a given data storage layer by controlling an optical disc drive.

2. Description of the Related Art

Various types of optical discs, including music CDs, CD-ROMs, CD-Rs, CD-RWs, DVD-ROMs, DVD-RAMs, DVD-RWs, DVD-Rs, DVD+RWs and DVD+Rs, are now available anywhere. Optical discs to be accessed with an optical lens having a numerical aperture (NA) of 0.8 or more are also researched and developed. These types of optical discs are supposed to be accessed using objective lenses (or optical lenses) with mutually different NAs, laser diodes with mutually different wavelengths and/or respectively different spherical aberration correction values.

A conventional optical disc drive for reading and/or writing information from/on multiple types of optical discs includes a plurality of light sources to emit radiations at mutually different wavelengths. On being loaded with an optical disc of an unknown type, the optical disc drive gets a light beam emitted from one of those light sources at a certain wavelength. The optical disc drive recognizes the type of the given optical disc. If the optical disc drive does not find that wavelength matching the type of the given optical disc, then the optical disc drive gets a light beam emitted from one of the other light sources after another until the wavelength finally matches the given optical disc. In this case, the wavelengths of those light sources may be switched in the descending order (i.e., the longest wavelength first). Such an optical disc drive is disclosed in Japanese Laid-Open Publication No. 11-176073 (see claims 1 and 5), for example.

In performing a focus control operation, another conventional optical disc drive may bring an objective lens toward, or away from, a given optical disc, and may turn a focus servo loop ON when the resultant focus error (FE) signal exceeds a certain threshold value. Also, the optical disc drive performs the focus control operation according to the thickness t1 of the given optical disc. The optical disc drive detects a read signal by performing a tracking control operation, and performs the focus control operation according to the thickness t2 (t2<t1) of the substrate if the amplitude of the read signal is less than a predetermined value. Such an optical disc drive is disclosed in Japanese Laid-Open Publication No. 7-98431 (see FIGS. 26 and 46 and paragraphs [0072], [0073] and [0116]).

Still another conventional optical disc drive includes a number N (where N≧2) of focusing optical systems for the same number of optical discs with mutually different substrate thicknesses. The optical disc drive recognizes the difference in thickness between the disc substrates by laser beams reflected from those discs. Such an optical disc drive is disclosed in Japanese Laid-Open Publication No. 4-95224 (see claim 1, page 7 lower left column, lines 7-14).

Yet another conventional optical disc drive includes a plurality of compensators for compensating for the characteristics of optical systems and a detector for detecting the physical properties of discs to be read from or written to. Such an optical disc drive is disclosed in Japanese Laid-Open Publication No. 4-372734 (see claim 1, FIG. 1, and paragraph [0014]).

Yet another conventional optical disc drive reads data from the lead-in area of a given optical disc, thereby counting the number of data storage layers included and reading pit arrangements. Such an optical disc drive is disclosed in U.S. Pat. No. 5,587,981 (claim 1 and FIG. 2).

Yet another conventional optical disc drive focuses a light beam onto a given optical disc by using a selected one of multiple lenses that are secured to a movable member. Such an optical disc drive is disclosed in Japanese Laid-Open Publication No. 8-138261 (see claim 1 and FIG. 2).

Yet another optical disc drive corrects the spherical aberration by changing the magnification power of an objective lens, uses three wavelengths, and controls the NA with a wavelength-selective aperture. Such an optical disc drive is disclosed in Ryuichi Katayama, "Blue/DVD/CD Compatible Optical Head", Oyo Butsuri, a monthly publication of the Japan Society of Applied Physics, August 2002, pp. 19-23.

In any of these conventional optical disc drives, however, if multiple types of optical discs or data storage layers need to be accessed with the numerical apertures of a focusing mechanism switched, those optical discs or data storage layers are not recognized or distinguished with the minimum numerical aperture selected. Thus, in the type recognizing or distinguishing process, the focusing mechanism is likely to collide against the given optical disc.

SUMMARY OF THE INVENTION

In order to overcome the problems described above, an object of the present invention is to provide an optical disc drive, which can minimize the collision between the focusing mechanism and the optical disc.

An optical disc recognizing method according to a preferred embodiment of the present invention is a method for recognizing at least two types of optical discs, which are associated with multiple different numerical apertures. The method preferably includes the step of setting the numerical aperture of focusing means equal to a first one of the multiple different numerical apertures. The focusing means is preferably used to focus a light beam on a data storage layer of a given optical disc. The first numerical aperture is preferably smaller than any of the other numerical apertures. The method preferably further includes the step of recognizing the type of the given optical disc by the first numerical aperture that has been selected in the step of setting the numerical aperture.

An optical disc recognizing apparatus according to a preferred embodiment of the present invention is an apparatus for recognizing the type of a given optical disc by controlling an optical disc drive, which accesses at least two types of optical discs associated with multiple different numerical apertures. The apparatus preferably includes setting changing means for setting the numerical aperture of focusing means equal to a first one of the multiple different numerical apertures. The focusing means is preferably used to focus a light beam on a data storage layer of the given optical disc. The first numerical aperture is preferably smaller than any of the other numerical apertures. The apparatus preferably further includes recognizing means for recognizing the type of the given optical disc, loaded in the optical disc drive, by the first numerical aperture that has been selected by the setting changing means.

An optical disc drive according to a preferred embodiment of the present invention preferably accesses at least two types of optical discs, which are associated with multiple different numerical apertures. The optical disc drive preferably includes: focusing means for focusing a light beam on a data storage layer of a given optical disc at a changeable numerical aperture; detecting means for detecting light that has been reflected from the given optical disc, on which the light beam was focused by the focusing means; setting means for setting the numerical aperture of the focusing means equal to a first one of the multiple different numerical apertures, the first numerical aperture being smaller than any of the other numerical apertures; and recognizing means for recognizing the type of the given optical disc by a signal representing a reflected and detected portion of the light from the optical disc on which the light beam was focused at the first numerical aperture that had been selected by the setting means.

In one preferred embodiment of the present invention, the setting means preferably selects one of the multiple different numerical apertures after another in an ascending order by beginning with the smallest, first numerical aperture. The recognizing means preferably determines, by the signal representing the reflected and detected portion of the light from the optical disc on which the light beam was focused at the numerical aperture that had been selected by the setting means, whether the given optical disc is a type associated with the numerical aperture currently selected.

In another preferred embodiment, the optical disc drive preferably further includes: light source means for selectively emitting one of a plurality of light beams with multiple different wavelengths corresponding to the multiple different numerical apertures; and wavelength selecting means for setting the wavelength of the light beam emitted from the light source means equal to a first one of the multiple different wavelengths when the setting means sets the numerical aperture of the focusing means equal to the first numerical aperture. The first wavelength is preferably longer than any of the other wavelengths. The focusing means preferably focuses the light beam that has been emitted from the light source means.

In still another preferred embodiment, the optical disc drive preferably further includes light source means for selectively emitting one of a plurality of light beams with multiple different wavelengths corresponding to the multiple different numerical apertures. The focusing means preferably focuses the light beam that has been emitted from the light source means. The numerical aperture of the focusing means preferably changes with the wavelength of the light beam to be focused. The setting means preferably sets the wavelength of the light beam emitted from the light source means equal to a first one of the multiple different wavelengths, thereby setting the numerical aperture of the focusing means equal to the first numerical aperture. The first wavelength is preferably longer than any of the other wavelengths.

In this particular preferred embodiment, the setting means preferably selects one of the multiple different numerical apertures after another in an ascending order by beginning with the smallest, first numerical aperture. The setting means or the wavelength selecting means preferably selects one of the multiple different wavelengths after another in a descending order by beginning with the longest, first wavelength. The recognizing means preferably determines, by the signal representing the reflected and detected portion of the light from the optical disc on which the light beam was focused at the selected numerical aperture and wavelength, whether the given optical disc is a type associated with the numerical aperture and wavelength currently selected.

In an alternative preferred embodiment, the at least two types of optical discs preferably include light beam passage layers with multiple different thicknesses to pass the light beam. The optical disc drive preferably further includes: spherical aberration correcting means for correcting a spherical aberration produced on the spot of the light beam that has been focused on the data storage layer of the given optical disc; and spherical aberration regulating means for setting the magnitude of correction to be made by the spherical aberration correcting means equal to a first correction value when the setting means sets the numerical aperture of the focusing means equal to the first numerical aperture. The first correction value is preferably associated with the largest one of the multiple different thicknesses.

In this particular preferred embodiment, the setting means preferably selects one of the multiple different numerical apertures after another in an ascending order by beginning with the smallest, first numerical aperture. The setting means or the wavelength selecting means preferably selects one of the multiple different wavelengths after another in a descending order by beginning with the longest, first wavelength. The spherical aberration regulating means preferably selects one of multiple correction values, associated with the multiple different thicknesses, after another in a descending order by beginning with the largest, first correction value. The recognizing means preferably determines, by the signal representing the reflected and detected portion of the light from the optical disc on which the light beam was focused at the selected numerical aperture, wavelength and correction value, whether the given optical disc is a type associated with the numerical aperture, wavelength and correction value currently selected.

Specifically, the multiple different thicknesses preferably include at least one of the ranges of: 1.2+0.3 mm to 1.2−0.1 mm; 0.6+0.53 mm to 0.6−0.5 mm; 100+5 μm to 100−5 μm; and 75+5 μm to 75−5 μm.

In yet another preferred embodiment, the multiple different wavelengths preferably include at least one of the ranges of: 400 nm to 410 nm; 645 nm to 660 nm; and 775 nm to 795 nm.

In yet another preferred embodiment, the multiple different numerical apertures preferably include at least one of the ranges of: 0.85+0.01 to 0.85−0.01; 0.6+0.01 to 0.6−0.01; and 0.50+0.01 to 0.50−0.01.

In yet another preferred embodiment, the multiple different wavelengths preferably include at least one of the ranges of: 405+5 nm to 405−5 nm; 650+5 nm to 650−5 nm; and 780+10 nm to 780−10 nm.

In yet another preferred embodiment, the multiple different numerical apertures preferably include at least one of the ranges of: 0.85+0.01 to 0.85−0.01; 0.6+0.01 to 0.6−0.01; and 0.45+0.01 to 0.45−0.01.

In yet another preferred embodiment, the signal representing the detected portion of the reflected light preferably includes at least one of a focus error signal, a tracking error signal, a signal representing the quantity of the reflected light and a read signal.

A data storage layer distinguishing method according to a preferred embodiment of the present invention is a method for distinguishing at least two types of data storage layers, which are associated with multiple different numerical apertures. The method preferably includes the step of setting the numerical aperture of focusing means equal to a first one of the multiple different numerical apertures. The focusing means is preferably used to focus a light beam on a data storage layer of a given optical disc. The first numerical aperture is preferably smaller than any of the other numerical apertures. The method preferably further includes the step of distinguishing the data storage layer by the first numerical aperture that has been selected in the step of setting the numerical aperture.

A data storage layer distinguishing apparatus according to a preferred embodiment of the present invention is an apparatus for distinguishing a given data storage layer by controlling an optical disc drive, which accesses at least two types of data storage layers associated with multiple different numerical apertures. The apparatus preferably includes setting changing means for setting the numerical aperture of focusing means equal to a first one of the multiple different numerical apertures. The focusing means is preferably used to focus a light beam on a data storage layer of the given optical disc. The first numerical aperture is preferably smaller than any of the other numerical apertures. The apparatus preferably further includes distinguishing means for distinguishing the data storage layer of the given optical disc, loaded in the optical disc drive, by the first numerical aperture that has been selected by the setting changing means.

An optical disc drive according to a preferred embodiment of the present invention preferably accesses at least two types of data storage layers, which are associated with multiple different numerical apertures. The optical disc drive preferably includes: focusing means for focusing a light beam on a data storage layer of a given optical disc at a changeable numerical aperture; detecting means for detecting light that has been reflected from the given data storage layer, on which the light beam was focused by the focusing means; setting means for setting the numerical aperture of the focusing means equal to a first one of the multiple different numerical apertures, the first numerical aperture being smaller than any of the other numerical apertures; and distinguishing means for distinguishing the data storage layer of the given optical disc by a signal representing a reflected and detected portion of the light from the optical disc on which the light beam was focused at the first numerical aperture that had been selected by the setting means.

In one preferred embodiment of the present invention, the optical disc drive preferably further includes counting means for counting the number of the data storage layers of the given optical disc.

In another preferred embodiment, the at least two types of data storage layers are preferably located at mutually different depths as measured from a principal surface of the given optical disc. The optical disc drive preferably further includes: vertical position changing means for moving the focusing means perpendicularly to the data storage layers; and shifting means for getting the light beam focused on the deepest one of the data storage layers first, the second deepest one next, and so forth toward the surface of the given optical disc, by driving the vertical position changing means while the distinguishing means is distinguishing the given data storage layer.

In this particular preferred embodiment, the optical disc drive preferably further includes: focusing state detecting means for generating a signal representing a focusing state of the light beam on the given data storage layer; and focus control means for getting the light beam focused on a desired one of the data storage layers by driving the vertical position changing means in response to the signal generated by the focusing state detecting means. In accordance with a result obtained by the distinguishing means, the focus control means preferably gets the light beam focused on the desired data storage layer earlier than any of the other data storage layers.

More specifically, the optical disc drive preferably further includes: spherical aberration correcting means for correcting a spherical aberration differently according to the given data storage layer; and spherical aberration regulating means for adjusting the magnitude of correction to be made by the spherical aberration correcting means according to the desired data storage layer when the focus control means gets the light beam focused on the desired data storage layer.

In another preferred embodiment, the optical disc drive preferably further includes: focusing state detecting means for generating a signal representing a focusing state of the light beam on the given data storage layer of the optical disc; focus control means for getting the light beam focused on a desired one of the data storage layers by driving the vertical position changing means in response to the signal generated by the focusing state detecting means; and storage means for bringing the focusing means closer to, or away from, the optical disc with the numerical apertures of the focusing means switched sequentially and for storing the signal of the focusing state detecting means to be output as the focusing states are changed. In accordance with the output signal of the focusing state detecting means as stored in the storage means, the focus control means preferably corrects the amplitude and/or balance of the output signal of the focusing state detecting means in getting the light beam focused.

In yet another preferred embodiment, the optical disc drive preferably further includes: focusing state detecting means for generating a signal representing a focusing state of the light beam on the given data storage layer of the optical disc; focus control means for getting the light beam focused on a desired one of the data storage layers by driving the vertical position changing means in response to the signal generated by the focusing state detecting means; storage means for bringing the focusing means closer to, or away from, the optical disc with the numerical apertures of the focusing means switched sequentially and for storing the signal of the focusing state detecting means to be output as the focusing states are changed; and interlayer jump means for shifting the focal point of the light beam from any of the data storage layers of the optical disc to another in accordance with the output signal of the focusing state detecting means. In accordance with the output signal of the focusing state detecting means as stored in the storage means, the interlayer jump means preferably corrects the amplitude and/or balance of the output signal of the focusing state detecting means in shifting the focal point from one layer to another.

According to various preferred embodiments of the present invention described above, the numerical aperture of focusing means for focusing a light beam on the data storage layer of a given optical disc is set equal to a first numerical aperture, which is smaller than any of the other different numerical apertures, and the type of the given optical disc is recognized by the first numerical aperture. Thus, the collision between the focusing means and the optical disc can be minimized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 21A and 21B are respectively a plan view and a cross-sectional view illustrating an exemplary configuration for the wavelength-selective aperture shown in FIG. 20.

FIGS. 22A and 22B are respectively a plan view and a cross-sectional view illustrating another exemplary configuration for the wavelength-selective aperture shown in FIG. 20.

FIG. 23 is a flowchart showing the flow of an optical disc type recognizing process according to the third preferred embodiment.

DETAILED DESCRIPTION OF PREFERRED EMBODIMENTS

Hereinafter, preferred embodiments of the present invention will be described in detail with reference to the accompanying drawings. It should be noted that the present invention is in no way limited to the following illustrative preferred embodiments.

Embodiment 1

Figure 1:
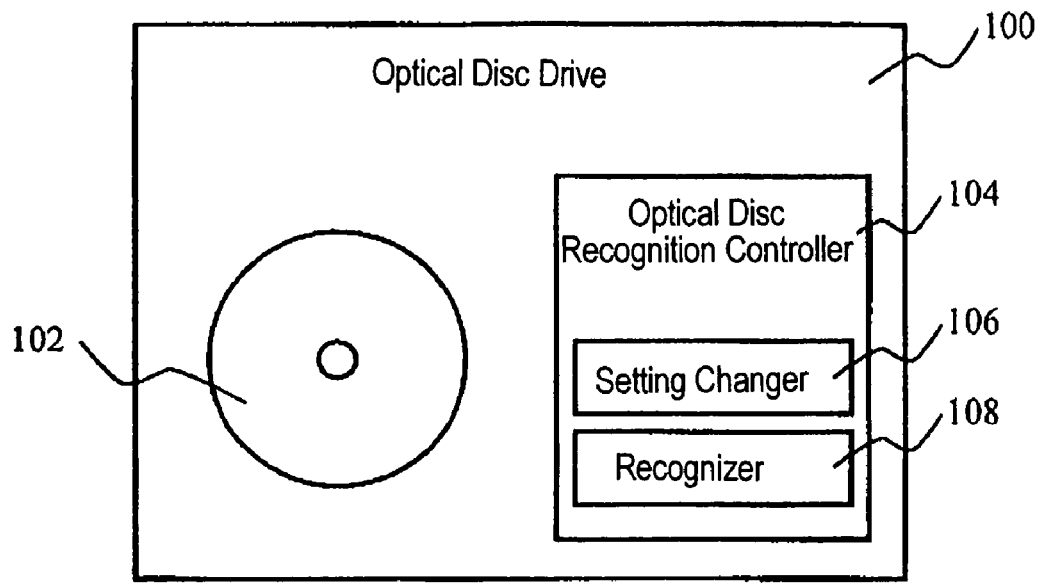
FIG. 1 is a block diagram showing the basic concept of an optical disc recognition controller according to a first specific preferred embodiment of the present invention.

FIG. 1 is a block diagram schematically showing a configuration for an optical disc recognition controller according to a first specific preferred embodiment of the present invention. The optical disc recognition controller 104 of the first preferred embodiment preferably recognizes at least two types of optical discs 102, which are associated with multiple different numerical apertures. Also, the optical disc recognition controller 104 preferably controls an optical disc drive 100 for accessing the optical disc 102. The optical disc recognition controller 104 recognizes the type of the optical disc 102 in the optical disc drive 100 when the optical disc drive 100 is turned ON or when the optical disc 102 is inserted into the optical disc drive 100. The number of the types of optical discs to be recognized is not particularly limited and may be two, three or more, for example.

The optical disc recognition controller 104 preferably includes a setting changer 106 and a recognizer 108. The setting changer 106 preferably controls a focusing mechanism 110, which focuses a light beam on the data storage layer of the given optical disc 102, by setting the numerical aperture of the focusing mechanism 110 equal to the smallest one of the multiple different numerical apertures (which will be referred to herein as a "first numerical aperture"). Alternatively, the setting changer 106 may control the focusing mechanism 110 by setting the numerical aperture of the focusing mechanism 110 equal to a second numerical aperture, which is greater than at least one of the multiple different numerical apertures. The second numerical aperture may or may not be included in the multiple different numerical apertures. Also, beginning with the smallest, first numerical aperture, the setting changer 106 may sequentially select one of the numerical apertures after another in the ascending order.

The recognizer 108 preferably recognizes the type of the optical disc 102 loaded in the optical disc drive 100 by the first numerical aperture that has been selected by the setting changer 106. The recognizer 108 may recognize all types of optical discs 102 by the first numerical aperture. Also, if the setting changer 106 sequentially selects one of the multiple different numerical apertures after another in the ascending order, then the recognizer 108 may determine whether or not the optical disc 102 loaded is associated with the numerical aperture currently selected by the setting changer 106. This decision can be made in accordance with a signal representing a reflected and detected portion of the light from the optical disc 102 on which the light beam was focused at that numerical aperture.

The optical disc 102 is a storage medium that can be accessed by way of a light beam and preferably has either a single data storage layer or multiple data storage layers, which are stacked one upon the other. Examples of preferred optical discs 102 includes music CDs, CD-ROMs, CD-Rs, CD-RWs, DVD-ROMs, DVD-RAMs, DVD-RWs, DVD-Rs, DVD+RWs, DVD+Rs, and high-density optical discs to be accessed with a blue or violet light beam.

The multiple different numerical apertures may include at least one of the ranges of: 0.85+0.01 to 0.85−0.01; 0.6+0.01 to 0.6−0.01; and 0.50+0.01 to 0.50−0.01. Alternatively, the multiple different numerical apertures may include at least one of the ranges of: 0.85+0.01 to 0.85−0.01; 0.6+0.01 to 0.6−0.01; and 0.45+0.01 to 0.45−0.01. Furthermore, the multiple different numerical apertures may also fall within any other range.

Figure 2:
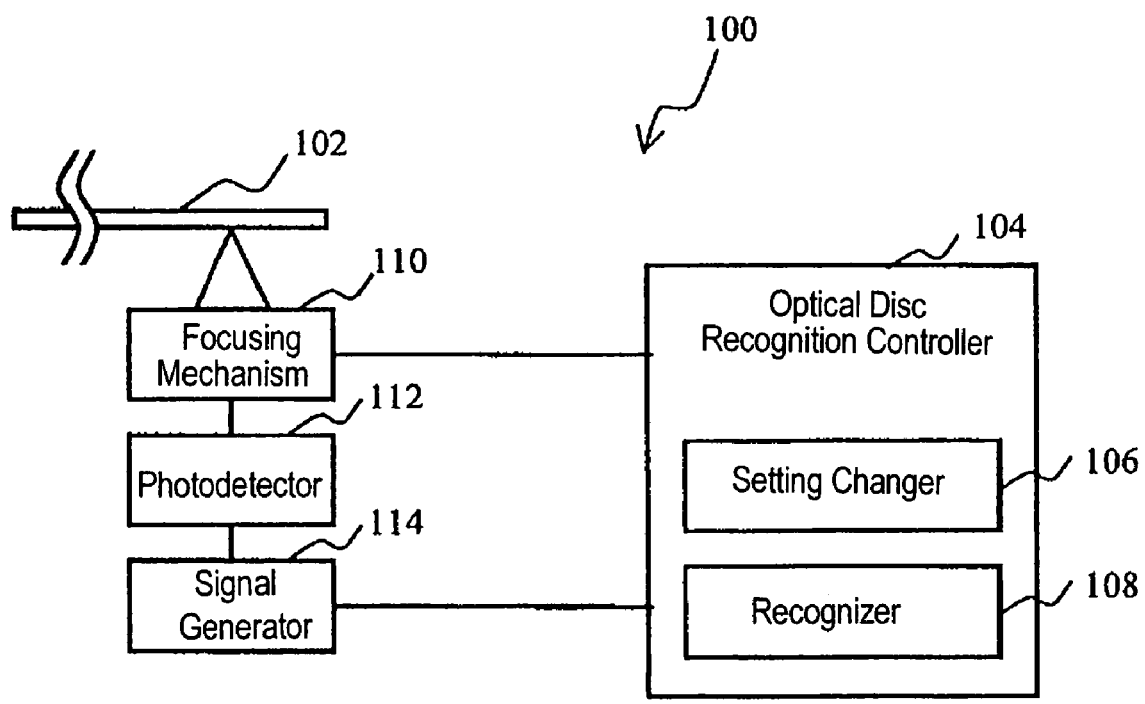
FIG. 2 is a block diagram schematically showing a configuration for the optical disc drive shown in FIG. 1.

FIG. 2 is a block diagram schematically showing a detailed configuration for the optical disc drive 100 shown in FIG. 1. As shown in FIG. 2, the optical disc drive 100 preferably includes the focusing mechanism 110, a photodetector 112, a signal generator 114 and the optical disc recognition controller 104. The focusing mechanism 110 preferably focuses a light beam on the data storage layer of the optical disc 102 and may include an optical lens (e.g., an objective lens). The numerical aperture of the focusing mechanism 110 is preferably switchable. The numerical apertures may be switched by changing the objective lenses or compensators to pass the light beam. Alternatively, the numerical apertures may also be switched mechanically as well.

The photodetector 112 preferably detects the light that has been reflected from the optical disc 102 on which the light beam was focused by the focusing mechanism 110. The signal generator 114 preferably generates a signal representing the detected portion of the reflected light from the optical disc 102. For example, the signal generator 114 may generate a signal representing a focusing state of the light beam on the data storage layer. More specifically, the signal generator 114 preferably generates a signal including at least one of a focus error (FE) signal, a tracking error (TE) signal, an AS signal representing the quantity of light reflected and a read signal (RF signal). The recognizer 108 of the optical disc recognition controller 104 preferably recognizes the type of the given optical disc 102 based on the output signal of the signal generator 114.

Figure 3:
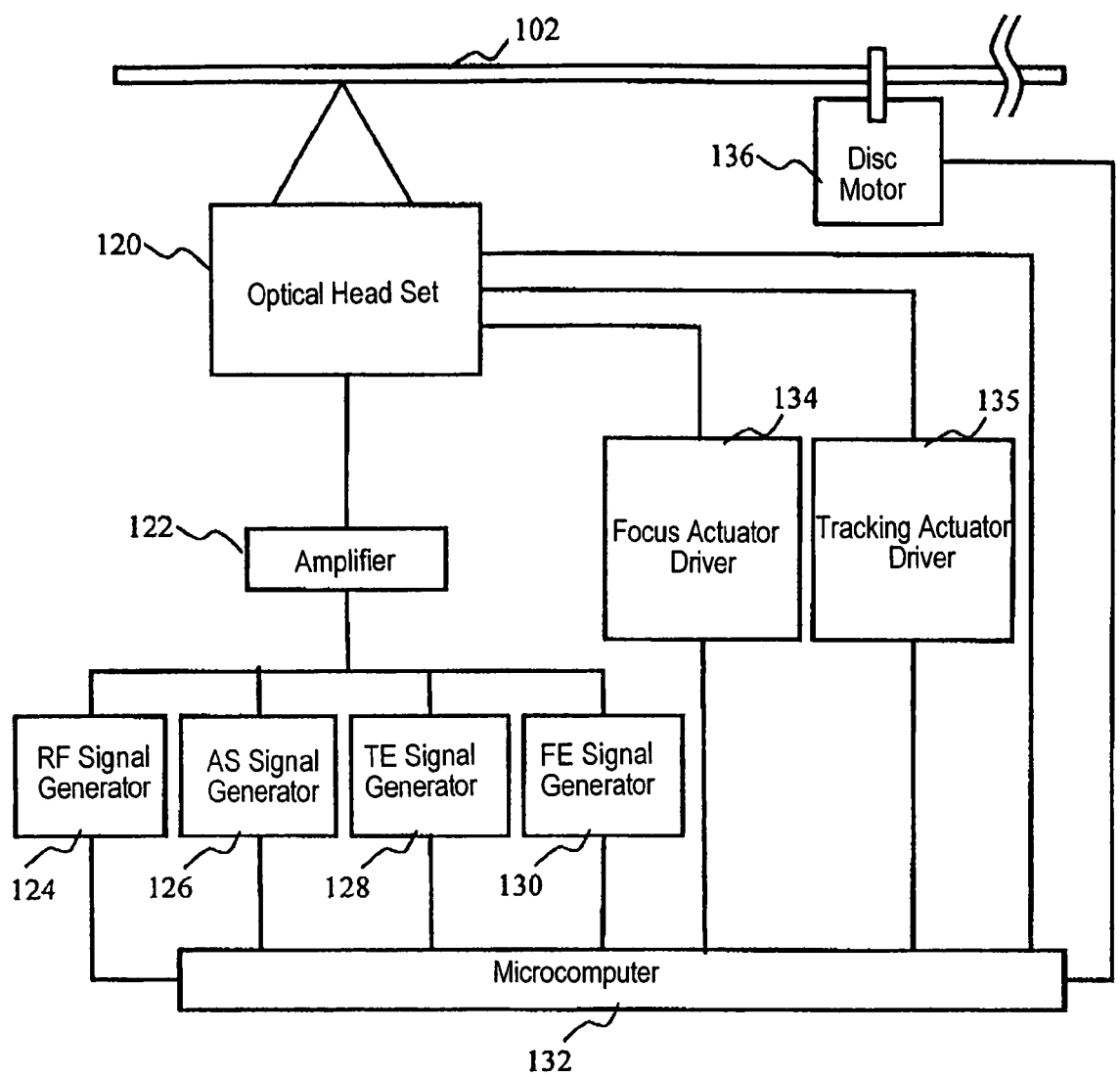
FIG. 3 is a block diagram showing an exemplary detailed configuration for the optical disc drive shown in FIG. 2.

FIG. 3 is a block diagram showing a more detailed configuration for the optical disc drive 100 shown in FIG. 2. As shown in FIG. 3, the optical disc drive 100 preferably includes a optical head set 120, an amplifier 122, an RF signal generator 124, an AS signal generator 126, a TE signal generator 128, an FE signal generator 130, a microcomputer 132, a focus actuator driver 134, a tracking actuator driver 135 and a disc motor 136. The disc motor 136 preferably rotates the optical disc 102 at a predetermined rotational velocity (expressed in revolutions per minute).

The optical head set 120 preferably outputs the light beam so as to form a light beam spot on the data storage layer of the optical disc 102. Also, the optical head set 120 preferably receives the light that has been reflected from the optical disc 102, thereby outputting a signal representing the reflected light. The amplifier 122 preferably converts a current signal, supplied from the photodetector of the optical head set 120, into a voltage signal. The RF signal generator 124 preferably receives the output signal of the amplifier 122 and outputs an RF signal. The AS signal generator 126 preferably receives the output signal of the amplifier 122 and outputs an AS signal.

The TE signal generator 128 preferably receives the output signal of the amplifier 122 and outputs a TE signal. The TE signal is used to perform a tracking control operation such that the light beam can follow intended tracks on the optical disc 102. The TE signal may be detected by any method, e.g., a phase difference method, a push-pull method or a three-beam method. The circuit configuration of the TE signal generator 128 may also be appropriately modified according to the detection method adopted.

The FE signal generator 130 preferably receives the output signal of the amplifier 122 and outputs an FE signal. The FE signal is used to perform a focus control operation such that the light beam on the data storage layer of the optical disc 102 can maintain a predetermined focusing state. The FE signal may be detected by any method, e.g., an astigmatism method, a knife edge method or a spot sized detection (SSD) method. The circuit configuration of the FE signal generator 130 may be appropriately modified according to the detection method adopted. Each of the RF signal generator 124, AS signal generator 126, TE signal generator 128 and FE signal generator 130 may share at least some of its own circuits with any other signal generator.

The microcomputer 132 preferably processes the output signals of the RF signal generator 124, AS signal generator 126, TE signal generator 128 and FE signal generator 130 and preferably outputs control signals to control the respective components of the optical disc drive 100. Also, the microcomputer 132 preferably controls the optical head set 120, focus actuator driver 134, tracking actuator driver 135 and disc motor 136. The microcomputer 132 may be replaced with a DSP (digital signal processor).

The focus actuator driver 134 preferably drives the focus actuator of the optical head set 120 in response to the control signal supplied from the microcomputer 132. On the other hand, the tracking actuator driver 135 preferably drives the tracking actuator of the optical head set 120 in response to the control signal supplied from the microcomputer 132.

Figure 4:
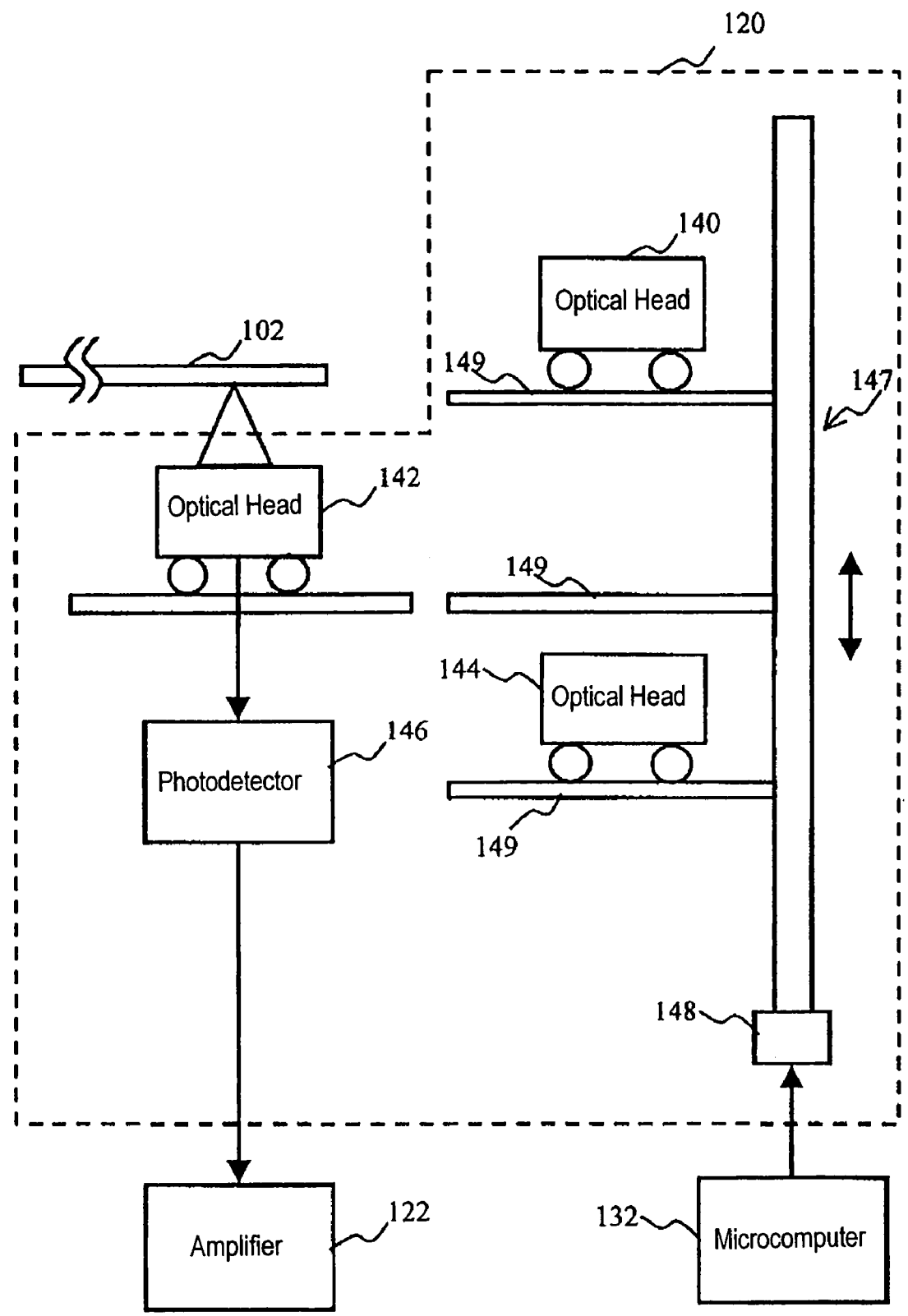
FIG. 4 is a block diagram showing a detailed configuration for the optical head set shown in FIG. 3.

FIG. 4 is a block diagram showing an exemplary configuration for the optical head set 120 shown in FIG. 3. As shown in FIG. 4, the optical head set 120 preferably includes optical heads 140, 142 and 144, a photodetector 146, and an optical head selector 147. The multiple optical heads 140, 142 and 144 are associated with mutually different numerical apertures so as to emit light beams at respectively different wavelengths. The number of optical heads included in the optical head set 120 is not particularly limited but may be two, four or more. In any case, these optical heads 140, 142 and 144 are switched by the selector 147 such that one of the optical heads 140, 142 and 144 is used selectively. The optical head selected preferably irradiates the given optical disc 102 with a light beam and passes the light that has been reflected from the optical disc 102.

The photodetector 146 preferably receives the light that was reflected from the optical disc 102 and then passed through one of the optical heads 140, 142 and 144 and converts the light (i.e., an optical signal) into an electric signal (or current signal). The photodetector 146 may be divided into four areas, for example. Under the control of the microcomputer 132, the optical head selector 147 preferably arranges a selected one of the optical heads 140, 142 and 144 at a predetermined position. The optical head selector 147 preferably includes multiple tables 149 to mount the respective optical heads 140, 142 and 144 thereon and a motor 148. The motor 148 preferably moves the tables 149 to switch the optical heads to be used.

Figure 5:
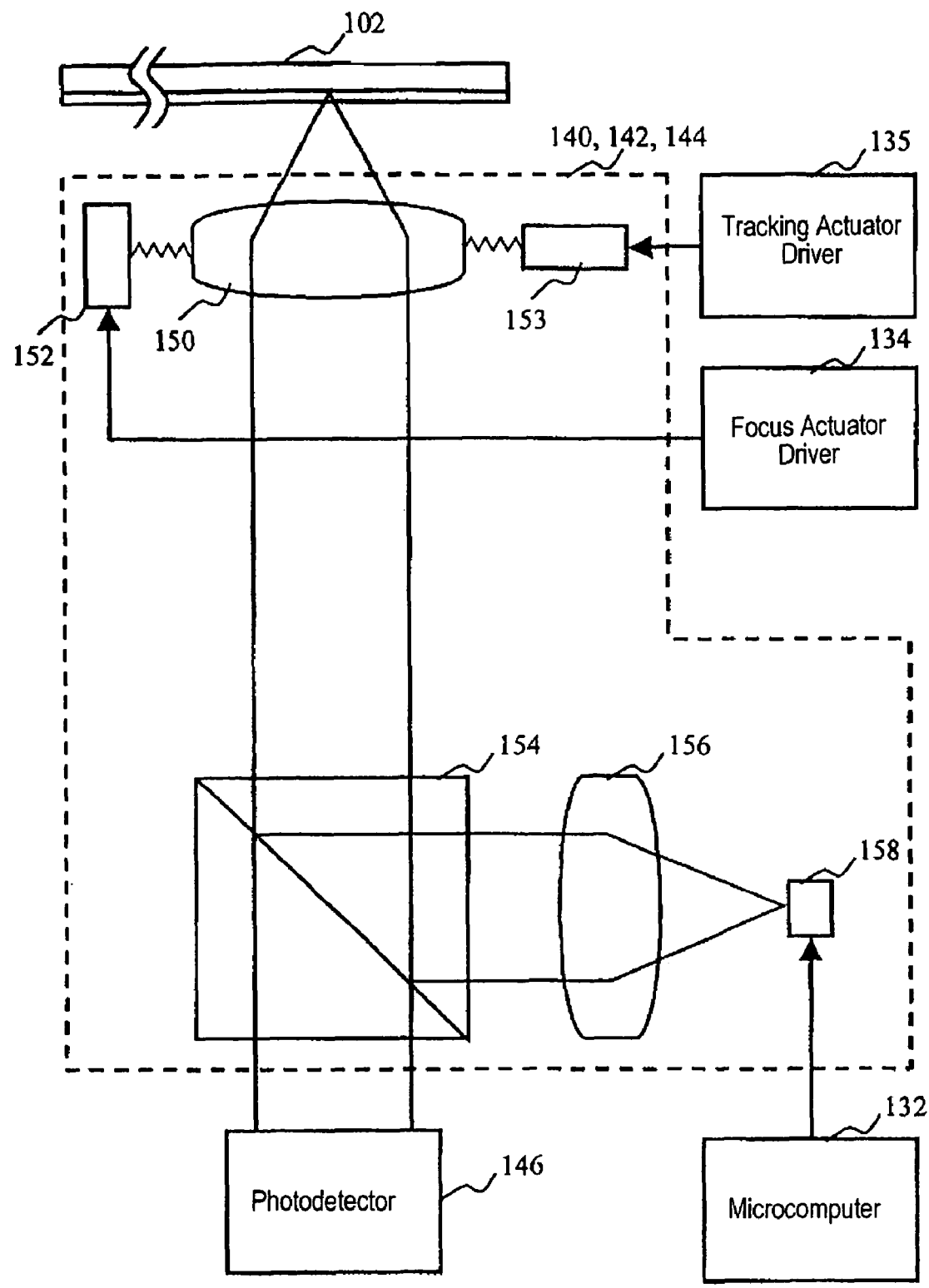
FIG. 5 is a block diagram showing a detailed configuration for each of the optical heads shown in FIG. 4.

FIG. 5 is a block diagram showing an exemplary configuration for each of the optical heads 140, 142 and 144 shown in FIG. 4. As shown in FIG. 5, each optical head 140, 142 or 144 preferably includes an objective lens 150, a focus actuator 152, a tracking actuator 153, a polarization beam splitter 154, a coupling lens 156 and a light source 158. The light source 158 preferably emits a light beam and may be a semiconductor laser diode, for example. The focus actuator 152 preferably moves the objective lens 150 substantially perpendicularly to the data storage layer of the optical disc 102. The focus actuator 152 may include a coil and a magnet, for example. On the other hand, the tracking actuator 153 preferably moves the objective lens 150 substantially parallel to the data storage layer of the optical disc 102. The tracking actuator 153 may also include a coil and a magnet, for example.

The coupling lens 156 preferably transforms the emission of the light source 158 into a parallel beam. The polarization beam splitter 154 preferably reflects the parallel beam that has come from the coupling lens 156 and preferably transmits the light that has come from the objective lens 150. The light that has been transmitted through the polarization beam splitter 154 is preferably received at the photodetector 146. The objective lens 150 preferably focuses the light beam coming from the polarization beam splitter 154, thereby forming a light beam spot on the data storage layer of the optical disc 102. Also, the objective lens 150 preferably passes the light that has been reflected from the optical disc 102.

The numerical aperture of the objective lens 150 and the wavelength of the emission of the light source 158 in one of the optical heads 140, 142 and 144 are different from those of another. For example, the objective lens 150-3 of the optical head 144 preferably has a numerical aperture of 0.85+0.01 to 0.85−0.01; the objective lens 150-2 of the optical head 142 preferably has a numerical aperture of 0.6+0.01 to 0.6−0.01; and the objective lens 150-1 of the optical head 140 preferably has a numerical aperture of 0.50+0.01 to 0.50−0.01 or 0.45+0.01 to 0.45−0.01.

Also, the light source 158-3 of the optical head 144 may emit a light beam with a wavelength of 405+5 nm to 405−5 nm; the light source 158-2 of the optical head 142 may emit a light beam with a wavelength of 645 nm to 660 nm or 650+5 nm to 650−5 nm; and the light source 158-1 of the optical head 140 may emit a light beam with a wavelength of 775 nm to 795 nm or 780+10 nm to 780−10 nm.

It should be noted that the objective lens 150 and the optical head selector 147 are equivalent to the focusing mechanism 110 shown in FIG. 2. The photodetector 146 corresponds with the photodetector 112 shown in FIG. 2. Also, the RF signal generator 124, AS signal generator 126, TE signal generator 128 and FE signal generator 130 are collectively represented by the signal generator 114 in FIG. 2. Furthermore, the microcomputer 132 preferably performs the functions of the optical disc recognition controller 104.

Figure 6:
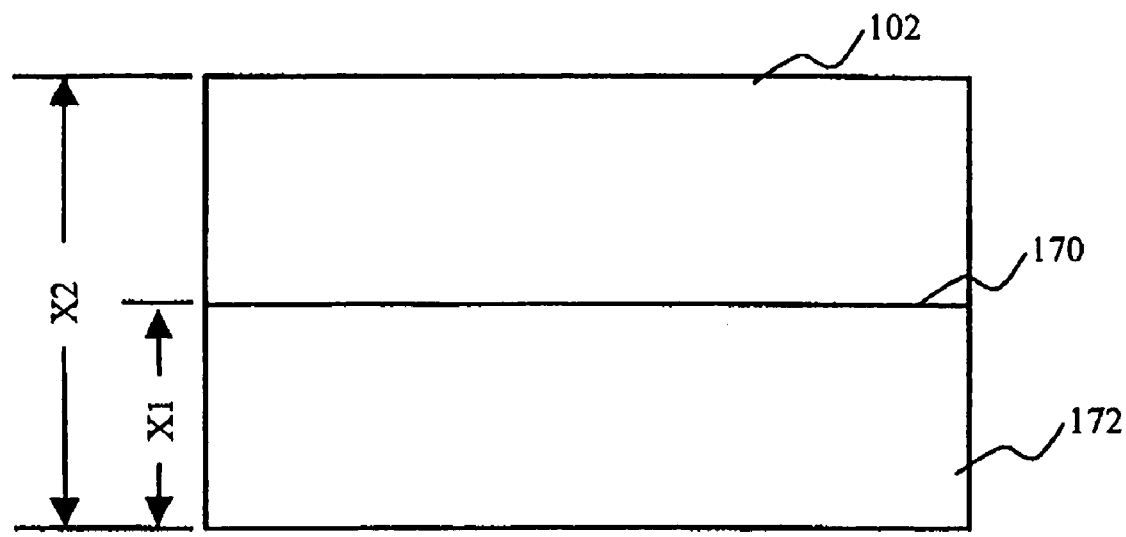
FIG. 6 illustrates an exemplary structure for the optical disc shown in FIG. 1.

FIG. 6 schematically illustrates an exemplary structure for the optical disc 102 shown in FIG. 1. The optical disc 102 preferably includes a data storage layer 170 and a light beam passage layer 172. The optical disc 102 is preferably designed such that the data storage layer 170 can be accessed by way of the light beam passage layer 172. The thickness X2 of the optical disc 102 is not particularly limited but may be approximately 1.2 mm, for example. The light beam passage layer 172 preferably transmits the light beam that has come from the objective lens 150. The thickness X1 of the light beam passage layer 172 is not particularly limited, either, but may be 1.2+0.3 mm to 1.2−0.1 mm, 0.6+0.53 mm to 0.6−0.5 mm, 100+5 μm to 100−5 μm or 75+5 μm to 75−5 μm.

Figure 7:
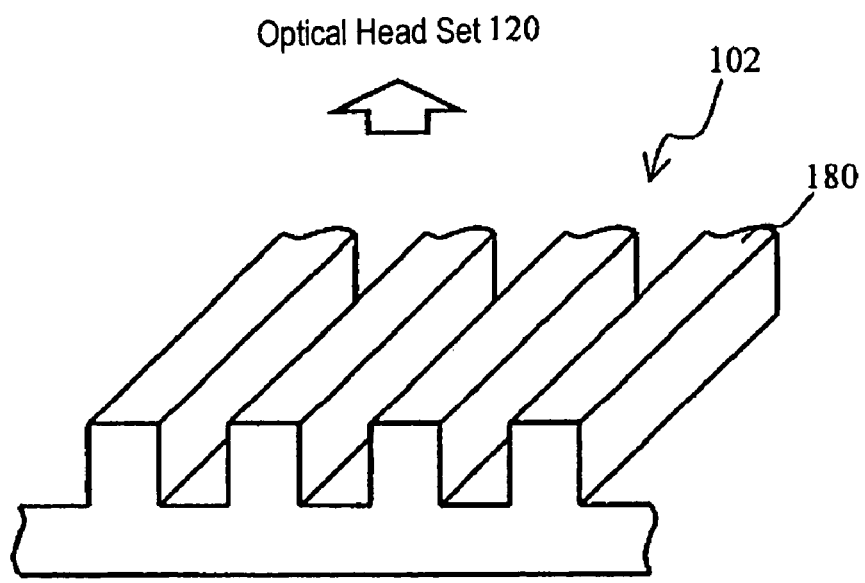
FIG. 7 schematically illustrates the configuration of data tracks according to the first preferred embodiment.

FIG. 7 schematically illustrates the configuration of data tracks according to the first preferred embodiment. On the data storage layer 170 of the optical disc 102, raised data tracks 180 may be formed, for example. Then, the data storage layer 170 has an uneven surface. The optical head set 120 preferably emits the light beam toward the uneven surface of the data storage layer 170 with the data tracks 180, thereby reading data from the tracks 180 or writing data on the tracks 180. However, the optical disc 102 does not have to have the configuration shown in FIG. 7 but may have a pit structure as well.

Figure 8A:
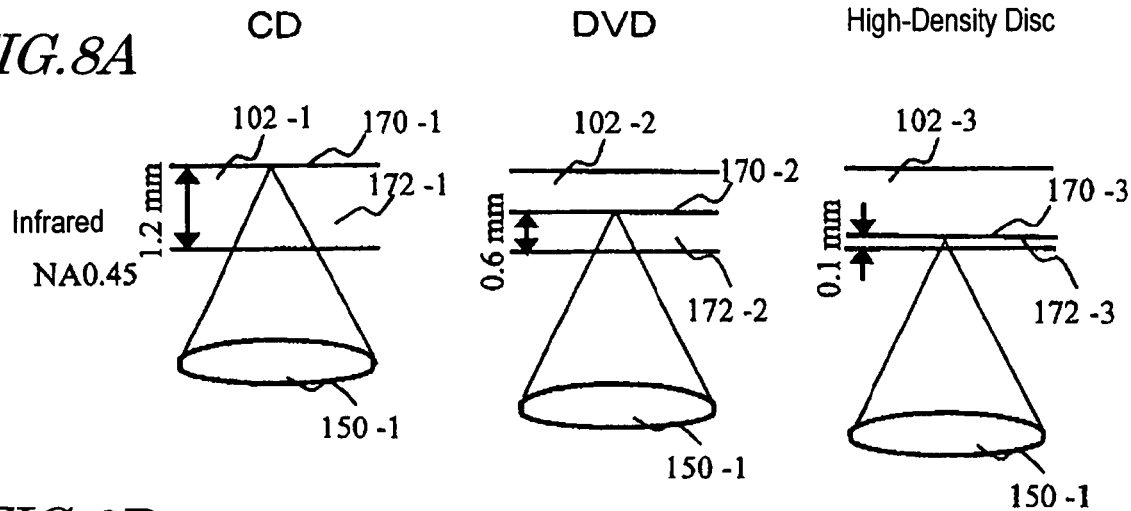
FIGS. 8A, 8B and 8C show various positional relationships between objective lenses and three types of optical discs according to the first preferred embodiment.
Figure 8B:
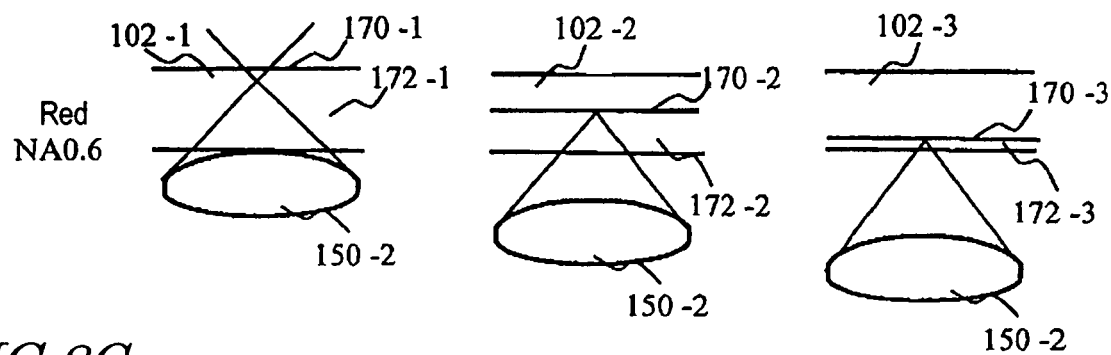
Figure 8C:
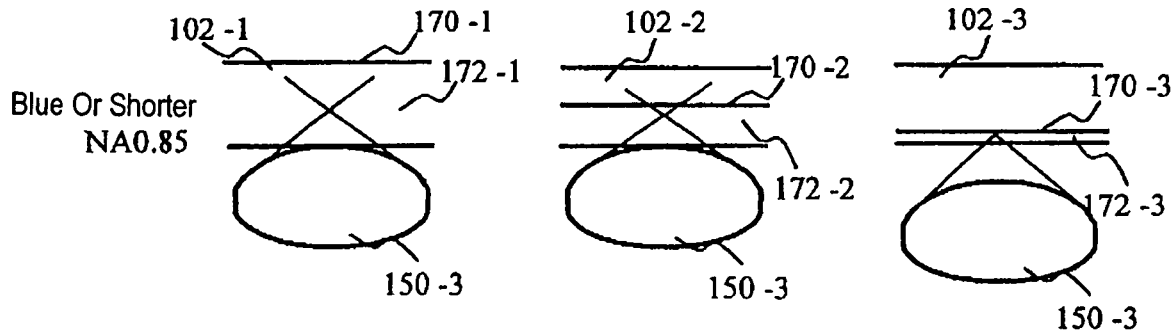

Hereinafter, it will be described with reference to FIGS. 8 through 11 exactly how the optical disc drive 100 having the configuration of the first preferred embodiment described above operates. FIG. 8 illustrates various positional relationships between the objective lenses 150 (i.e., 150-1, 150-2 and 150-3) and the optical discs 102 (i.e., 102-1, 102-2 and 102-3) according to this first preferred embodiment. As shown in FIG. 8A, when the objective lens 150-1 having a numerical aperture (NA) of 0.45 is used, the distance between the focal point of the light beam and the objective lens 150-1 is longer than the situation where any of the two other objective lenses 150-2 and 150-3 is used.

If the objective lens 150-1 and an infrared light beam are used in combination, then the collision between the objective lens 150-1 and the optical disc 102-1, 102-2 or 102-3 can always be avoided irrespective of the type of the given optical disc 102. That is to say, no collision should occur no matter whether the infrared light beam is focused on the data storage layer 170-1 of the optical disc 102-1 with a light beam passage layer 172-1 having a thickness of 1.2 mm (e.g., a compact disc (CD)), on the data storage layer 170-2 of the optical disc 102-2 with a light beam passage layer 172-2 having a thickness of 0.6 mm (e.g., a digital versatile disc (DVD)), or on the data storage layer 170-3 of the optical disc 102-3 with a light beam passage layer 172-3 having a thickness of 0.1 mm (e.g., a high-density disc to be accessed with a light beam having a wavelength that is equal to or shorter than that of a blue ray).

On the other hand, if the objective lens 150-2 with an NA of 0.6 is used (see FIG. 8B), then the distance between the focal point of the light beam and the objective lens 150-2 is shorter than the situation where the objective lens 150-1 is used. Using this objective lens 150-2 and a red light beam in combination, while the light beam is being focused on the data storage layer 170-1 of the optical disc 102-1, collision should occur between the objective lens 150-2 and the optical disc 102-1. However, if the light beam is focused on the data storage layer 170-2 of the optical disc 102-2 or on the data storage layer 170-3 of the optical disc 102-3, then no collision should occur between the objective lens 150-2 and the optical disc 102-2 or 102-3.

Furthermore, if the objective lens 150-3 with an NA of 0.85 is used (see FIG. 8C), then the distance between the focal point of the light beam and the objective lens 150-3 is even shorter than the situation where the objective lens 150-1 or 150-2 is used. Using, in combination, this objective lens 150-3 and a light beam of which the wavelength is equal to or shorter than that of a blue ray, while the light beam is being focused on the data storage layer 170-1 of the optical disc 102-1, collision should occur between the objective lens 150-3 and the optical disc 102-1. In the same way, collision should also occur between the objective lens 150-3 and the optical disc 102-2 while the light beam is being focused on the data storage layer 170-2 of the optical disc 102-2.

However, if the light beam is focused on the data storage layer 170-3 of the optical disc 102-3, then no collision should occur between the objective lens 150-3 and the optical disc 102-3. As described above, the smaller the NA of the objective lens to focus a light beam, the longer the distance between the objective lens 150 and the focal point and the less likely the collision between the objective lens 150 and the optical disc 102.

Figure 9:
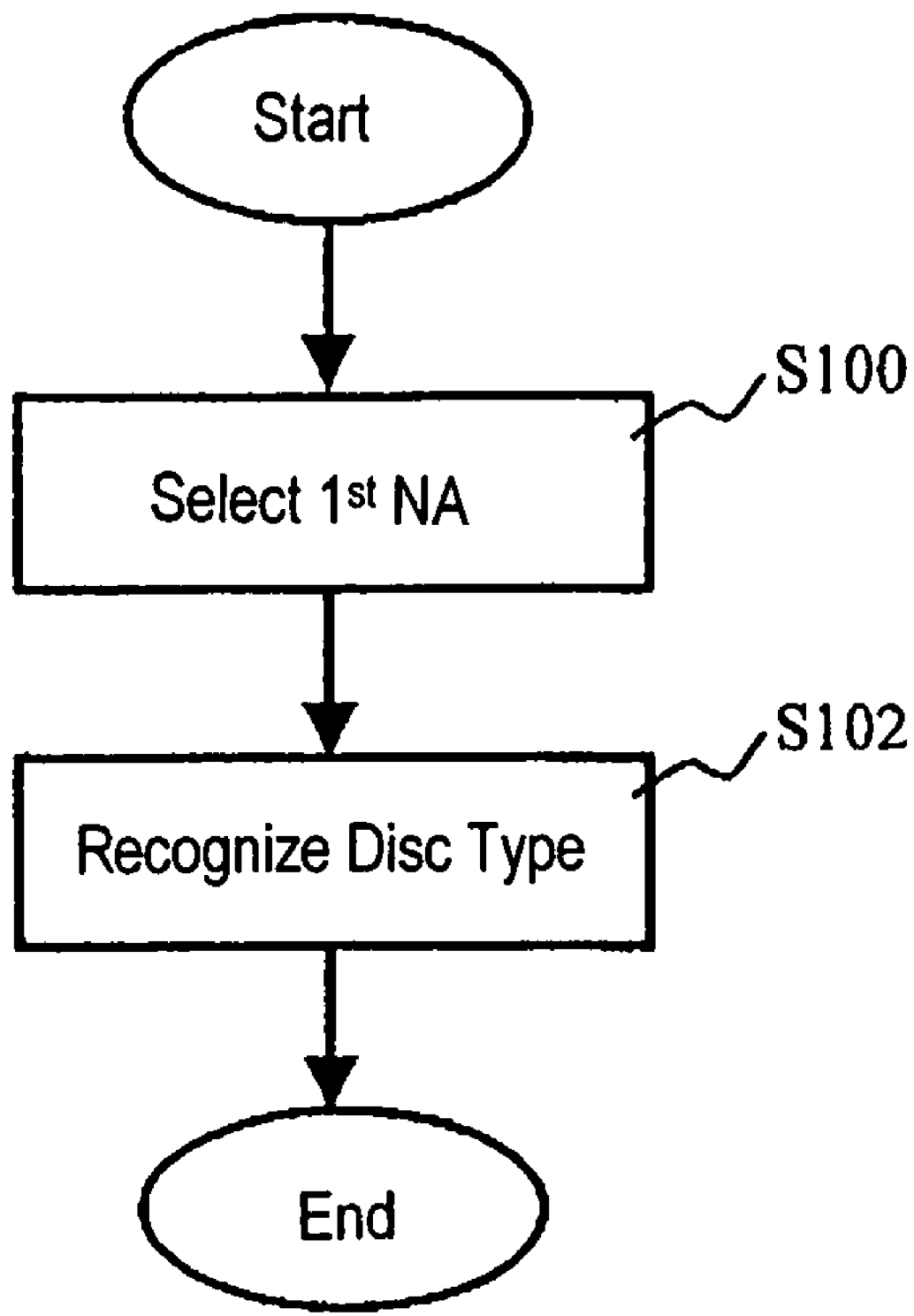
FIG. 9 is a flowchart showing the flow of an optical disc type recognizing process according to the first preferred embodiment.

FIG. 9 is a flowchart showing the flow of the optical disc type recognizing process of this first preferred embodiment. In this optical disc type recognizing process, first, in Step S100, the setting changer 106 to be implemented by the microcomputer 132 preferably outputs a control signal that sets the numerical aperture of the objective lens 150 equal to a first numerical aperture. The setting changer 106 preferably controls the optical head selector 147 so as to select the objective lens 150-1 with the smallest, first numerical aperture among the three objective lenses 150-1, 150-2 and 150-3. In accordance with the control signal supplied from the setting changer 106, the optical head selector 147 preferably puts the optical head 140 with the objective lens 150-1 at the predetermined position.

Next, in Step S102, the recognizer 108 to be implemented by the microcomputer 132 preferably recognizes the type of the given optical disc 102 by the first numerical aperture that has been selected in Step S100. The recognizer 108 preferably controls the optical head set 120 such that the light beam is focused on the optical disc 102 by way of the objective lens 150-1, for example, and preferably recognizes the type of the optical disc 102 in accordance with a signal representing the detected portion of the reflected light from the optical disc 102. The recognizer 108 may recognize the type of the given optical disc 102 by the FE signal, TE signal, AS signal, RF signal or a combination thereof. The recognizer 108 may recognize all types of optical discs 102 either by the first numerical aperture only or by switching the numerical apertures.

Figure 10:
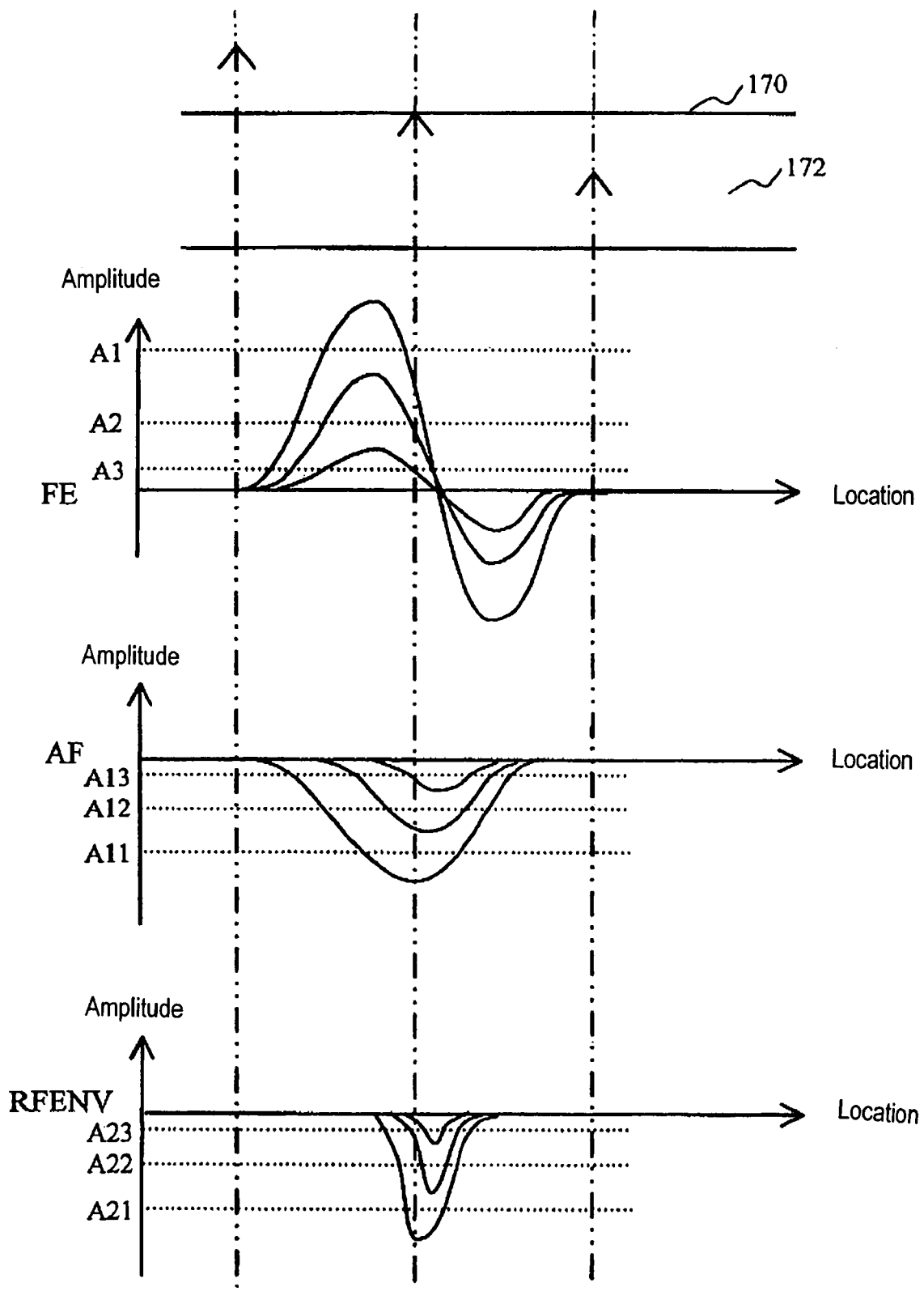
FIG. 10 shows how to recognize a given optical disc according to the first preferred embodiment.

FIG. 10 shows how to recognize a given optical disc according to this first preferred embodiment. As shown in FIG. 10, if the focal point of the light beam is shifted around the data storage layer 170, then an FE signal with an S-curved waveform will be generated. Also, the amplitude of an AF signal and that of a signal obtained by subjecting the RF signal to envelope detection (i.e., RFENV signal)

have their local maximums in the vicinity of the data storage layer 170. These waveforms change with the type of the optical disc 102.

For example, at the NA of 0.45, if the optical disc 102-1 is loaded in the optical disc drive 100, then FE, AF and RFENV signals, of which the amplitudes are greater than predetermined values A1, A11 and A21, respectively, can be obtained. On the other hand, if the optical disc 102-2 is loaded in the optical disc drive 100, then FE, AF and RFENV signals, of which the amplitudes are smaller than the predetermined values A1, A11 and A21 but greater than predetermined values A2, A12 and A22, respectively, can be obtained. Furthermore, if the optical disc 102-3 is loaded in the optical disc drive 100, then FE, AF and RFENV signals, of which the amplitudes are smaller than the predetermined values A2, A12 and A22 but greater than predetermined values A3, A13 and A23, respectively, can be obtained.

In this manner, the focal point of the light beam is shifted around the data storage layer 170 by moving the objective lens 150 substantially perpendicularly to the optical disc 102 under the control of the microcomputer 132 and a signal representing the detected portion of the reflected light from the optical disc 102 is compared with a predetermined value, thereby recognizing the type of the given optical disc 102.

In this case, the microcomputer 132 may perform the process of recognizing the given optical disc 102 by bringing the objective lens 150 away from the optical disc 102. Then, the probability of collision between the objective lens 150 and optical disc 102 can be further reduced. Alternatively, the microcomputer 132 may perform the process of recognizing the given optical disc 102 by bringing the objective lens 150 toward the optical disc 102. As another alternative, the microcomputer 132 may also perform the process of recognizing the given optical disc 102 with the light beam spot allowed to go back and forth around the data storage layer 170 a single or multiple times.

Furthermore, the microcomputer 132 may perform the process of recognizing the given optical disc 102 with or without performing a focus control on the data storage layer 170. If the microcomputer 132 performs the process of recognizing the given optical disc 102 while performing a focus control on the data storage layer 170, then the recognizer 108 to be implemented by the microcomputer 132 may recognize the type of the optical disc 102 by the TE signal.

Figure 11:
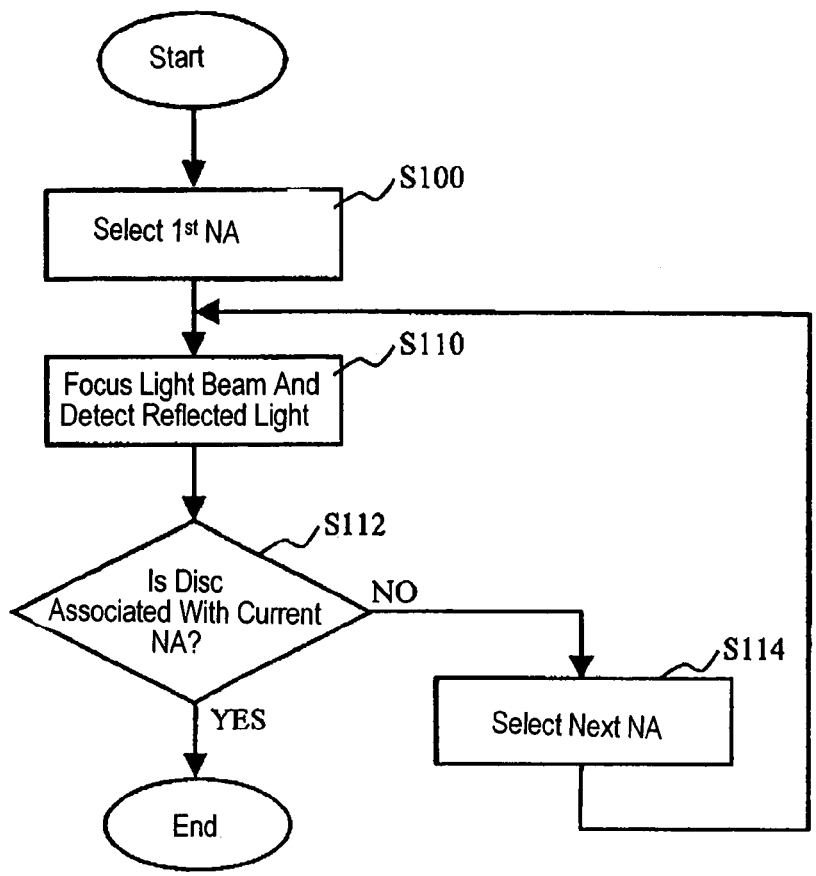
FIG. 11 is a flowchart showing the flow of the process of recognizing the type of a given optical disc with numerical apertures changed according to the first preferred embodiment.

Hereinafter, it will be described how to recognize the type of the given optical disc 102 while switching the numerical apertures. FIG. 11 is a flowchart showing the flow of the process of recognizing the type of the given optical disc 102 with the numerical apertures changed. In this optical disc type recognizing process, after Step S100 has been performed as described above, the microcomputer 132 controls the optical head set 120 such that the light beam is focused through the objective lens 150-1 onto the optical disc 102, and receives a signal representing the detected portion of the reflected light from the optical disc 102 in Step S110. More specifically, in this Step S110, the microcomputer 132 moves the objective lens 150 substantially perpendicularly to the optical disc 102, thereby outputting a control signal instructing that the focal point of the light beam be shifted around the data storage layer 170. As a result, the signal waveforms shown in FIG. 10 are obtained.

Next, in Step S112, the recognizer 108 determines, in accordance with the signal representing the reflected and detected light, whether or not the optical disc 102 loaded in the optical disc drive 100 is associated with the currently selected numerical aperture. In this case, the signal representing the reflected and detected light may be the FE signal, TE signal, AS signal, RF signal or a combination thereof. The recognizer 108 may recognize the type of the given optical disc 102 by the level of the signal representing the reflected and detected light, for example.

If the answer to the query of Step S112 is YES, then this process ends. Otherwise, the setting changer 106 controls the optical head set 120 in Step S114 such that the currently selected numerical aperture is switched into the next smallest numerical aperture, and then the process returns to Step S110. This optical disc type recognizing process is preferably carried out with the objective lens 150-1 replaced by the objective lens 150-2 and then the objective lens 150-2 replaced by the objective lens 150-3. In this manner, the type of the given optical disc 102 can be recognized more accurately with collision minimized by keeping an appropriate distance between the objective lens 150 and the optical disc 102.

In the first preferred embodiment described above, the numerical aperture of the focusing mechanism 110 for focusing the light beam on the data storage layer 170 of the given optical disc 102 is set equal to the first numerical aperture, which is the smallest of the multiple different numerical apertures, and the type of the given optical disc 102 is recognized by the first numerical aperture selected. Thus, the type of the optical disc 102 can be recognized with a sufficient distance maintained between the optical disc 102 and the focusing mechanism 110. As a result, collision between the focusing mechanism 110 and the optical disc 102 can be minimized.

Embodiment 2

Figure 12:
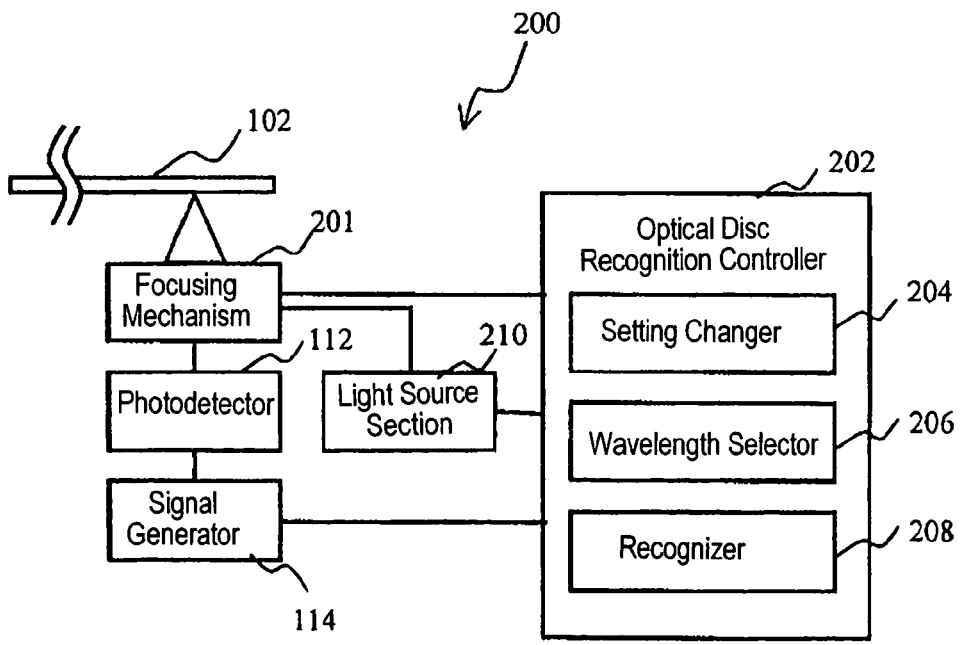
FIG. 12 is a block diagram schematically showing a configuration for an optical disc drive according to a second specific preferred embodiment of the present invention.

FIG. 12 is a block diagram schematically showing a configuration for an optical disc drive according to a second specific preferred embodiment of the present invention. In FIG. 12, any component of the optical disc drive 200, having the same function as the counterpart of the optical disc drive 100 of the first preferred embodiment described above, is identified by the same reference numeral as that used in FIG. 2. The optical disc drive 200 of this second preferred embodiment preferably includes a focusing mechanism 201, the photodetector 112, the signal generator 114, a light source section 210, and an optical disc recognition controller 202.

The light source section 210 preferably outputs a selected one of multiple light beams with mutually different wavelengths. For example, the light source section 210 may mechanically switch a plurality of light sources that emit light beams with mutually different wavelengths. Alternatively, the light source section 210 may include a plurality of light sources that emit light beams with mutually different wavelengths and a plurality of polarization beam splitters that guide those light beams to the focusing mechanism 201. Furthermore, the light source section 210 may also be a two-wavelength laser diode, a three-wavelength laser diode, a multi-wavelength laser diode or a variable-wavelength laser diode for emitting light beams with multiple wavelengths.

The multiple different wavelengths preferably include at least one of the ranges of 400 nm to 410 nm, 645 nm to 660 nm, and 775 nm to 795 nm. Alternatively, the multiple different wavelengths may include at least one of the ranges of 405+5 nm to 405−5 nm, 650+5 nm to 650−5 nm, and 780+10 nm to 780−10 nm. As another alternative, the multiple different wavelengths may also fall within any other range.

The focusing mechanism 201 preferably focuses the light beam, emitted from the light source section 210, on the data storage layer 170 of the optical disc 102 and may include an optical lens (e.g., an objective lens) as the focusing mechanism 110 of the first preferred embodiment described above. The numerical aperture of the focusing mechanism 201 is preferably switchable. The numerical apertures may be switched by changing the objective lenses or compensators to pass the light beam. Alternatively, the numerical apertures may also be switched mechanically as well. Also, the numerical apertures may be switched independently of wavelength switching of the light beam. Furthermore, the focusing mechanism 201 preferably guides the reflected light from the optical disc 102 to the photodetector 112. For example, the optical pickup disclosed in Japanese Laid-Open Publication No. 8-138261 may be used as the focusing mechanism 201.

The optical disc recognition controller 202 preferably includes a setting changer 204, a wavelength selector 206 and a recognizer 208. The setting changer 204 preferably operates just like the setting changer 106 of the first preferred embodiment so as to output a control signal that defines the numerical aperture of the focusing mechanism 201. This control operation of defining the numerical aperture of the focusing section 201 may be carried out separately from the control operation of setting the wavelength of the light beam. The recognizer 208 preferably operates just like the recognizer 108 of the first preferred embodiment, thereby determining whether or not the given optical disc 102 is associated with the selected numerical aperture and wavelength.

If the setting changer 204 sets the numerical aperture of the focusing mechanism 201 equal to the first numerical aperture, then the wavelength selector 206 preferably controls the light source section 210 such that the wavelength of the light beam emitted from the light source section 210 is set equal to a first wavelength, which is the longest of the multiple different wavelengths. Alternatively, the wavelength selector 206 may also control the light source section 210 such that the wavelength of the light beam emitted from the light source section 210 is set equal to a second wavelength, which is longer than at least one of the multiple different wavelengths. The second wavelength may or may not be included in the multiple different wavelengths. Optionally, the wavelength selector 206 may sequentially select one of the multiple different wavelengths after another in the descending order (i.e., the longest wavelength first).

Figure 13:
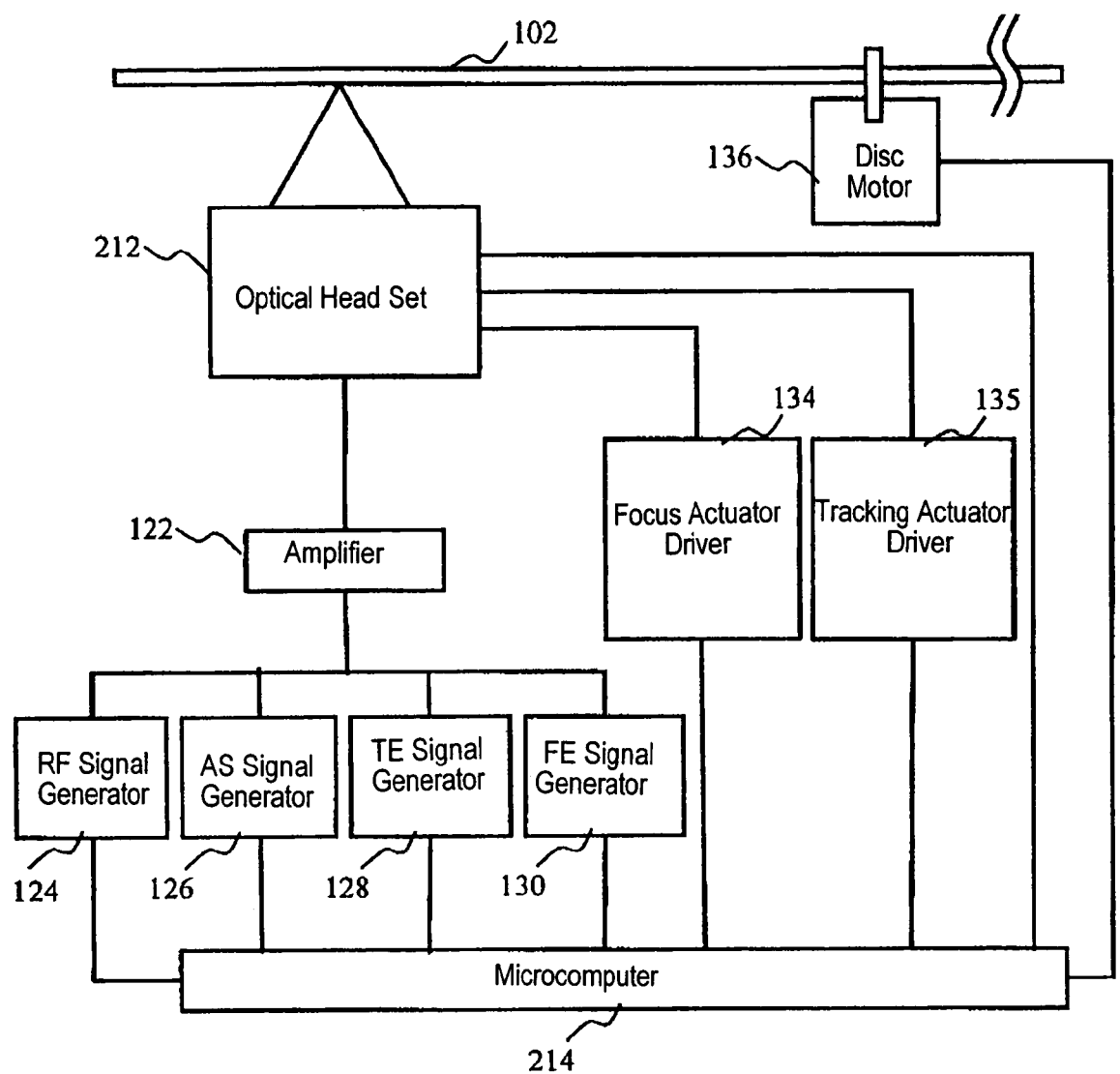
FIG. 13 is a block diagram showing an exemplary detailed configuration for the optical disc drive shown in FIG. 12.

FIG. 13 is a block diagram showing a more detailed configuration for the optical disc drive 200 shown in FIG. 12. In FIG. 13, any component of the optical disc drive 200, having the same function as the counterpart of the optical disc drive 100 of the first preferred embodiment described above, is identified by the same reference numeral as that used in FIG. 3. As shown in FIG. 13, the optical disc drive 200 preferably includes a optical head set 212, an amplifier 122, an RF signal generator 124, an AS signal generator 126, a TE signal generator 128, an FE signal generator 130, a microcomputer 214, a focus actuator driver 134, a tracking actuator driver 135 and a disc motor 136.

The microcomputer 214 preferably has almost the same configuration, and operates substantially in the same way, as the microcomputer 132 of the first preferred embodiment described above. However, unlike the microcomputer 132 of the first preferred embodiment, the microcomputer 214 of the second preferred embodiment preferably performs not only the process of setting the numerical aperture but also the process of selecting the wavelength of the light beam.

The optical head set 212 preferably operates substantially in the same way as the optical head set 120 of the first preferred embodiment described above. However, this optical head set 212 preferably switches the wavelengths of the light beam separately from the numerical apertures.

Figure 14:
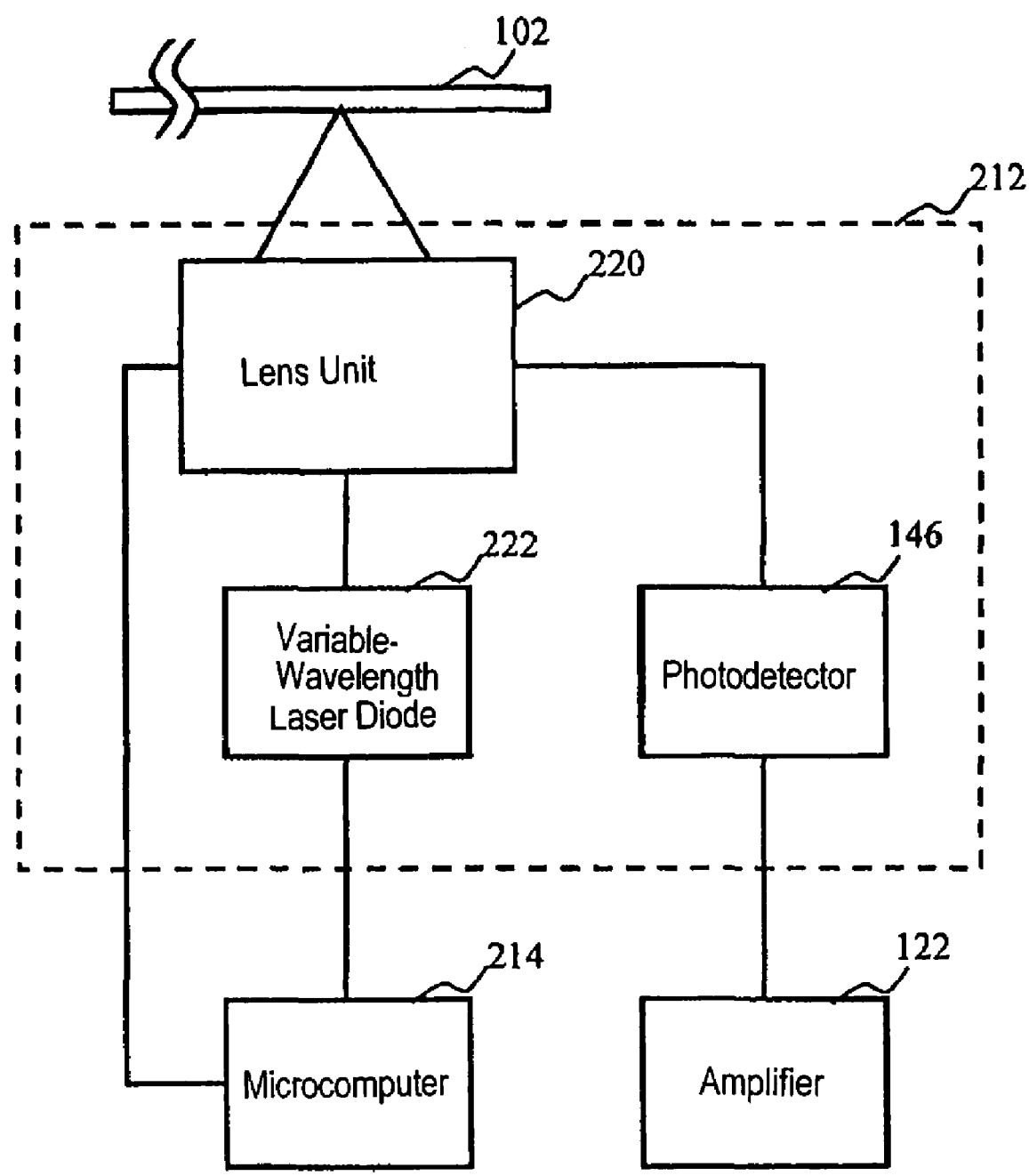
FIG. 14 is a block diagram showing a detailed configuration for the optical head set shown in FIG. 13.

FIG. 14 is a block diagram showing an exemplary configuration for the optical head set 212 shown in FIG. 13. In FIG. 14, any component of the optical head set 212, having the same function as the counterpart of the optical head set 120 of the first preferred embodiment described above, is identified by the same reference numeral as that used in FIG. 4. The optical head set 212 preferably includes a lens unit 220, a variable-wavelength laser diode 222, and the photodetector 146. The lens unit 220 is preferably designed so as to switch the numerical apertures. Also, the lens unit 220 preferably focuses the light beam, emitted from the variable-wavelength laser diode 222, on the data storage layer 170 of the optical disc 102. Furthermore, the lens unit 220 preferably guides the reflected light from the optical disc 102 onto the photodetector 146.

The variable-wavelength laser diode 222 can change the wavelength of the light beam to be emitted. For example, the variable-wavelength laser diode 222 may emit a laser beam with a wavelength of 405+5 nm to 405−5 nm, a wavelength of 645 nm to 660 nm, a wavelength of 650+5 nm to 650−5 nm, a wavelength of 775 nm to 795 nm or a wavelength of 780+10 nm to 780−10 nm. The switching of numerical apertures and switching of light beam wavelengths are preferably controlled by the microcomputer 214. The lens unit 220 is equivalent to the focusing mechanism 201 shown in FIG. 12. The variable-wavelength laser diode 222 corresponds to the light source section 210 shown in FIG. 12. And the microcomputer 214 functions as the optical disc recognition controller 202 shown in FIG. 12.

Figure 15A:
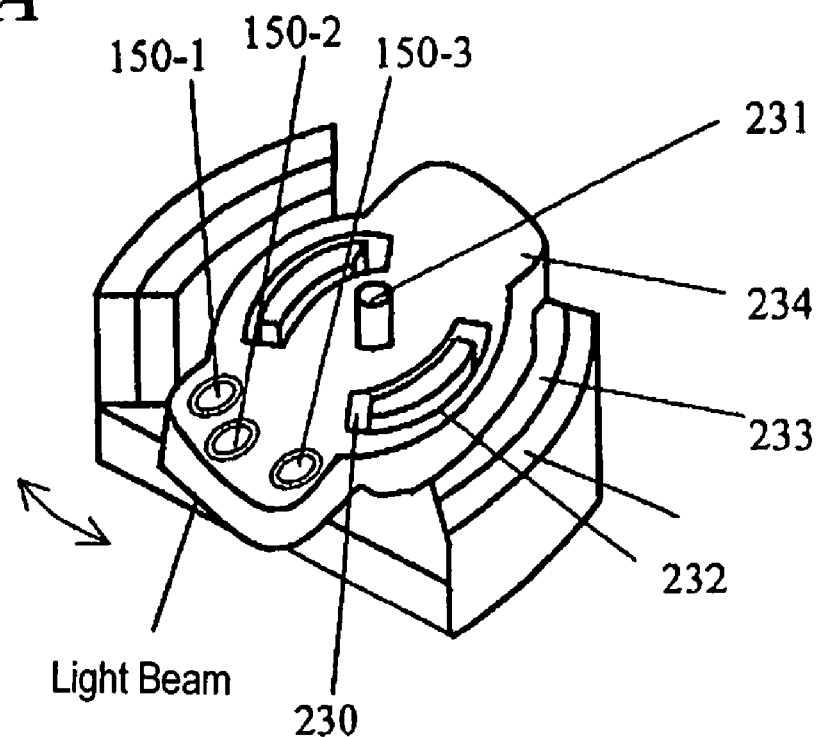
FIGS. 15A and 15B are respectively a perspective view and a plan view illustrating a configuration for the lens unit shown in FIG. 14.
Figure 15B:
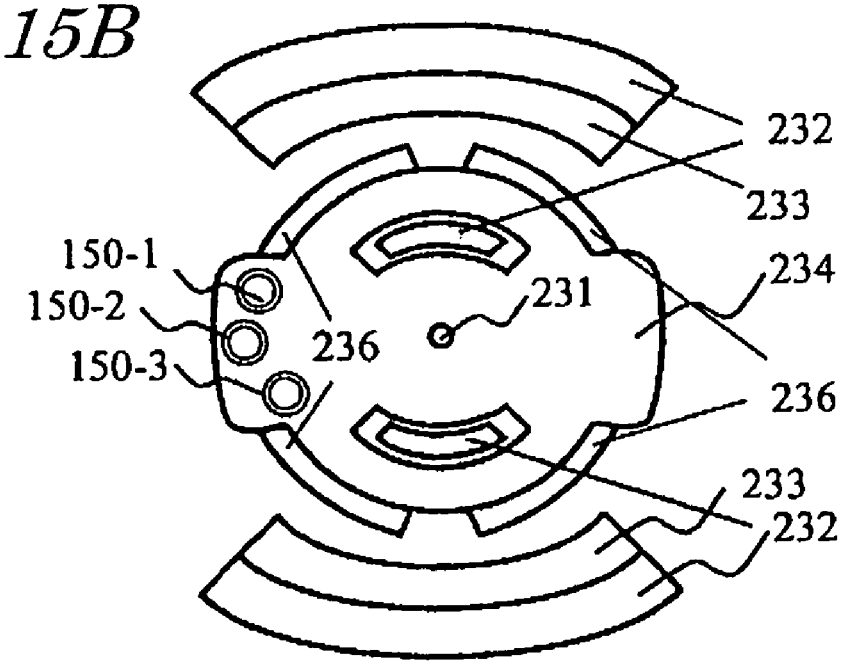

FIGS. 15A and 15B are respectively a perspective view and a plan view illustrating an exemplary configuration for the lens unit 220 shown in FIG. 14. In FIGS. 15A and 15B, any component of the lens unit 220, having the same function as the counterpart of the first preferred embodiment described above, is identified by the same reference numeral as that used in FIG. 5. As shown in FIGS. 15A and 15B, the lens unit 220 preferably includes a holder 234, a plurality of objective lenses 150-1, 150-2 and 150-3, a shaft 231, yokes 232, a focus coil 230 and a tracking coil 236. The holder 234 is preferably provided so as to rotate freely around the shaft 231. The objective lenses 150-1, 150-2 and 150-3, arranged on the holder 234, are preferably switched as the holder 234 rotates to a predetermined angle. The number of the objective lenses included in this lens unit 220 is not particularly limited but may be two, four or more.

The yokes 232 are arranged inside of the openings of the holder 234 and outside of the holder 234. Two magnets 233 are arranged inside of the outer yokes 232 such that the same magnetic poles face each other. The focus coil 230 is preferably wound, and the flat tracking coil 236 is provided, under the holder 234. A magnetic circuit, made up of the focus coil 230, tracking coil 236, magnets 233 and yokes 232, preferably shifts the objective lenses 150-1, 150-2 and 150-3 both vertically and horizontally with respect to the optical disc 102. Also, this magnetic circuit preferably rotates the holder 234 to a predetermined angle, thereby switching the objective lenses to be used.

Hereinafter, it will be described with reference to FIGS. 16 and 17 how the optical disc drive 200 of this second preferred embodiment operates.

Figure 16:
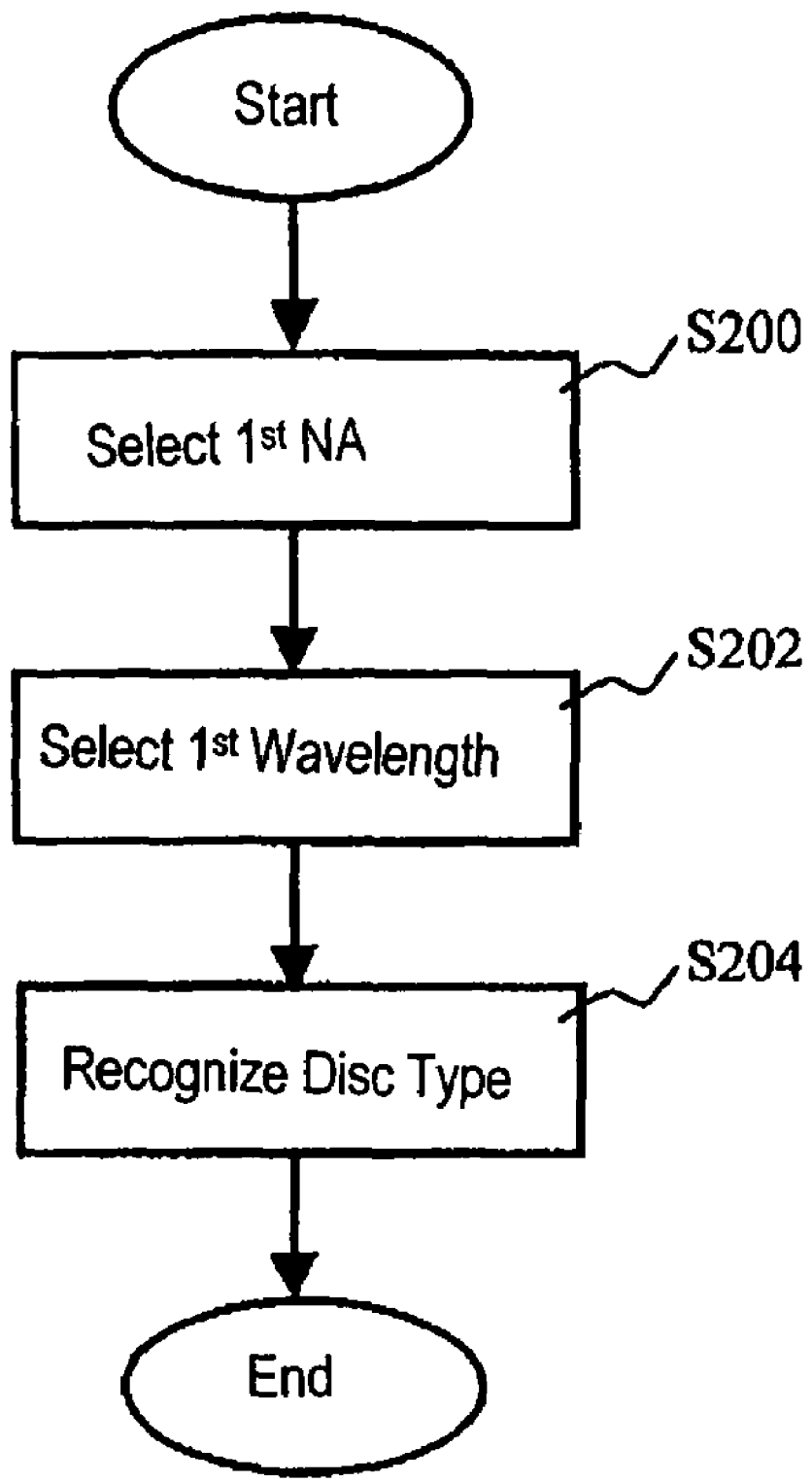
FIG. 16 is a flowchart showing the flow of an optical disc type recognizing process according to the second preferred embodiment.
Figure 17:
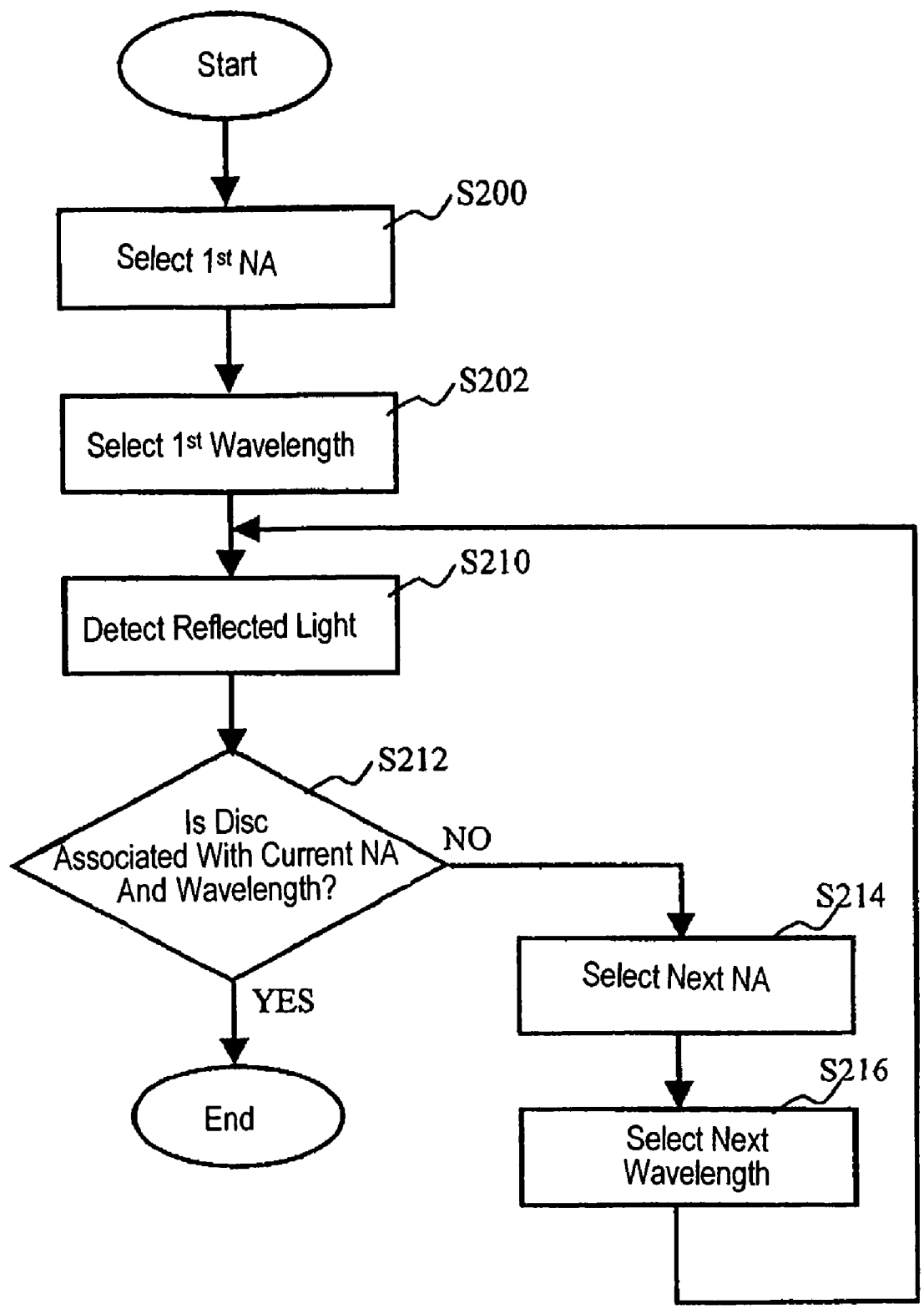
FIG. 17 is a flowchart showing the flow of the process of recognizing the type of a given optical disc with numerical apertures and wavelengths changed according to the second preferred embodiment.

FIG. 16 is a flowchart showing the flow of the optical disc type recognizing process of this second preferred embodiment. In this optical disc type recognizing process, first, in Step S200, the setting changer 204 to be implemented by the microcomputer 214 preferably outputs a control signal that sets the numerical aperture of the objective lens 150-1, 150-2 or 150-3 equal to a first numerical aperture. The setting changer 204 preferably controls the lens unit 220 so as to select the objective lens 150-1 with the smallest, first numerical aperture among the three objective lenses 150-1, 150-2 and 150-3 shown in FIGS. 15A and 15B. In accordance with the control signal supplied from the setting changer 204, the lens unit 220 preferably arranges the objective lens 150-1 at a predetermined position.

Next, in Step S202, the wavelength selector 206 to be implemented by the microcomputer 214 preferably outputs a control signal that sets the wavelength of the light beam equal to the first wavelength. That is to say, the wavelength selector 206 preferably controls the variable-wavelength laser diode 222 such that the laser diode 222 outputs a light beam with the first wavelength. In accordance with the control signal supplied from the wavelength selector 206, the variable-wavelength laser diode 222 preferably outputs a light beam with the first wavelength. Subsequently, in Step S204, the recognizer 208 to be implemented by the microcomputer 214 preferably recognizes the type of the given optical disc 102 by the first numerical aperture and first wavelength that have been selected in Steps S200 and S202, respectively.

The recognizer 208 preferably receives a signal representing the detected portion of the reflected light from the optical disc 102, on which the light beam has been focused by way of the objective lens 150-1 shown in FIGS. 15A and 15B, for example, and preferably recognizes the type of the optical disc 102 in accordance with that signal. The recognizer 208 may recognize the type of the given optical disc 102 by the FE signal, TE signal, AS signal, RF signal or a combination thereof. The recognizer 208 may recognize all types of optical discs 102 either by the first numerical aperture and the first wavelength or by switching the numerical apertures and wavelengths. Optionally, Steps S200 and S202 may be carried out in reverse order.

Hereinafter, it will be described how to recognize the type of the given optical disc 102 while switching the numerical apertures and wavelengths. FIG. 17 is a flowchart showing the flow of the process of recognizing the type of the given optical disc 102 with the numerical apertures and wavelengths changed. In this optical disc type recognizing process, after Step S202 has been performed as described above, the microcomputer 214 receives a signal representing the detected portion of the reflected light from the optical disc 102 in Step S210.

More specifically, in this Step S210, the microcomputer 214 moves the objective lens 150 substantially perpendicularly to the optical disc 102, thereby outputting a control signal instructing that the focal point of the light beam be shifted around the data storage layer 170. As a result, the signal waveforms shown in FIG. 10 are obtained. In this process step, the microcomputer 214 may recognize the type of the given optical disc 102 by bringing the objective lens 150 either away from, or toward, the optical disc 102.

As another alternative, the microcomputer 214 may also perform the process of recognizing the given optical disc 102 with the light beam spot allowed to go back and forth around the data storage layer 170 a single or multiple times. Furthermore, the microcomputer 214 may perform the process of recognizing the given optical disc 102 with or without performing a focus control on the data storage layer 170. Also, in this Step S210, the photodetector 146 preferably detects the reflected light and the RF signal generator 124, AS signal generator 126, TE signal generator 128 and FE signal generator 130 preferably output respective signals representing the detected portion of the reflected light.

Next, in Step S212, the recognizer 208 determines, in accordance with the signal representing the reflected and detected light, whether or not the optical disc 102 loaded in the optical disc drive 200 is associated with the currently selected numerical aperture and wavelength. If the answer to the query of Step S212 is YES, then this process ends. Otherwise, the setting changer 204 preferably controls the lens unit 220 in Step S214 such that the currently selected numerical aperture is switched into the next smallest numerical aperture.

Next, in Step S216, the wavelength selector 206 preferably controls the variable-wavelength laser diode 222 such that the laser diode 222 outputs a light beam with the currently selected wavelength switched into the next longest wavelength, and then the process returns to Step S210. In this optical disc type recognizing process, the given optical disc is preferably recognized with an NA of 0.45 and an infrared ray selected first, an NA of 0.6 and an infrared ray selected next, and then an NA of 0.85 and a light beam with a wavelength equal to or shorter than that of a blue ray selected last. In this manner, the type of the given optical disc 102 can be recognized more accurately with collision minimized by keeping an appropriate distance between the objective lens 150 and the optical disc 102. It should be noted that Steps S214 and S216 may be carried out in reverse order.

In the preferred embodiment described above, the optical disc recognition controller 202 preferably recognizes the type of the given optical disc 102 with both the numerical apertures and wavelengths switched. Alternatively, the optical disc recognition controller 202 may recognize the given optical disc 102 without switching the wavelengths. For example, the optical disc recognition controller 202 may perform the process of recognizing the given optical disc 102 with the wavelength of the variable-wavelength laser diode 222 kept equal to the first wavelength and with the numerical apertures changed. Then, erroneous short wave beam irradiation on the optical disc 102 can be reduced and the information stored on the optical disc 102 can be protected.

As described above, according to this second preferred embodiment, the optical disc 102 can be recognized with the light source section 210 at the first wavelength and the focusing mechanism 201 at the first numerical aperture combined. Thus, a sufficient distance can be maintained between the optical disc 102 and the focusing mechanism 201, and therefore, collision between the focusing mechanism 201 and the optical disc 102 can be minimized.

Embodiment 3

Figure 18:
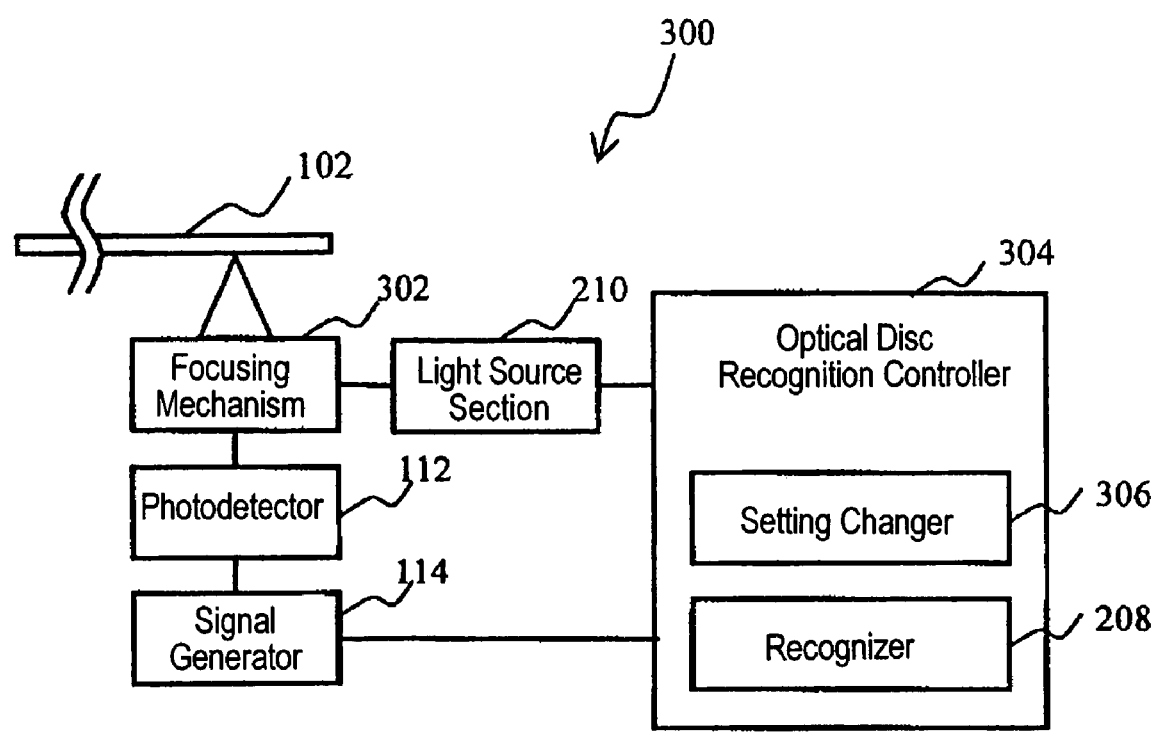
FIG. 18 is a block diagram schematically showing a configuration for an optical disc drive according to a third specific preferred embodiment of the present invention.

FIG. 18 is a block diagram schematically showing a configuration for an optical disc drive according to a third specific preferred embodiment of the present invention. In FIG. 18, any component of the optical disc drive 300, having the same function as the counterpart of the optical disc drive 200 of the second preferred embodiment described above, is identified by the same reference numeral as that used in FIG. 12. The optical disc drive 300 of this third preferred embodiment preferably includes a focusing mechanism 302, the photodetector 112, the signal generator 114, the light source section 210, and an optical disc recognition controller 304. The focusing mechanism 302 preferably focuses the light beam, emitted from the light source section 210, onto the data storage layer 170 of the optical disc 102. The numerical aperture of the focusing mechanism 302 changes with the wavelength of the light beam to be focused. For example, a wavelength selective aperture and an objective lens as disclosed in Ryuichi Katayama, "Optical Head Compatible with Blu Ray Disc, DVD and CD", Oyo Butsuri, a monthly publication of the Japan Society of Applied Physics, August 2002, pp. 19-23, may be used as the focusing mechanism 302.

The optical disc recognition controller 304 preferably includes a setting changer 306 and the recognizer 208. The setting changer 306 preferably sets the wavelength of the light beam to be emitted from the light source section 210 equal to the first wavelength, thereby setting the numerical aperture of the focusing mechanism 302 equal to the first numerical aperture. That is to say, the setting changer 306 preferably controls the light source section 210 such that the light source section 210 outputs a light beam with the first wavelength, thereby setting the numerical aperture of the focusing mechanism 302 equal to the first numerical aperture. Alternatively, the setting changer 306 may also sequentially select one of the multiple different wavelengths after another in the descending order (i.e., beginning with the longest one) so as to sequentially select one of the multiple numerical apertures after another in the ascending order (i.e., beginning with the smallest one).

Figure 19:
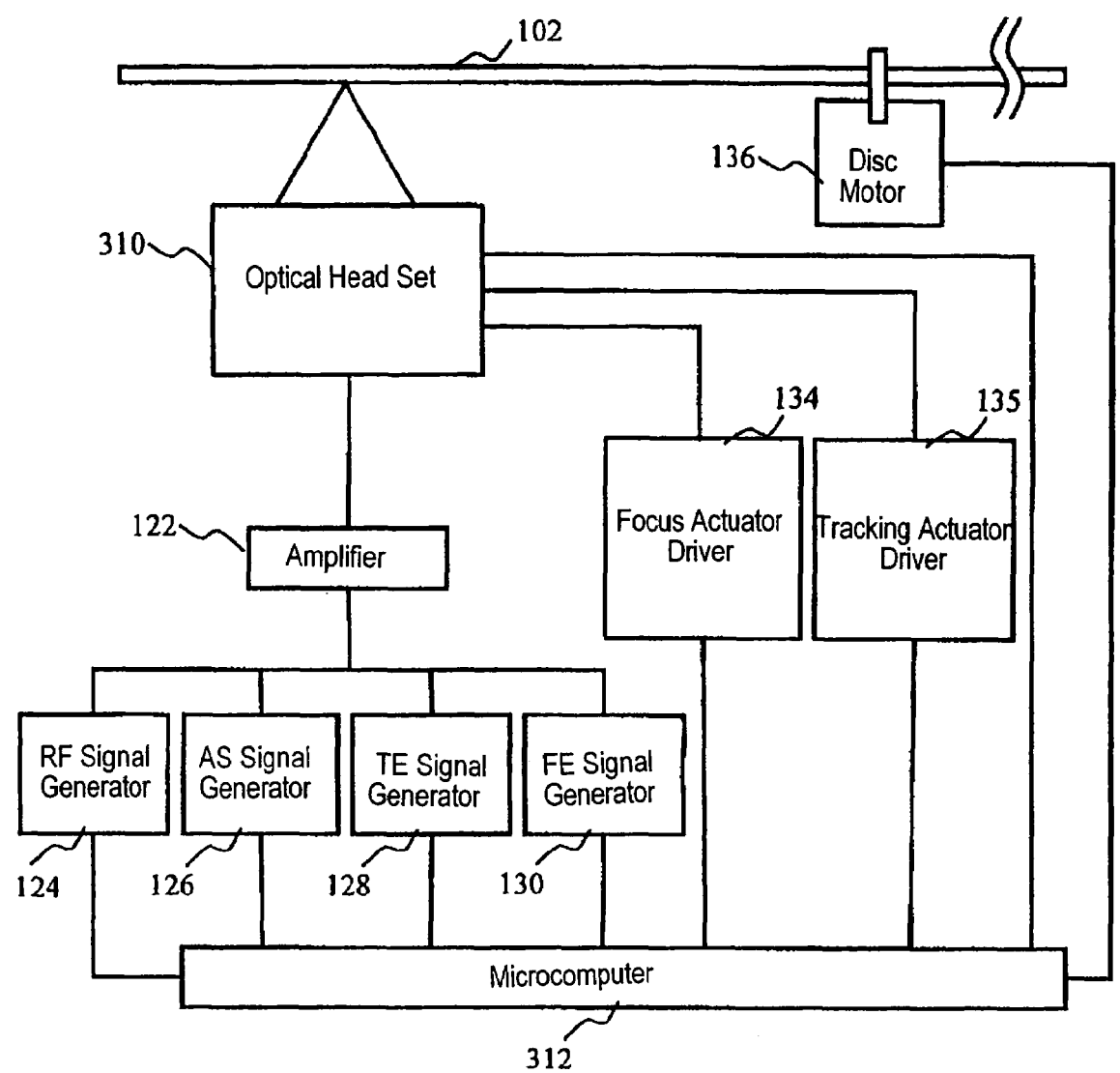
FIG. 19 is a block diagram showing an exemplary detailed configuration for the optical disc drive shown in FIG. 18.

FIG. 19 is a block diagram showing a more detailed configuration for the optical disc drive 300 shown in FIG. 18. In FIG. 19, any component of the optical disc drive 300, having the same function as the counterpart of the optical disc drive 200 of the second preferred embodiment described above, is identified by the same reference numeral as that used in FIG. 13. As shown in FIG. 19, the optical disc drive 300 preferably includes an optical head set 310, an amplifier 122, an RF signal generator 124, an AS signal generator 126, a TE signal generator 128, an FE signal generator 130, a microcomputer 312, a focus actuator driver 134, a tracking actuator driver 135 and a disc motor 136.

The microcomputer 312 preferably has almost the same configuration, and operates substantially in the same way, as the microcomputer 214 of the second preferred embodiment described above. However, unlike the microcomputer 214 of the second preferred embodiment, the microcomputer 312 of the third preferred embodiment preferably performs the process of setting the numerical aperture by performing the process of selecting the wavelength of the light beam. The optical head set 310 preferably operates substantially in the same way as the optical head set 212 of the second preferred embodiment described above. However, this optical head set 310 preferably selects the numerical aperture according to the wavelength of the light beam.

Figure 20:
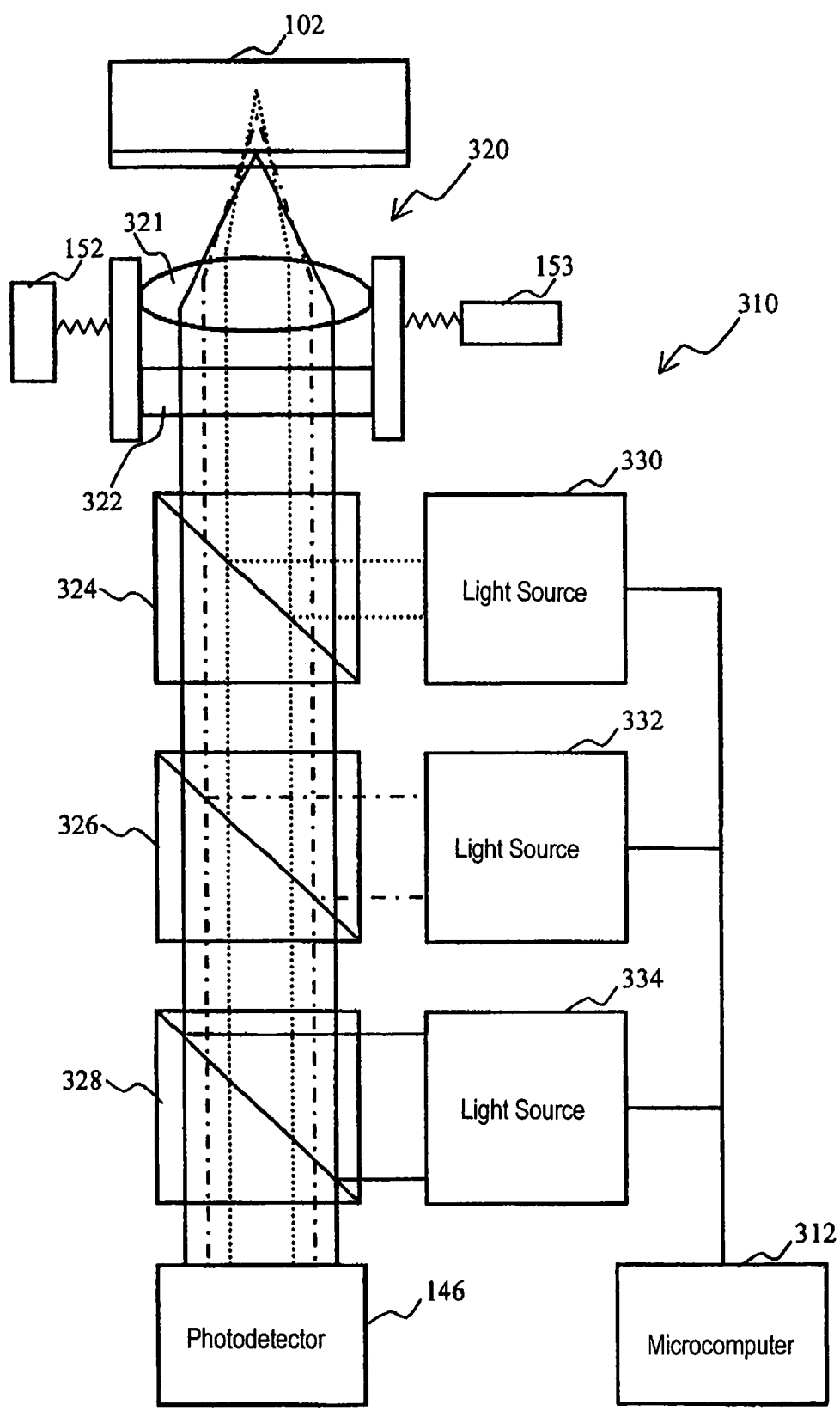
FIG. 20 is a block diagram showing a detailed configuration for the optical head set shown in FIG. 19.

FIG. 20 is a block diagram showing an exemplary configuration for the optical head set 310 shown in FIG. 19. In FIG. 20, any component of the optical head set 310, having the same function as the counterpart of the optical head set 212 of the second preferred embodiment described above, is identified by the same reference numeral as that used in FIG. 14. The optical head set 310 preferably includes a compound objective lens 320, the focus actuator 152, the tracking actuator 153, polarization beam splitters 324, 326 and 328 and light sources 330, 332 and 334. The light sources 330, 332 and 334 preferably emit light beams with respectively different wavelengths. Under the control of the microcomputer 312, one of these multiple light sources 330, 332 and 334 selectively outputs a light beam. The number of light sources included in the optical head set 310 is not particularly limited but may be two, four or more. Any of these light sources 330, 332 and 334 may output a light beam with the same wavelength as that emitted from the variable-wavelength laser diode 222 of the second preferred embodiment described above.

The polarization beam splitters 324, 326 and 328 preferably reflect the light beams, emitted from the light sources 330, 332 and 334, respectively, toward the compound objective lens 320. Also, the polarization beam splitters 324, 326 and 328 preferably transmit the light that has come through the compound objective lens 320. The photodetector 146 preferably receives the light that was reflected from the optical disc 102 and then transmitted through the compound objective lens 320 and polarization beam splitters 324, 326 and 328. The focus actuator 152 preferably moves the compound objective lens 320 substantially perpendicularly to the optical disc 102. On the other hand, the tracking actuator 153 preferably moves the compound objective lens 320 substantially parallel to the optical disc 102.

The compound objective lens 320 preferably focuses the light beam on the data storage layer 170 of the optical disc 102 and preferably consists of a convergent lens 321 and a wavelength-selective aperture 322, which may be combined together. As shown in FIGS. 21A, 21B, 22A and 22B, the wavelength selective aperture 322 preferably includes either a hologram or a relief in part or all of the area through which the light beam passes. Such a hologram or relief is preferably provided concentrically around the optical axis. The area of the wavelength selective aperture 322, through which the light beam passes, is preferably divided into multiple concentric areas, which are associated with respective numerical apertures.

In such a structure, the numerical aperture of the compound objective lens 320 changes with the wavelength of the light beam to be transmitted. For example, if a light beam with a wavelength of 400 nm to 410 nm needs to be transmitted, then the compound objective lens 320 preferably has a numerical aperture of 0.85+0.01 to 0.85−0.01. Also, if a light beam with a wavelength of 645 nm to 660 nm or 650+5 nm to 650−5 nm needs to be transmitted, then the compound objective lens 320 preferably has a numerical aperture of 0.6+0.01 to 0.6−0.01. Furthermore, if a light beam with a wavelength of 775 nm to 795 nm needs to be transmitted, then the compound objective lens 320 preferably has a numerical aperture of 0.50+0.01 to 0.50−0.01. Furthermore, if a light beam with a wavelength of 780+10 nm to 780−10 nm needs to be transmitted, then the compound objective lens 320 preferably has a numerical aperture of 0.45+0.01 to 0.45−0.01.

Optionally, the lens unit 220 shown in FIGS. 15A and 15B may be provided for this optical head set 310. In that case, the lens unit 220 may include multiple different types of compound objective lenses 320 such that those objective lenses 320 are selectively used one after another. As another alternative, the lens unit 220 may include one or a plurality of compound objective lenses 320 and one or a plurality of objective lenses 150 such that those lenses are selectively used one after another.

For example, a compound objective lens 320 with a numerical aperture of 0.85+0.01 to 0.85−0.01, another compound objective lens 320 with a numerical aperture of 0.6+0.01 to 0.6−0.01, and an objective lens 150 with a numerical aperture of 0.50+0.01 to 0.50−0.01 or 0.45+0.01 to 0.45−0.01 may be provided for the lens unit 220 so as to be used selectively. Alternatively, an objective lens 150 with a numerical aperture of 0.85+0.01 to 0.85−0.01, a compound objective lens 320 with a numerical aperture of 0.50+0.01 to 0.50−0.01 or 0.45+0.01 to 0.45−0.01 and another compound objective lens 320 with a numerical aperture of 0.6+0.01 to 0.6−0.01 may be provided for the lens unit 220 so as to be used selectively.

The light sources 330, 332 and 334 correspond to the light source section 210 shown in FIG. 18. The compound objective lens 320 is equivalent to the focusing mechanism 302 shown in FIG. 18. And the microcomputer 312 functions as the optical disc recognition controller 304 shown in FIG. 18.

Figure 24:
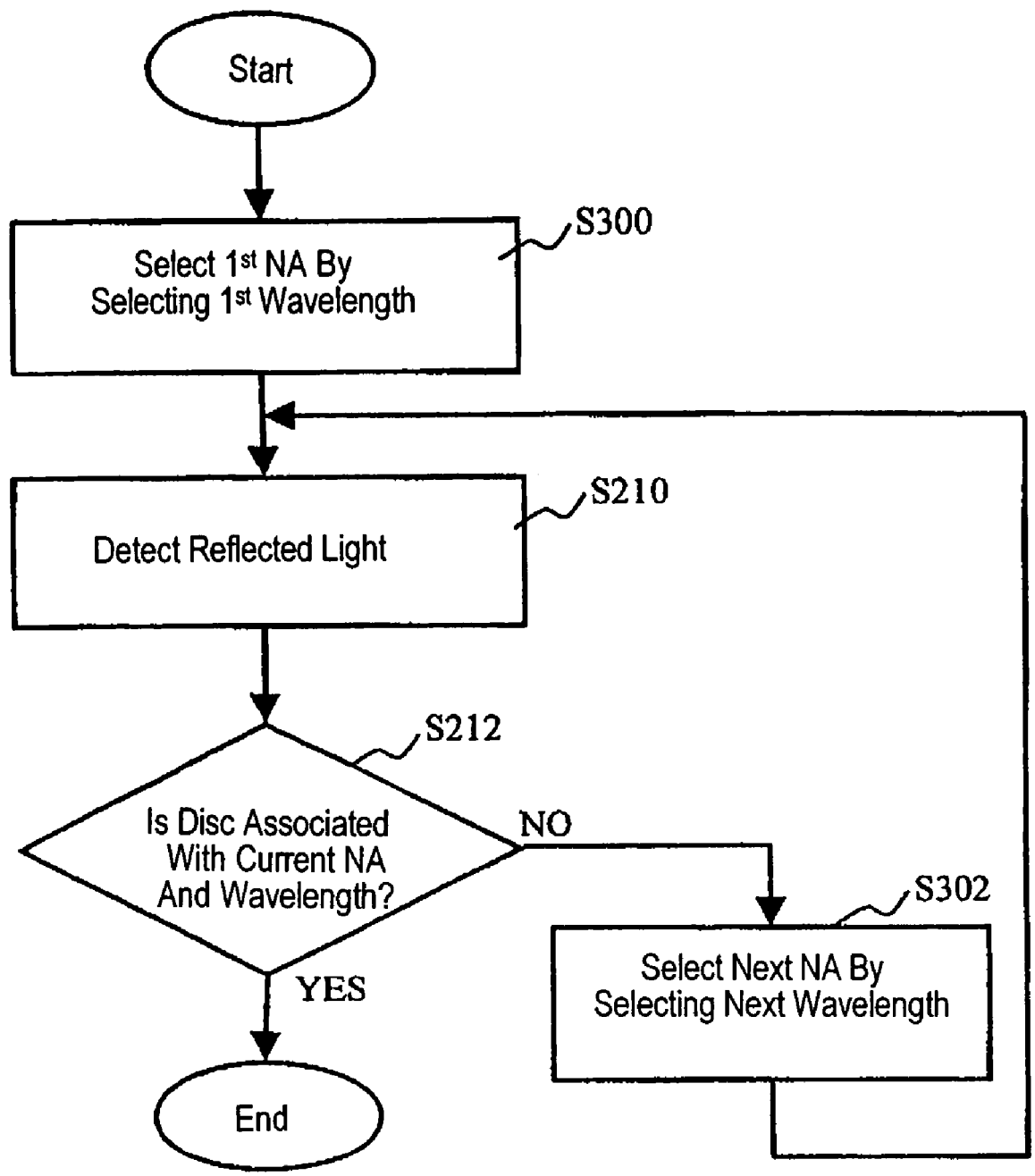
FIG. 24 is a flowchart showing the flow of the process of recognizing the type of a given optical disc with numerical apertures and wavelengths changed according to the third preferred embodiment.

Hereinafter, it will be described with reference to FIGS. 23 and 24 how the optical disc drive 300 of this third preferred embodiment operates. FIG. 23 is a flowchart showing the flow of the optical disc type recognizing process of this third preferred embodiment. In FIG. 23, any process step equivalent to the counterpart of the process of the second preferred embodiment described above is identified by the same reference numeral as that used in FIG. 16. In this optical disc type recognizing process, first, in Step S300, the setting changer 306 to be implemented by the microcomputer 312 preferably outputs a control signal that sets the numerical aperture of the compound objective lens 320 equal to a first numerical aperture by setting the wavelength of the light beam to be emitted equal to a first wavelength, and then the process advances to the next step S204. In Step S204, the microcomputer 312 preferably controls the optical head set 310 such that a selected one of the light sources 330, 332 and 334 outputs the light beam.

Hereinafter, it will be described how to recognize the type of the given optical disc 102 while switching the numerical apertures and wavelengths. FIG. 24 is a flowchart showing the flow of the process of recognizing the type of the given optical disc 102 with the numerical apertures and wavelengths changed. In FIG. 24, any process step equivalent to the counterpart of the process of the second preferred embodiment described above is identified by the same reference numeral as that used in FIG. 17. In this optical disc type recognizing process, after Step S300 has been performed as described above, Steps S210 and S212 are performed. In Step S212, if the optical disc 102 loaded in the optical disc drive 300 is associated with the currently selected numerical aperture and wavelength, then the process ends.

Otherwise (i.e., if the answer to the query of Step S212 is NO), the setting changer 306 preferably controls the optical head set 310 in Step S302 such that the numerical aperture of the compound objective lens 320 is switched into the next smallest one by changing the currently selected wavelength into the next longest wavelength, and then the process returns to Step S210.

As described above, according to this third preferred embodiment, the optical disc 102 can be recognized with the numerical aperture of the focusing mechanism 302 set equal to the first numerical aperture by setting the wavelength of the light beam to be emitted from the light source section 302 equal to the first wavelength. Thus, a sufficient distance can be maintained between the optical disc 102 and the focusing mechanism 302, and therefore, collision between the focusing mechanism 302 and the optical disc 102 can be minimized.

Embodiment 4

Figure 25:
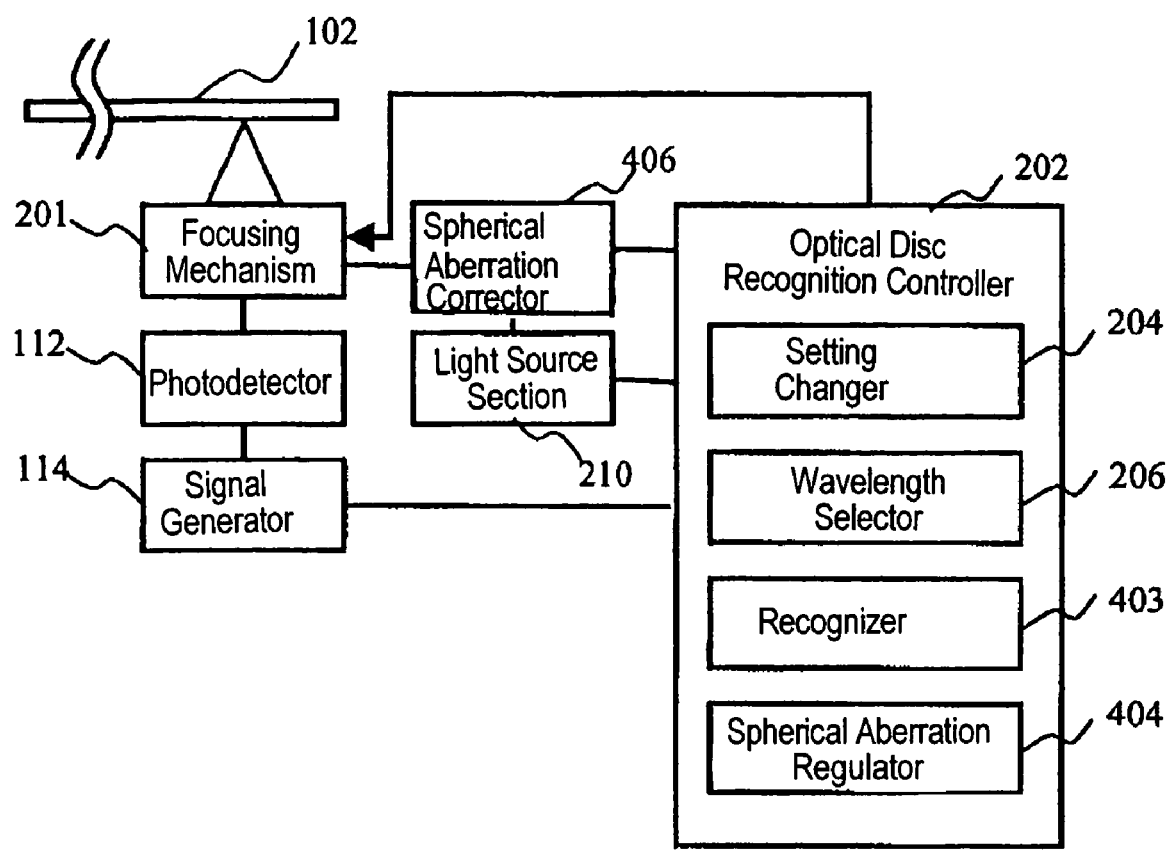
FIG. 25 is a block diagram schematically showing a configuration for an optical disc drive according to a fourth specific preferred embodiment of the present invention.

FIG. 25 is a block diagram schematically showing a configuration for an optical disc drive according to a fourth specific preferred embodiment of the present invention. In FIG. 25, any component of the optical disc drive 400, having the same function as the counterpart of the optical disc drive 200 of the second preferred embodiment described above, is identified by the same reference numeral as that used in FIG. 12. The optical disc drive 400 of this fourth preferred embodiment preferably includes the focusing mechanism 201, the photodetector 112, the signal generator 114, the light source section 210, an optical disc recognition controller 402 and a spherical aberration corrector 406. The optical disc recognition controller 402 preferably includes the setting changer 204, the wavelength selector 206, a recognizer 403 and a spherical aberration regulator 404.

The spherical aberration corrector 406 preferably corrects a spherical aberration produced in the light beam spot on the data storage layer 170 of the optical disc 102. The spherical aberration corrector 406 is preferably provided on the optical path between the light source section 210 and the focusing mechanism 201. Under the control of the spherical aberration regulator 404, the spherical aberration corrector 406 preferably changes the magnitude of correction to be made on the spherical aberration. The spherical aberration corrector 406 may have any configuration. For example, the spherical aberration corrector 406 may include a spherical aberration correcting lens or a liquid crystal panel in which inside and outside transmittances are different from each other.

Multiple types of optical discs 102 to be recognized preferably include light beam passage layers 172 with mutually different thicknesses to transmit the light beam. If the setting changer 204 sets the numerical aperture of the focusing mechanism 201 equal to a first numerical aperture, then the spherical aberration regulator 404 preferably outputs a control signal that sets the magnitude of correction to be made by the spherical aberration corrector 406 equal to a first correction value corresponding to the maximum one of the multiple thicknesses of the light beam passage layers 172. Alternatively, the spherical aberration regulator 404 may also set the magnitude of correction to be made by the spherical aberration corrector 406 equal to a second correction value corresponding to one light beam passage layer 172 that is thicker than at least one of the other light beam passage layers 172.

The second correction value may or may not correspond to any of the multiple different thicknesses. Also, the spherical aberration regulator 404 may also sequentially select spherical aberration correction values in the order of the thicknesses (i.e., a spherical aberration correction value corresponding to the thickest layer first). The recognizer 403 preferably operates just in the same way as the recognizer 208 of the second preferred embodiment described above, thereby determining whether or not the given optical disc 102 is associated with the currently selected numerical aperture, wavelength and spherical aberration correction value.

Figure 26:
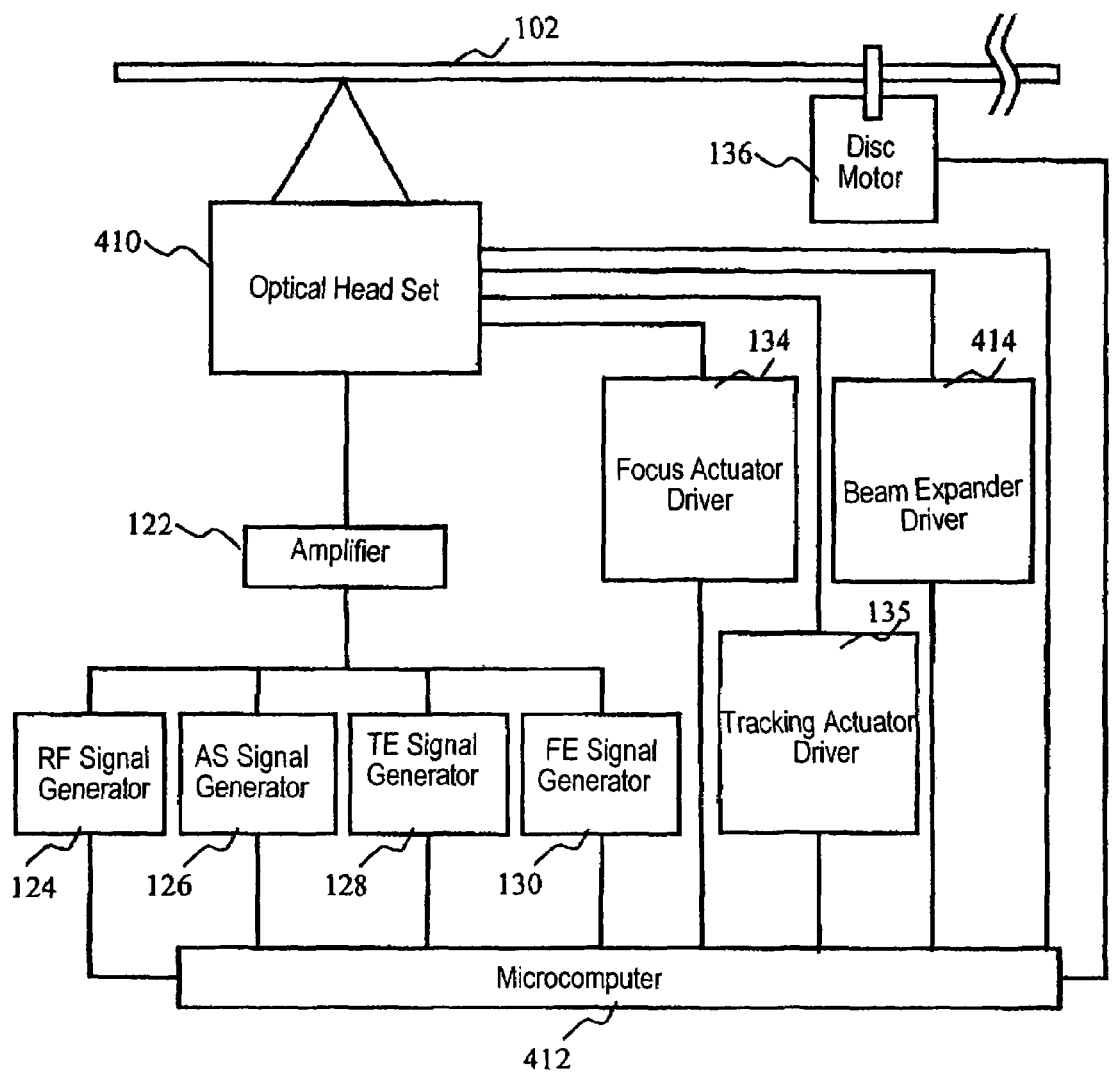
FIG. 26 is a block diagram showing an exemplary detailed configuration for the optical disc drive shown in FIG. 25.

FIG. 26 is a block diagram showing a more detailed configuration for the optical disc drive 400 shown in FIG. 25. In FIG. 26, any component of the optical disc drive 400, having the same function as the counterpart of the optical disc drive 200 of the second preferred embodiment described above, is identified by the same reference numeral as that used in FIG. 13. As shown in FIG. 26, the optical disc drive 400 preferably includes an optical head set 410, the amplifier 122, the RF signal generator 124, the AS signal generator 126, the TE signal generator 128, the FE signal generator 130, a microcomputer 412, the focus actuator driver 134, the tracking actuator driver 135, a beam expander driver 414 and the disc motor 136.

The microcomputer 412 preferably has almost the same configuration, and operates substantially in the same way, as the microcomputer 214 of the second preferred embodiment described above. In addition, the microcomputer 412 preferably outputs a control signal so as to control the spherical aberration of the light beam being emitted from the optical head set 410. In response to the control signal supplied from the microcomputer 412, the beam expander driver 414 preferably drives the spherical aberration correcting actuator of the optical head set 410. The optical head set 410 preferably has the same configuration as the optical head set 212 of the second preferred embodiment described above and can further correct the spherical aberration.

Figure 27:
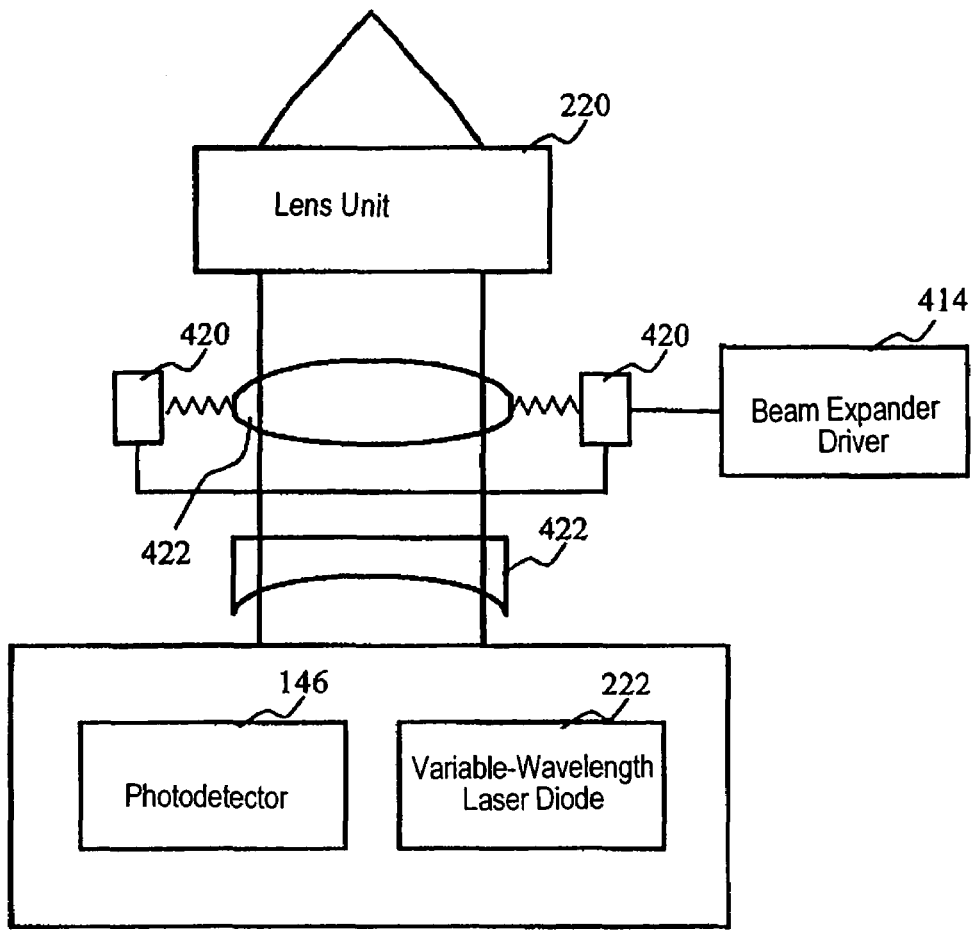
FIG. 27 is a block diagram showing a detailed configuration for the optical head set shown in FIG. 26.

FIG. 27 is a block diagram showing an exemplary configuration for the optical head set 410 shown in FIG. 26. In FIG. 27, any component of the optical head set 410, having the same function as the counterpart of the optical head set 212 of the second preferred embodiment described above, is identified by the same reference numeral as that used in FIG. 14. The optical head set 410 preferably includes the lens unit 220, a spherical aberration correcting lens 422, a spherical aberration correcting actuator 420, the variable-wavelength laser diode 222 and the photodetector 146. The spherical aberration correcting lens 422 is preferably provided on the optical path between the variable-wavelength laser diode 222 and the lens unit 220. The spherical aberration correcting lens 422 preferably transmits the light beam that has come from the variable-wavelength laser diode 222, thereby changing the spherical aberration to be produced in the light beam spot.

The spherical aberration correcting lens 422 may include a concave lens and a convex lens, for example. The spherical aberration correcting actuator 420 preferably changes the spherical aberration of the light beam with the gap between the concave and convex lenses of the spherical aberration correcting lens 422 increased or decreased by moving at least one of these two lenses. That is to say, the spherical aberration correcting actuator 420 preferably changes the spherical aberration of the light beam by shifting the concave lens and/or the convex lens. It should be noted that the beam expander driver 414, spherical aberration correcting actuator 420 and spherical aberration correcting lens 422 preferably perform the function of the spherical aberration corrector 406 shown in FIG. 25. The microcomputer 412 preferably implements the optical disc recognition controller 402 shown in FIG. 25.

Figure 28:
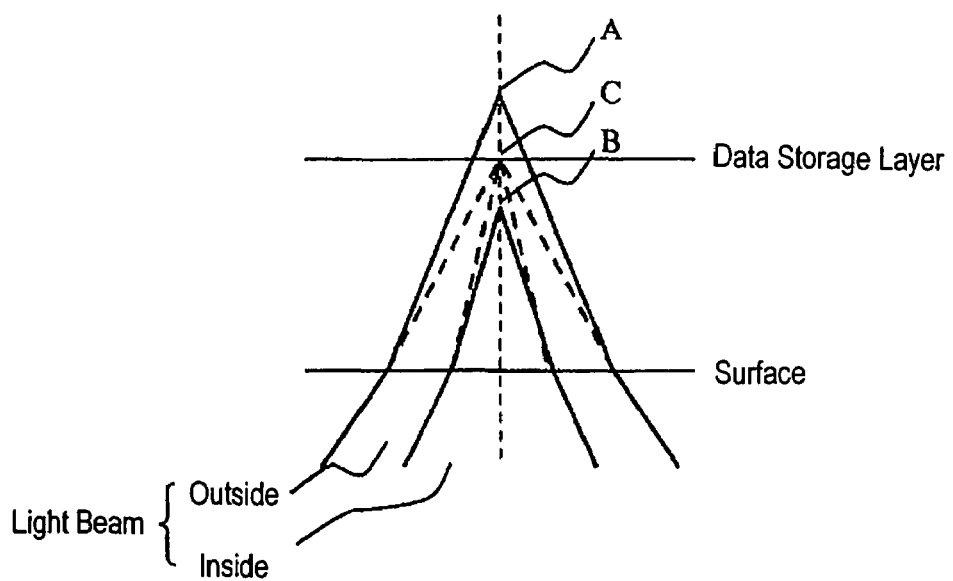
FIG. 28 shows how the spherical aberration of a light beam changes in the fourth preferred embodiment.

Hereinafter, it will be described with reference to FIGS. 28 through 31 how the optical disc drive having the configuration of this fourth preferred embodiment operates. FIG. 28 shows how the spherical aberration of the light beam changes in this fourth preferred embodiment. While the focus control is ON, the light beam that has been emitted from the optical head set 410 is refracted by the light beam passage layer 172 of the optical disc 102. If the thickness of this light beam passage layer 172 varies, then a spherical aberration produces. As a result, a light beam passing the outside portion of the lens is converged toward a focal point A, while a light beam passing the inside portion of the lens is converged toward a focal point B as shown in FIG. 28. That is to say, if the spherical aberration has produced in this way, some gap is created between the focal points A and B.

If no spherical aberration has been produced on the data storage layer 170, then the focal point of the outside light beam matches that of the inside light beam (at a focal point C). However, the greater the magnitude of spherical aberration produced, the wider the gap between the focal points A and B and the more blurred the light beam spot on the whole. As a result, the light beam is partially defocused on the data storage layer 170. In that case, the microcomputer 412 preferably corrects the spherical aberration according to the thickness of the light beam passage layer 172 in reading or writing information from/on the optical disc 102.

By correcting the spherical aberration according to the thickness of the light beam passage layer 172 in this manner, an appropriate light beam spot can be obtained and information can be processed at a high density. The microcomputer 412 may correct the spherical aberration by performing a feedback control using a FE signal, a spherical aberration detection signal or any other detection signal. Alternatively, the microcomputer 412 may also correct the spherical aberration by performing a search operation using a TR signal, a jitter representing a read performance, or any other suitable index. Furthermore, the microcomputer 412 may also correct the spherical aberration by performing a feed forward control based on a predetermined magnitude of correction.

Figure 29A:
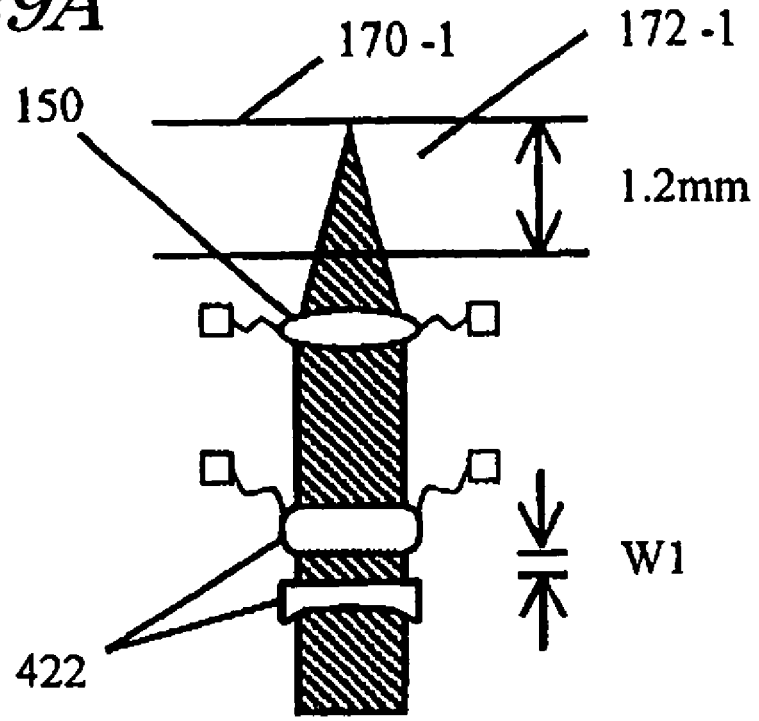
FIGS. 29A and 29B show how to correct the spherical aberration according to the fourth preferred embodiment.
Figure 29B:
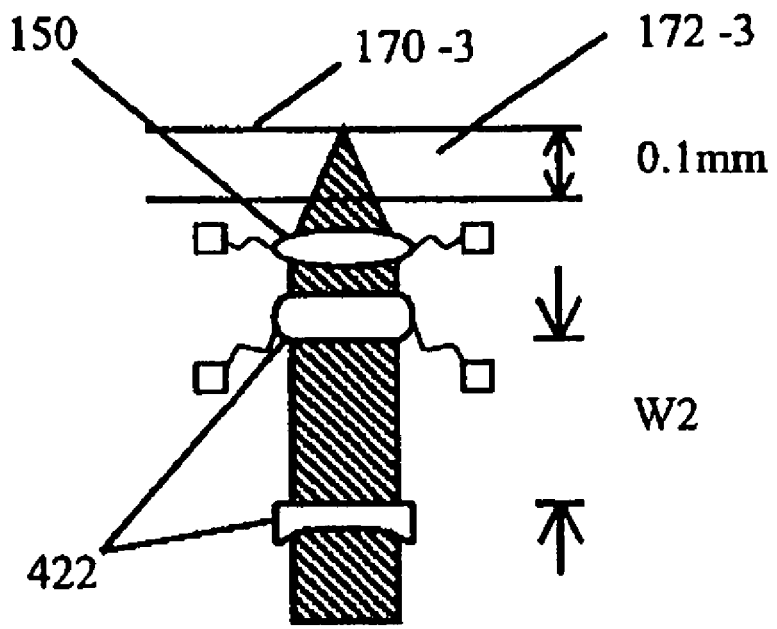

FIGS. 29A and 29B show how to correct the spherical aberration according to this fourth preferred embodiment. For example, in focusing a light beam on the data storage layer 170-1, the light beam passage layer 172-1 shown in FIG. 29A is thicker than the light beam passage layer 172-3 shown in FIG. 29B, and therefore, the gap W1 between the concave and convex lenses of the spherical aberration correcting lens 422 is set shorter than the gap W2 in focusing a light beam on the data storage layer 170-3. As a result, it is known how much to correct the spherical aberration for the light beam passage layer 172-1.

On the other hand, in focusing a light beam on the data storage layer 170-3, the light beam passage layer 172-3 shown in FIG. 29B is thinner than the light beam passage layer 172-1 shown in FIG. 29A, and therefore, the gap W2 between the concave and convex lenses of the spherical aberration correcting lens 422 is set longer than the gap W1 in focusing a light beam on the data storage layer 170-1. As a result, it is known how much to correct the spherical aberration for the light beam passage layer 172-3. In this manner, the beam expander driver 414 and spherical aberration correcting actuator 420 change the gap between the concave and convex lenses of the spherical aberration correcting lens 422. Consequently, the best magnitude of spherical aberration correction to be made can be obtained according to the thickness of the light beam passage layer 172.

Figure 30:
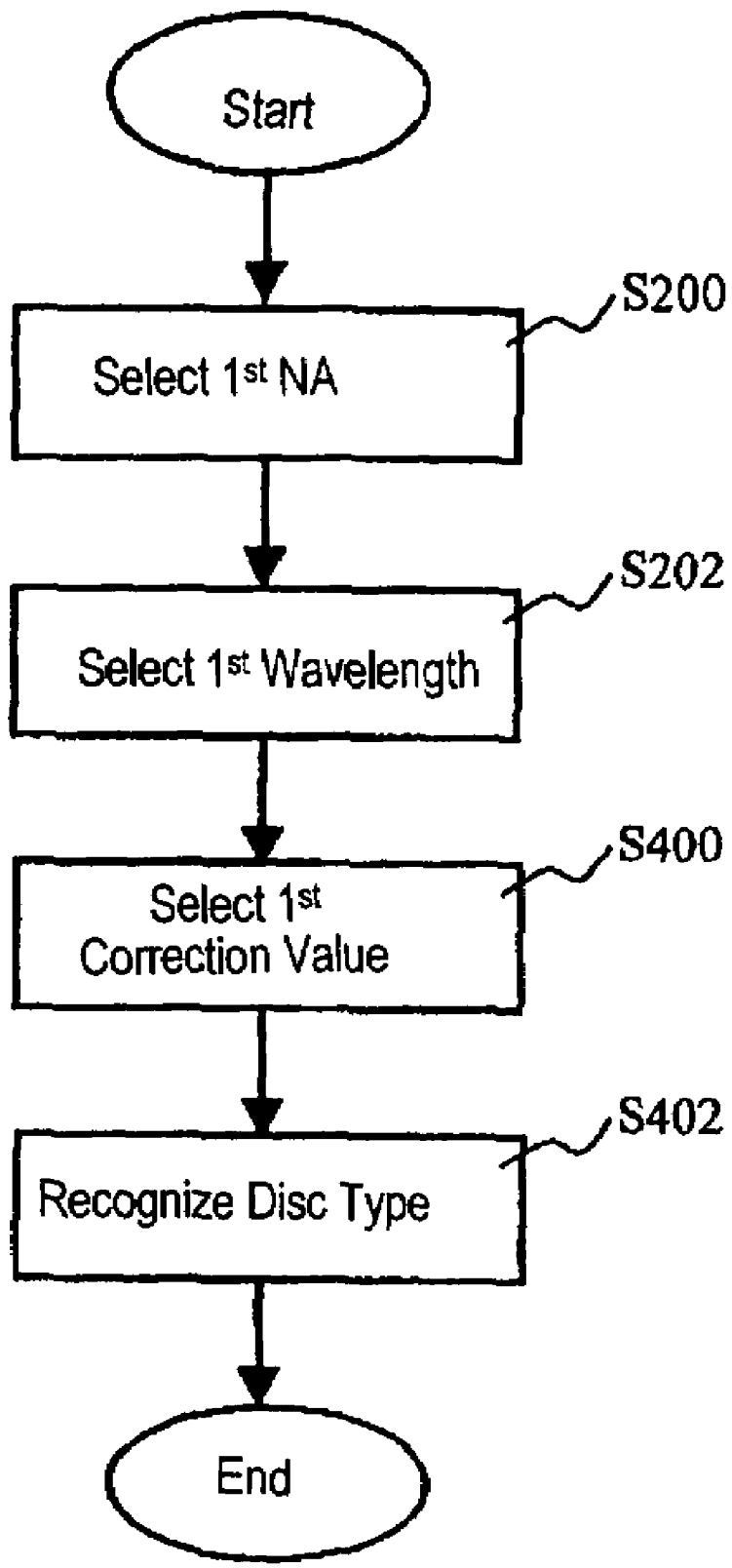
FIG. 30 is a flowchart showing the flow of an optical disc type recognizing process according to the fourth preferred embodiment.

FIG. 30 is a flowchart showing the flow of the optical disc type recognizing process of this fourth preferred embodiment. In FIG. 30, any process step equivalent to the counterpart of the process of the second preferred embodiment described above is identified by the same reference numeral as that used in FIG. 16. In this optical disc type recognizing process, after Step S202 has been performed, the spherical aberration controller 404 preferably controls the spherical aberration corrector 406 in Step S400 such that the magnitude of spherical aberration correction to be made is set equal to a first correction value. As a result, the gap between the concave and convex lenses of the spherical aberration correcting lens 422 can be adjusted to the first correction value.

Next, in Step S402, the recognizer 403 to be implemented by the microcomputer 412 preferably recognizes the type of the given optical disc 102 by the first numerical aperture, first wavelength and first correction value that have been selected in Steps S200, S202 and S400, respectively. These process steps S200, S202 and S400 do not have to be carried out in this order but may be done in any other order. For example, Step S400 may be carried out before Step S200 or S202.

Figure 31:
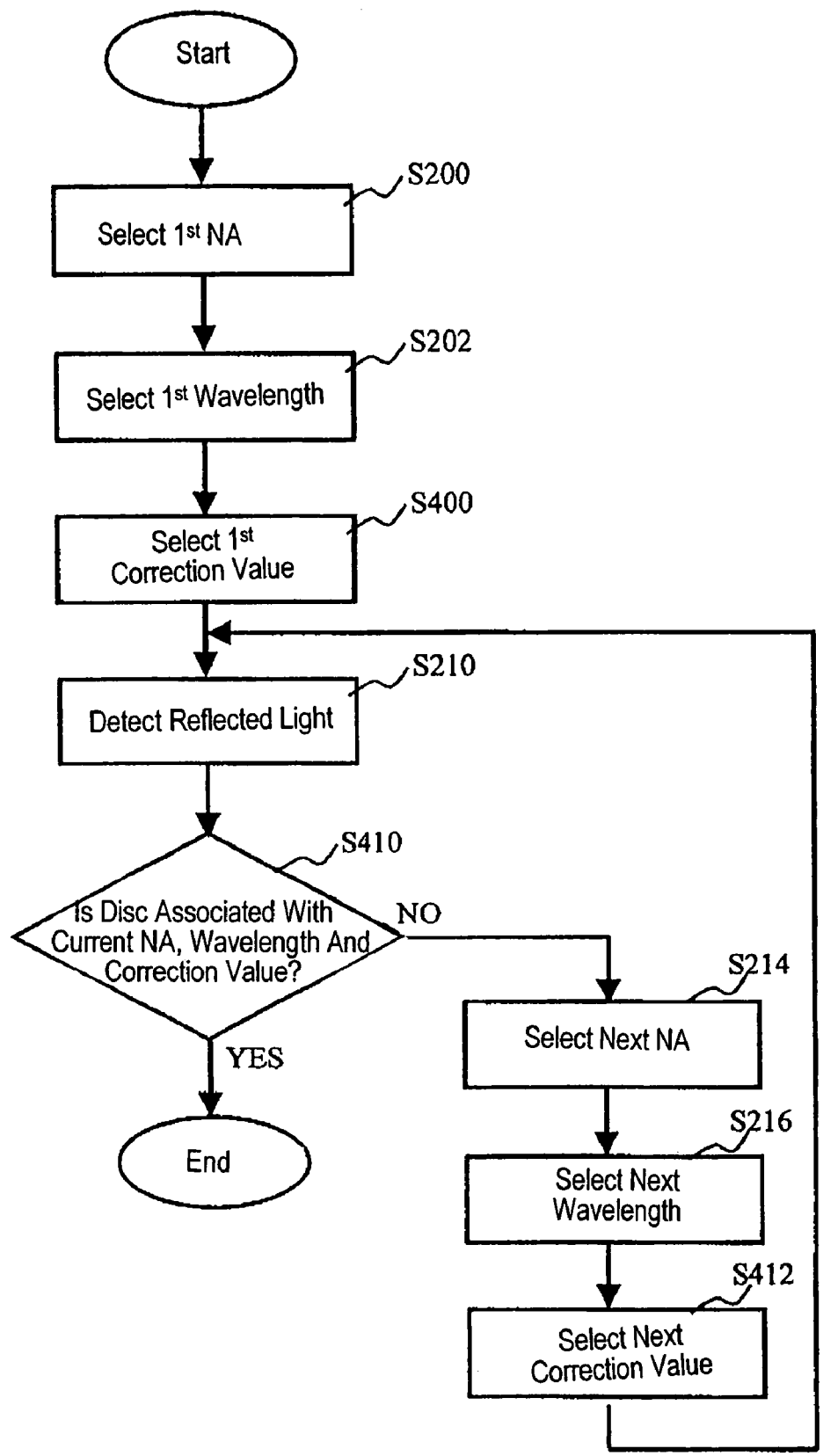
FIG. 31 is a flowchart showing the flow of the process of recognizing the type of a given optical disc with numerical apertures, wavelengths and spherical aberration correction values changed according to the fourth preferred embodiment.

Hereinafter, it will be described how to recognize the type of the given optical disc 102 while switching the numerical apertures, wavelengths and spherical aberration correction values. FIG. 31 is a flowchart showing the flow of the process of recognizing the type of the given optical disc 102 with the numerical apertures, wavelengths and spherical aberration correction values changed. In FIG. 31, any process step equivalent to the counterpart of the process of the second preferred embodiment described above is identified by the same reference numeral as that used in FIG. 17. In this optical disc type recognizing process, after Step S400 has been performed as described above, Step S210 is carried out. Next, in Step S410, the recognizer 403 determines, in accordance with the signal representing the reflected and detected light, whether or not the optical disc 102 loaded in the optical disc drive 400 is associated with the currently selected numerical aperture, wavelength and spherical aberration correction value.

If the answer to the query of Step S410 is YES, then this process ends. Otherwise, the process advances to Steps S214 and S216. After Step S216 has been performed, the spherical aberration regulator 404 preferably controls the spherical aberration corrector 406 in Step S412 such that the currently selected spherical aberration correction value is switched into another value associated with the next thickest light beam passage layer 712. Thereafter, the process returns to Step S210.

In this optical disc type recognizing process, the given optical disc is preferably recognized with an NA of 0.45, an infrared ray and a beam expander value (BE) of 1.2 mm selected first, an NA of 0.6, an infrared ray and a BE of 0.6 mm selected next, and then an NA of 0.85, a light beam with a wavelength equal to or shorter than that of a blue ray and a BE of 0.1 mm selected last. In this manner, the type of the given optical disc 102 can be recognized more accurately with collision minimized by keeping an appropriate distance between the objective lens 150 and the optical disc 102. It should be noted that Steps S214, S216 and S412 do not have to be carried out in this order but may be carried out in any other order. For example, Step S412 may be carried out before Step S214 or S216.

As described above, according to this fourth preferred embodiment, the optical disc 102 can be recognized with the wavelength of the light beam emitted from the light source section 210 set equal to the first wavelength, the numerical aperture of the focusing mechanism 201 set equal to the first numerical aperture, and the spherical aberration correction to be made by the spherical aberration corrector 406 set equal to the first correction value. Thus, a sufficient distance can be maintained between the optical disc 102 and the focusing mechanism 201, and therefore, collision between the focusing mechanism 201 and the optical disc 102 can be minimized.

Embodiment 5

Figure 32:
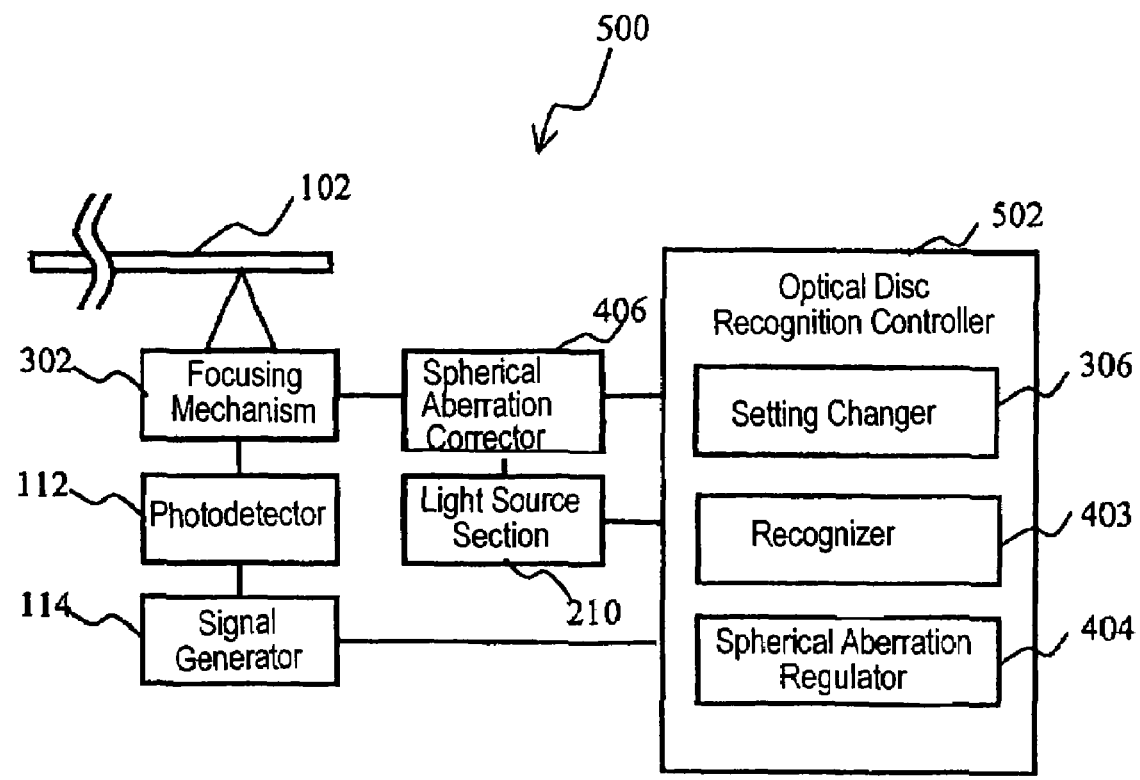
FIG. 32 is a block diagram schematically showing a configuration for an optical disc drive according to a fifth specific preferred embodiment of the present invention.

The spherical aberration corrector 406 and spherical aberration regulator 404 described above for the fourth preferred embodiment are also applicable for use in the third preferred embodiment. Then, an optical disc drive may be designed as shown in FIG. 32. The optical disc drive 500 shown in FIG. 32 preferably includes a focusing mechanism 302, the photodetector 112, the signal generator 114, the light source section 210, an optical disc recognition controller 502 and the spherical aberration corrector 406. The optical disc recognition controller 502 preferably includes a setting changer 306, a recognizer 403 and the spherical aberration regulator 404.

The optical disc drive 500 of this fifth preferred embodiment preferably operates substantially in the same way as the counterpart of the fourth preferred embodiment described above except that the optical disc drive 500 defines the numerical aperture by setting the wavelength of the light beam. That is to say, in this fifth preferred embodiment, Steps S200 and S202 shown in FIGS. 30 and 31 are replaced with Step S300 shown in FIG. 23 and Steps S214 and S216 shown in FIG. 31 are replaced with Step S302 shown in FIG. 24.

Embodiment 6

Figure 33:
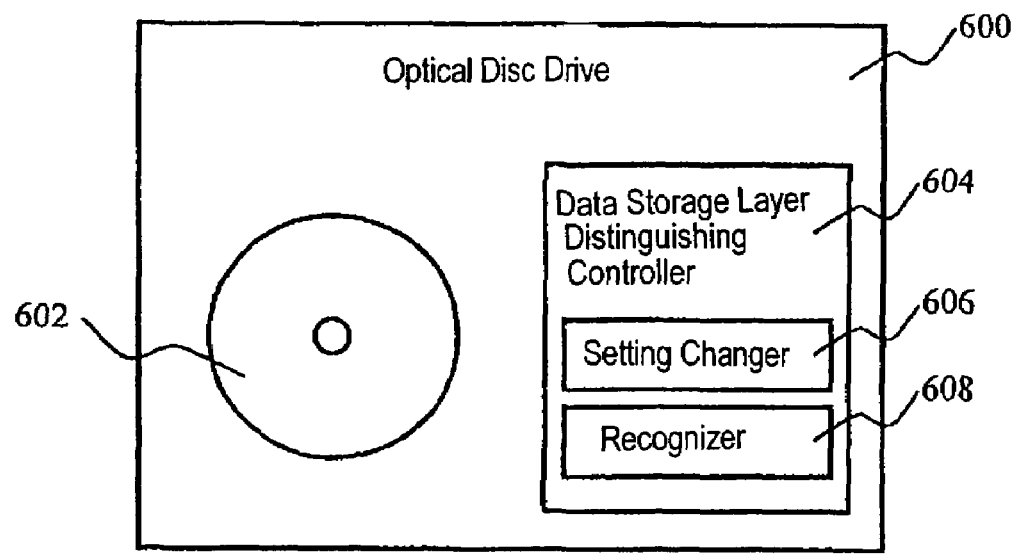
FIG. 33 is a block diagram showing the basic concept of a data storage layer distinguishing controller according to a sixth specific preferred embodiment of the present invention.

FIG. 33 is a block diagram schematically showing a configuration for a data storage layer distinguishing controller according to a sixth specific preferred embodiment of the present invention. The data storage layer distinguishing controller 604 of the sixth preferred embodiment preferably distinguishes at least two types of data storage layers, which are associated with multiple different numerical apertures. Also, the data storage layer distinguishing controller 604 preferably controls an optical disc drive 600 for accessing the data storage layer of the optical disc 602. Furthermore, the data storage layer distinguishing controller 604 preferably distinguishes the data storage layer of the optical disc 602 in the optical disc drive 600 when the optical disc drive 600 is turned ON or when the optical disc 602 is inserted into the optical disc drive 600. The number of types of data storage layers to be distinguished is not particularly limited and may be two, three or more, for example. Also, all or just some of the data storage layers included in the optical disc 602 loaded may be distinguished.

The data storage layer distinguishing controller 604 preferably includes a setting changer 606 and a distinguisher 608. The setting changer 606 preferably controls a focusing mechanism, which focuses a light beam on the data storage layer of the given optical disc 602, by setting the numerical aperture of the focusing mechanism equal to the smallest, first numerical aperture among the multiple different numerical apertures. Alternatively, the setting changer 606 may control the focusing mechanism by setting the numerical aperture of the focusing mechanism equal to the second numerical aperture. Also, beginning with the smallest, first numerical aperture, the setting changer 606 may sequentially select one of the numerical apertures after another in the ascending order.

The distinguisher 608 preferably distinguishes the data storage layer of the optical disc 602 loaded in the optical disc drive 600 by the first numerical aperture that has been selected by the setting changer 606. The distinguisher 608 may distinguish among all types of data storage layers by the first numerical aperture. Also, if the setting changer 606 sequentially selects one of the multiple different numerical apertures after another in the ascending order, then the distinguisher 608 may determine whether or not the given data storage layer is associated with the numerical aperture currently selected by the setting changer 606. This decision can be made in accordance with a signal representing a reflected and detected portion of the light from the data storage layer of the optical disc 602 on which the light beam was focused at that numerical aperture.

The optical disc 602 is a storage medium that can be accessed by way of a light beam and preferably has either a single data storage layer or multiple data storage layers, which are stacked one upon the other. Examples of preferred optical discs 602 includes music CDs, CD-ROMs, CD-Rs, CD-RWs, DVD-ROMs, DVD-RAMs, DVD-RWs, DVD-Rs, DVD+RWs, DVD+Rs, and high-density optical discs to be accessed with a light beam, of which the wavelength is equal to or shorter than that of a blue ray. Furthermore, the optical disc 602 may even be a combination of these discs. That is to say, a single optical disc 602 may include a plurality of data storage layers for a CD, a DVD and a BD, for example.

The multiple different numerical apertures may include at least one of the ranges of: 0.85+0.01 to 0.85−0.01; 0.6+0.01 to 0.6−0.01; and 0.50+0.01 to 0.50−0.01. Alternatively, the multiple different numerical apertures may include at least one of the ranges of: 0.85+0.01 to 0.85−0.01; 0.6+0.01 to 0.6−0.01; and 0.45+0.01 to 0.45−0.01. Furthermore, the multiple different numerical apertures may also fall within any other range.

Figure 34:
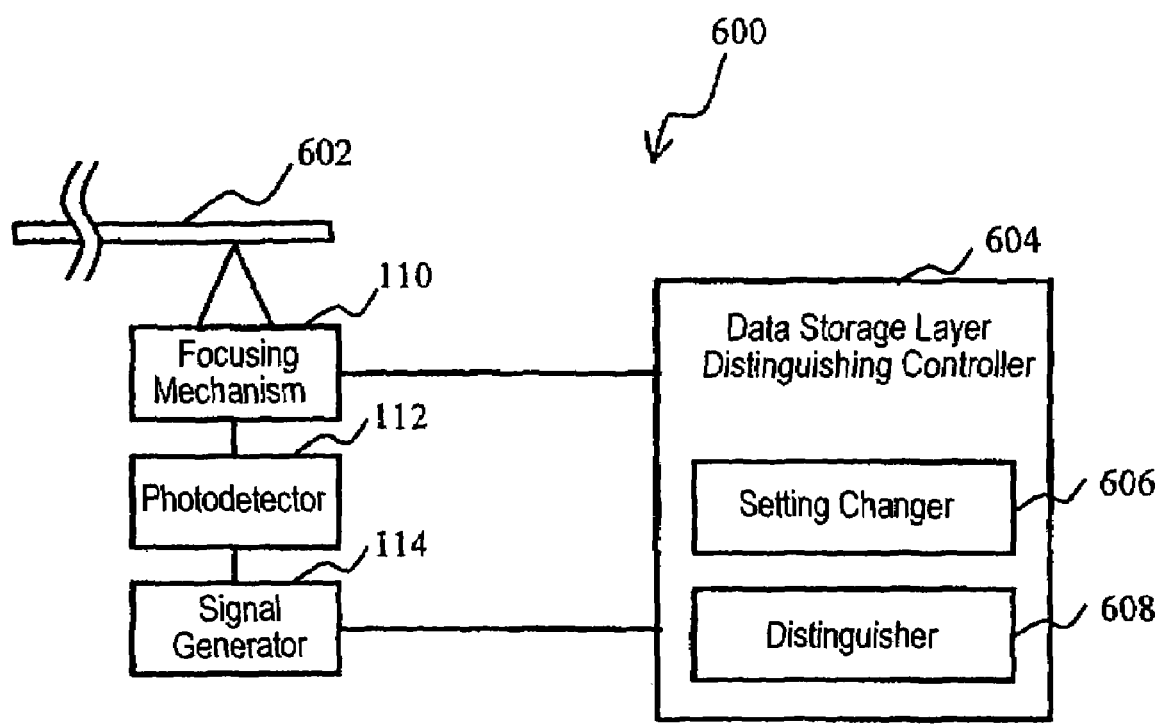
FIG. 34 is a block diagram schematically showing a configuration for the optical disc drive shown in FIG. 33.

FIG. 34 is a block diagram schematically showing a detailed configuration for the optical disc drive 600 shown in FIG. 33. In FIG. 34, any component of the optical disc drive 600, having the same function as the counterpart of the optical disc drive 100 of the first preferred embodiment described above, is identified by the same reference numeral as that used in FIG. 2. As shown in FIG. 34, the optical disc drive 600 of the sixth preferred embodiment preferably includes the focusing mechanism 110, the photodetector 112, the signal generator 114 and the data storage layer distinguishing controller 604. The data storage layer distinguishing controller 604 preferably outputs a control signal that sets the numerical aperture of the focusing mechanism 110 equal to the smallest, first numerical aperture among the multiple different numerical apertures. Also, the data storage layer distinguishing controller 604 preferably receives the output signal of the signal generator 114 and determines, based on the signal received, whether or not the given data storage layer is associated with the currently selected numerical aperture.

It should be noted that the detailed configuration of the optical disc drive 600 may be the same as that shown in FIGS. 3 through 5. The microcomputer of this sixth preferred embodiment functions as the data storage layer distinguishing controller 604.

Figure 35:
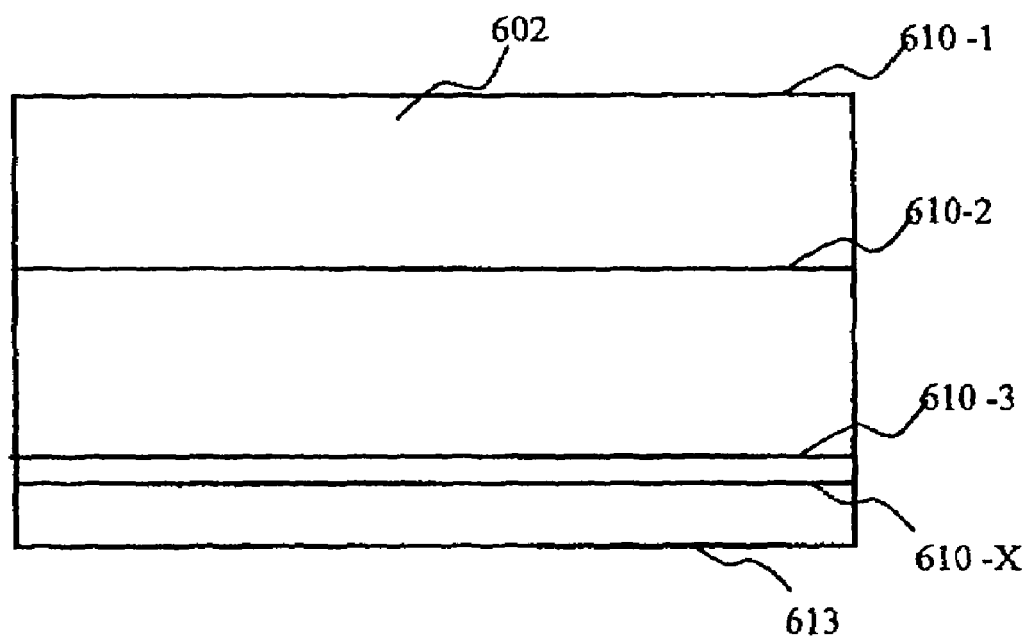
FIG. 35 illustrates an exemplary structure for the optical disc shown in FIG. 33.

FIG. 35 shows an exemplary structure for the optical disc 602 shown in FIG. 33. The optical disc 602 may include either a single data storage layer 610 or a plurality of data storage layers 610-1, 610-2, 610-3, . . . and 610-X. The optical disc 602 may have a thickness of about 1.2 mm, for example. The light beam that has been transmitted through the objective lens 150 is incident on the surface 613 so as to be focused on any of these data storage layers 610 and 610-1 through 610-X. These data storage layers 610-1 through 610-X may be included in a CD, a DVD, and/or an optical disc that uses a light beam with a wavelength equal to or shorter than that of a blue ray. The data storage layers 610-1 through 610-X may include some layers of the same type, may all be of mutually different types, or may even be of quite the same type, too.

The respective data storage layers 610-1 through 610-X are located at mutually different depths as measured from the surface 613. Those depths (or distances) from the surface 613 to the respective data storage layers 610-1 through 610-X are not particularly limited and may fall within one of the ranges of 1.2+0.3 mm to 1.2−0.1 mm, 0.6+0.53 mm to 0.6−0.5 mm, 100+5 μm to 100−5 μm and 75+5 μm to 75−5 μm.

Hereinafter, it will be described with reference to FIG. 36 how the optical disc drive 600 of this sixth preferred embodiment operates.

Figure 36:
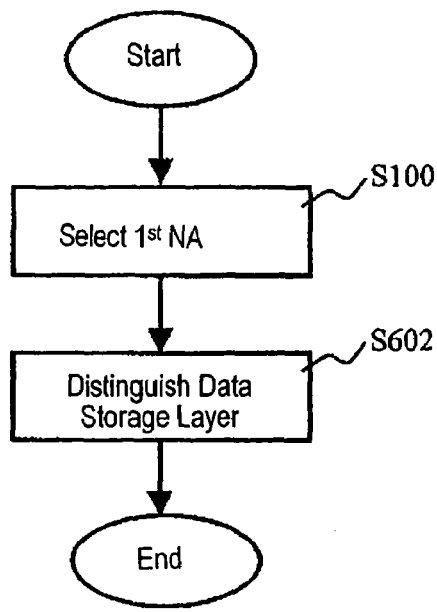
FIG. 36 is a flowchart showing the flow of a data storage layer distinguishing process according to the sixth preferred embodiment.

FIG. 36 is a flowchart showing the flow of the data storage layer distinguishing process of this sixth preferred embodiment. In FIG. 36, any process step equivalent to the counterpart of the process of the first preferred embodiment described above is identified by the same reference numeral as that used in FIG. 9. In the data storage layer distinguishing process of this sixth preferred embodiment, after the setting changer 606 has carried out Step S100, the distinguisher 608 preferably distinguishes the data storage layer 610 (i.e., any of the data storage layers 610-1 through 610-X) of the given optical disc 602 by the first numerical aperture that has been selected in Step S100.

The distinguisher 608 preferably controls the optical head set 120 such that the light beam is focused on the data storage layer 610 by way of the objective lens 150-1, for example, and preferably distinguishes the data storage layer 610 in accordance with a signal representing the detected portion of the reflected light from the data storage layer 610. The distinguisher 608 may distinguish the given data storage layer 610 by the FE signal, TE signal, AS signal, RF signal or a combination thereof. The distinguisher 608 may distinguish among all types of data storage layers 610 either by the first numerical aperture only or by switching the numerical apertures one after another. Also, the distinguisher 608 may distinguish either all or just some of the data storage layers 610 of the optical disc 602 loaded in this optical disc drive 600.

In the sixth preferred embodiment described above, the numerical aperture of the focusing mechanism 110 for focusing the light beam on the data storage layer 610 of the given optical disc 602 is set equal to the first numerical aperture, which is the smallest of the multiple different numerical apertures, and the given data storage layer 610 is distinguished by the first numerical aperture selected. Thus, the data storage layer 610 can be distinguished with a sufficient distance maintained between the optical disc 602 and the focusing mechanism 110. As a result, collision between the focusing mechanism 110 and the optical disc 602 can be minimized.

Embodiment 7

Figure 37:
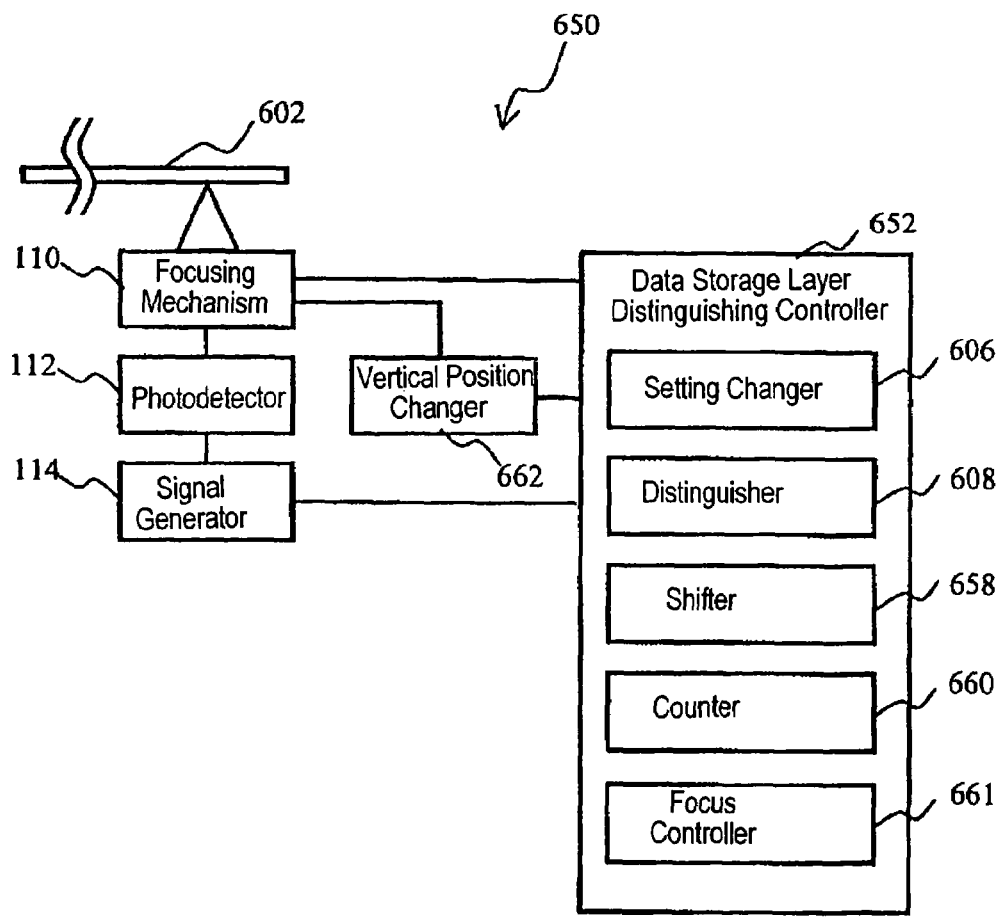
FIG. 37 is a block diagram schematically showing a configuration for an optical disc drive according to a seventh specific preferred embodiment of the present invention.

FIG. 37 is a block diagram schematically showing a configuration for an optical disc drive according to a seventh specific preferred embodiment of the present invention. In FIG. 37, any component of the optical disc drive 650, having the same function as the counterpart of the optical disc drive 600 of the sixth preferred embodiment described above, is identified by the same reference numeral as that used in FIG. 34. As shown in FIG. 37, the optical disc drive 650 of this seventh preferred embodiment preferably includes the focusing mechanism 110, the photodetector 112, the signal generator 114, a vertical position changer 662, and a data storage layer distinguishing controller 652. The data storage layer distinguishing controller 652 preferably includes the setting changer 606, the distinguisher 608, a shifter 658, a counter 660 and a focus controller 661.

The vertical position changer 662 preferably moves the focusing mechanism 110 substantially perpendicularly to the data storage layers 610. As a result, the light beam spot shifts substantially perpendicularly to the data storage layers 610, too. In response to a signal supplied from the signal generator 114, the focus controller 661 preferably drives and controls the vertical position changer 662 such that the light beam is focused on any of the data storage layers of the optical disc 602.

The counter 660 preferably counts the number of data storage layers 610 included in the given optical disc 602. For example, if the number of data storage layers 610 in the optical disc 602 loaded is one, then the count is "one"; if the number of data storage layers 610 in the optical disc 602 loaded is two, then the count is "two"; and if the number of data storage layers 610 in the optical disc 602 loaded is X, then the count is "X". The counter 660 may count the number of data storage layers either in response to the signal supplied from the signal generator 114 or based on the result obtained by the distinguisher 608. In this manner, the number of data storage layers 610 in the optical disc 602 loaded can be detected.

While the distinguisher 608 is distinguishing the data storage layer 610, the shifter 658 preferably drives and controls the vertical position changer 662 such that the light beam is focused on one of the data storage layers 610 after another from the deepest one of them toward the shallowest one (i.e., toward the surface 613). For example, the shifter 658 may shift the light beam spot from the deepest data storage layer 610, which is about 1.2 mm away from the surface 613, toward the surface 613. Then, the focusing mechanism 110 moves away from the optical disc 602 and therefore, collision between the focusing mechanism 110 and the optical disc 602 can be further reduced. Alternatively, the shifter 658 may also control the vertical position changer 662 such that the light beam is focused on one of the data storage layers 610 after another from the shallowest one toward the deepest one.

It should be noted that the detailed configuration of the optical disc drive 650 may be the same as that shown in FIGS. 3 through 5. The focus actuator driver 134 and focus actuator 152 correspond to the vertical position changer 662. The microcomputer of this seventh preferred embodiment functions as the data storage layer distinguishing controller 652.

Figure 38:
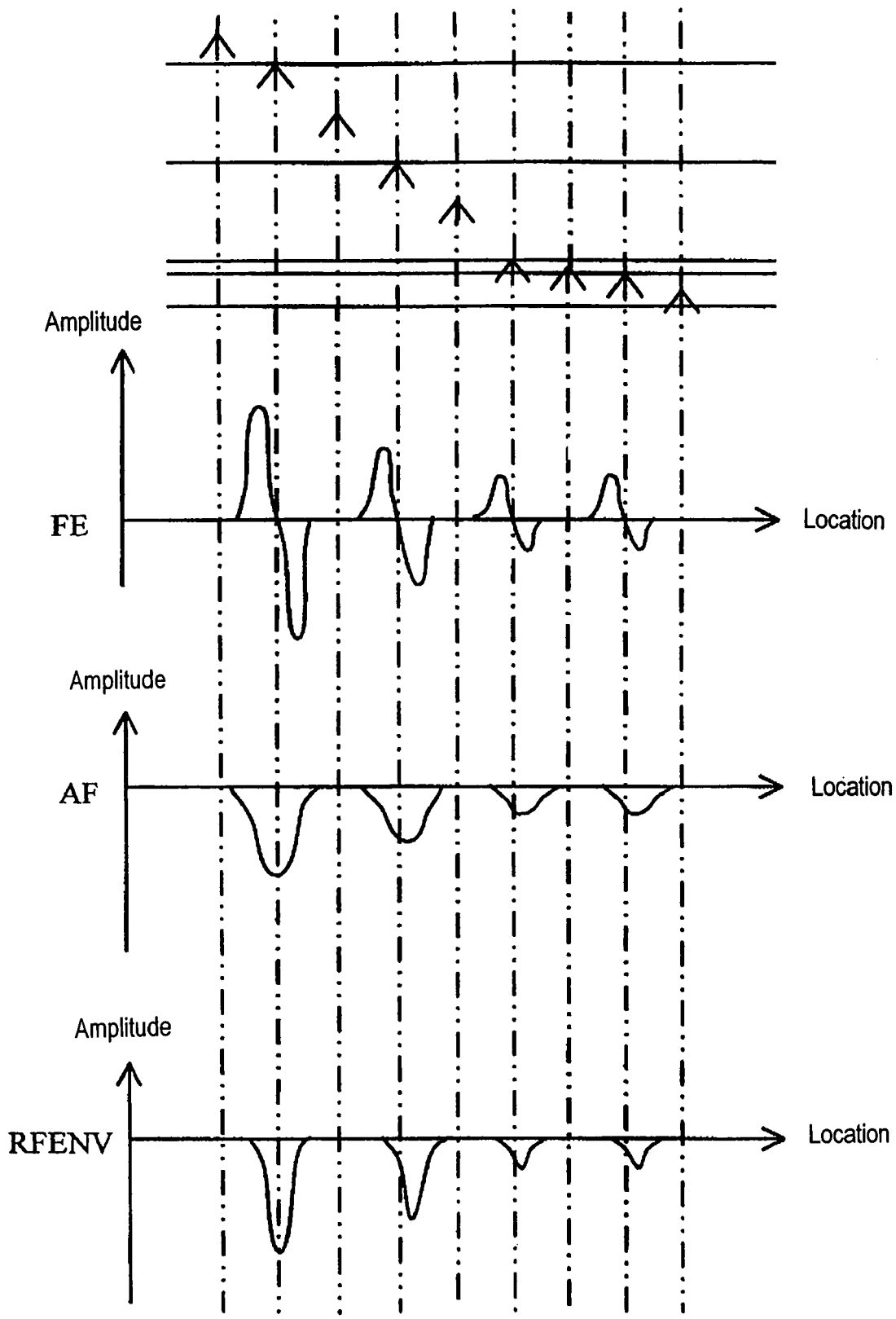
FIG. 38 shows how to carry out the data storage layer distinguishing method of the seventh preferred embodiment.
Figure 39:
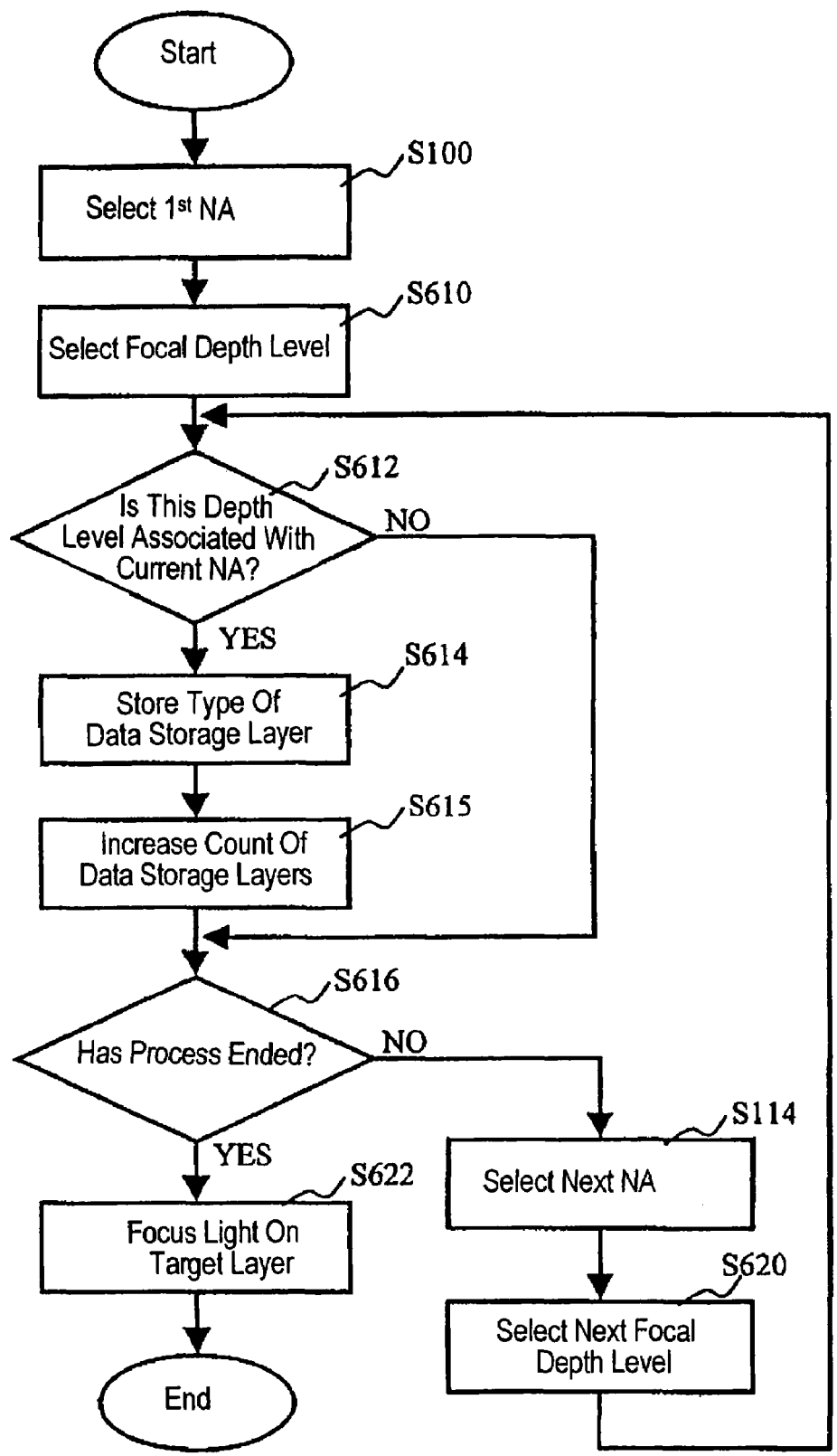
FIG. 39 is a flowchart showing the flow of the process of distinguishing a data storage layer of a given optical disc with numerical apertures changed according to the seventh preferred embodiment.

Hereinafter, it will be described with reference to FIGS. 38 and 39 how the optical disc drive 650 having the configuration of this seventh preferred embodiment operates. FIG. 38 shows how to carry out the data storage layer distinguishing method of this seventh preferred embodiment. In this data storage layer distinguishing method, first, the setting changer 606 preferably sets the numerical aperture of the focusing mechanism 110 equal to the first numerical aperture, which is the smallest of multiple different numerical apertures. Next, the shifter 658 preferably drives and controls the vertical position changer 662 such that the light beam is sequentially focused on one of the multiple data storage layers after another from the deepest one (as measured from the surface 613) toward the surface 613.

When the light beam spot passes the data storage layers 610, the signals generated by the signal generator 114 have the waveforms shown in FIG. 38. The distinguisher 608 preferably distinguishes the respective data storage layers 610 by these waveforms. For example, the distinguisher 608 may carry out that distinguishing process just like the recognizer of the first preferred embodiment described above. In accordance with the result obtained by the distinguisher 608 or the waveform of the signal generated by the signal generator 114, the counter 660 preferably counts the number of data storage layers 610.

When the distinguisher 608 finishes its distinguishing process, the types of the respective data storage layers 610 in the optical disc 602 loaded are now known. Then, it is possible to focus the light beam on any of those data storage layers freely. Based on the result of the distinguishing process performed by the distinguisher 608, the focus controller 661 preferably focuses the light beam on a desired one of the data storage layers 610 first in the optical disc loaded.

Hereinafter, it will be described how to distinguish the given data storage layer 610 while switching the numerical apertures. FIG. 39 is a flowchart showing the flow of the process of distinguishing the given data storage layer 610 with the numerical apertures changed. In FIG. 39, any process step equivalent to the counterpart of the process of the first preferred embodiment described above is identified by the same reference numeral as that used in FIG. 11. In this data storage layer distinguishing process, after Step S100 has been performed as described above, the shifter 658 preferably controls the focusing mechanism 110 in Step S610 such that the light beam spot is shifted to a deepest level around the deepest data storage layer as measured from surface 613. In this process step, the shifter 658 may control the focusing mechanism 110 such that the light beam spot just passes that level a single time or goes back and forth around the level a number of times. If the target data storage layer 610 is located at that level, then the waveforms shown in FIG. 38 are detected.

Next, in Step S612, the distinguisher 608 preferably determines, in accordance with the signal supplied from the signal generator 114, whether or not the target data storage layer associated with the currently selected numerical aperture is located just at the level that the light beam spot has passed. For example, according to the voltage level of the signal supplied from the signal generator 114, the distinguisher 608 may determine whether or not the data storage layer associated with the selected numerical aperture is located at the level. If the answer is NO, the process skips steps S614 and S615 so as to jump to Step S616. On the other hand, if the answer is YES, then the distinguisher 608 preferably stores the type of that data storage layer in Step S614, the counter 660 preferably increases its count in Step S615, and the process advances to the next step S616.

In Step S616, the shifter 658 preferably determines whether or not the data storage layer distinguishing process has ended. This decision may be made by making the shifter 658 determine whether or not the light beam spot has passed a shallowest level that is closest to the surface 613. If the answer to the query of Step S616 is YES, the focus controller 661 preferably focuses the light beam on the desired data storage layer based on the result obtained by the distinguisher 608 in Step S622.

On the other hand, if the answer to the query of Step S616 is NO, then the setting changer 606 preferably performs Step S114. Thereafter, in Step S620, the shifter 658 preferably outputs a control signal that shifts the light beam spot to around the next deepest level, which is the second most distant from the surface 613 next to the deepest level that the light beam spot has just passed. In this process step, the shifter 658 may control the focusing mechanism 110 such that the light beam spot passes the second deepest level just once or goes back and forth around the level a number of times.

Thereafter, the process returns to Step S612. In this data storage layer distinguishing process, the focus controller 661 may keep the focus control either OFF or ON at each level. Optionally, Steps S100 and S610 may be carried out in reverse order. Steps S114 and S620 may be interchanged as well.

In the seventh preferred embodiment described above, the number and types of data storage layers 610 in the optical disc 602 loaded can be detected with collision between the focusing mechanism 110 and optical disc 602 minimized.

Embodiment 8

Figure 40:
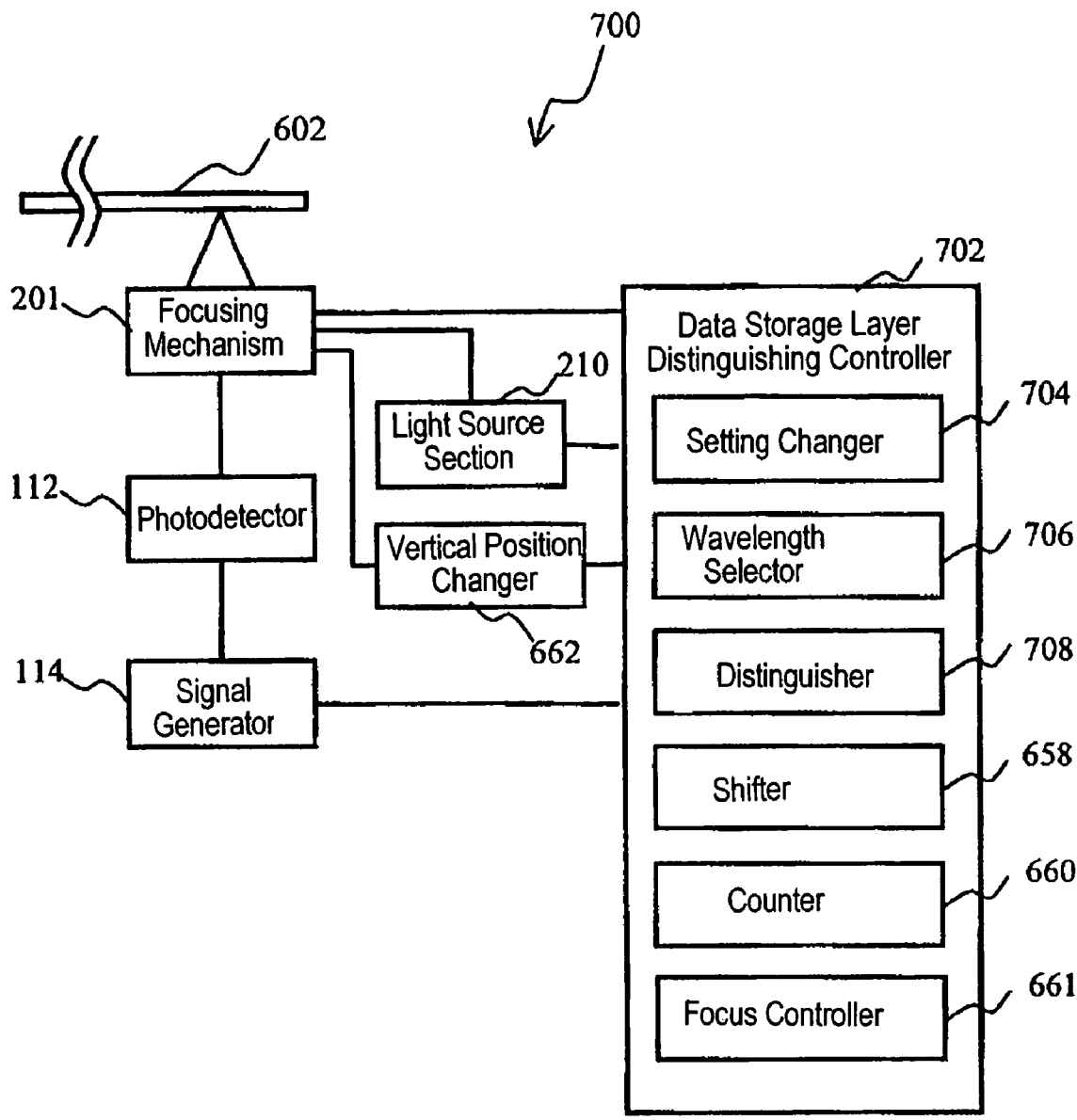
FIG. 40 is a block diagram schematically showing a configuration for an optical disc drive according to an eighth specific preferred embodiment of the present invention.

The sixth or seventh preferred embodiment of the present invention described above may be combined with the second preferred embodiment described above. FIG. 40 is a block diagram schematically showing a configuration for an optical disc drive according to an eighth specific preferred embodiment of the present invention. In FIG. 40, any component of the optical disc drive 700, having the same function as the counterpart of the optical disc drive of the second, sixth or seventh preferred embodiment described above, is identified by the same reference numeral as that used in FIG. 12 or 37. As shown in FIG. 40, the optical disc drive 700 of this eighth preferred embodiment preferably includes the focusing mechanism 201, the photodetector 112, the signal generator 114, the light source section 210, the vertical position changer 662, and a data storage layer distinguishing controller 702.

The data storage layer distinguishing controller 702 preferably includes a setting changer 704, a wavelength selector 706, a distinguisher 708, the shifter 658, the counter 660 and the focus controller 661. Just like the setting changer 606 of the sixth and seventh preferred embodiments, the setting changer 704 preferably outputs a control signal that defines the numerical aperture of the focusing mechanism 201. The control operation of setting the numerical aperture of the focusing mechanism 201 may be carried out independently of the control operation of setting the wavelength of the light beam. Just like the distinguisher 608 of the sixth and seventh preferred embodiments, the distinguisher 708 preferably determines whether or not the data storage layer 610 of the optical disc 602 loaded is associated with the currently selected numerical aperture and wavelength.

If the setting changer 704 sets the numerical aperture of the focusing mechanism 201 equal to the first numerical aperture, then the wavelength selector 706 preferably controls the light source section 210 such that the wavelength of the light beam emitted from the light source section 210 is set equal to the first wavelength described above. Alternatively, the wavelength selector 706 may also control the light source section 210 such that the wavelength of the light beam emitted from the light source section 210 is set equal to the second wavelength described above. Optionally, the wavelength selector 706 may sequentially select one of the multiple different wavelengths after another in the descending order (i.e., the longest wavelength first).

It should be noted that the detailed configuration of the optical disc drive 700 may be the same as that shown in FIGS. 13 through 15. The microcomputer of this eighth preferred embodiment functions as the data storage layer distinguishing controller 702.

Figure 41:
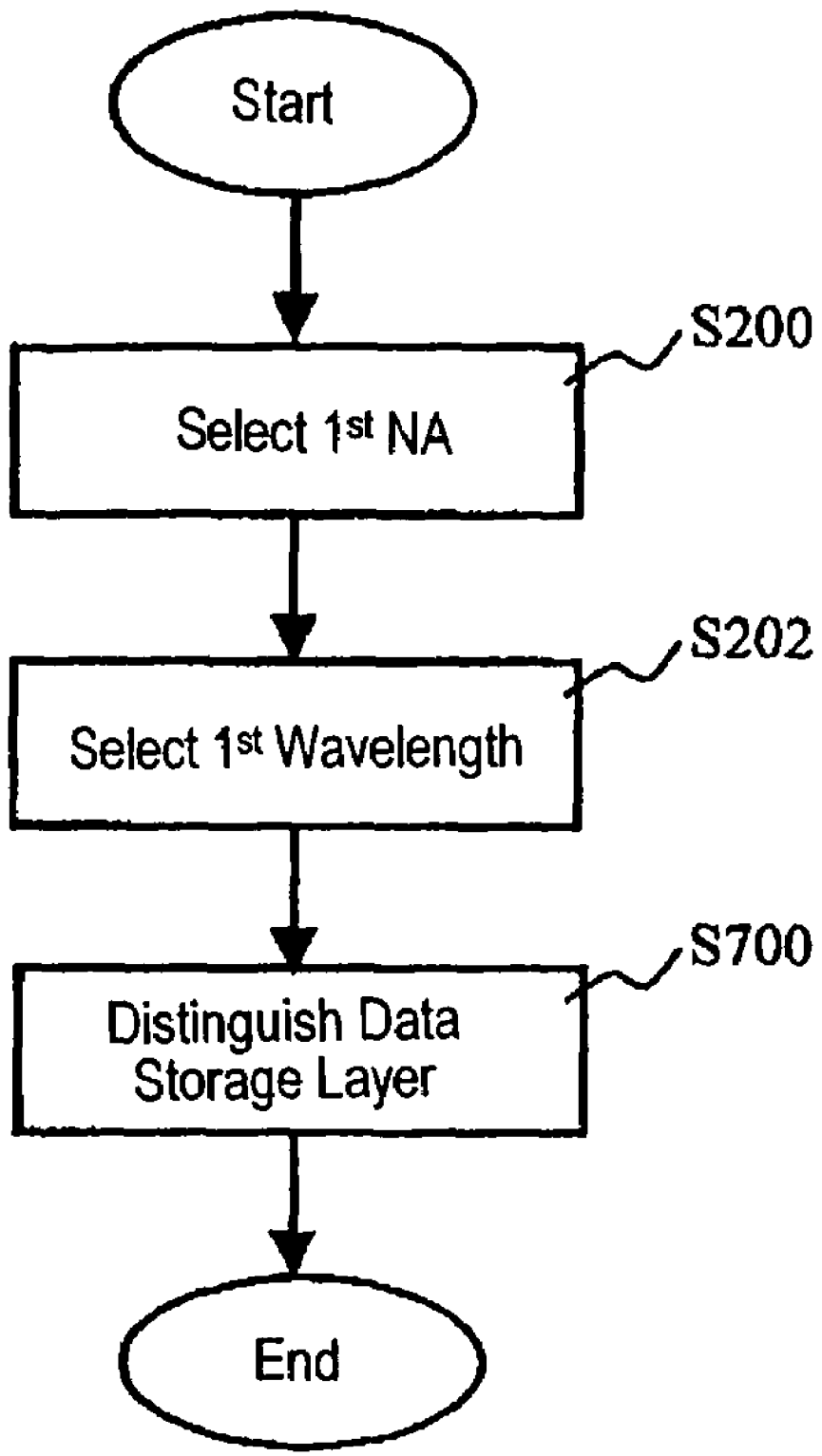
FIG. 41 is a flowchart showing the flow of a data storage layer distinguishing process according to the eighth preferred embodiment.
Figure 42:
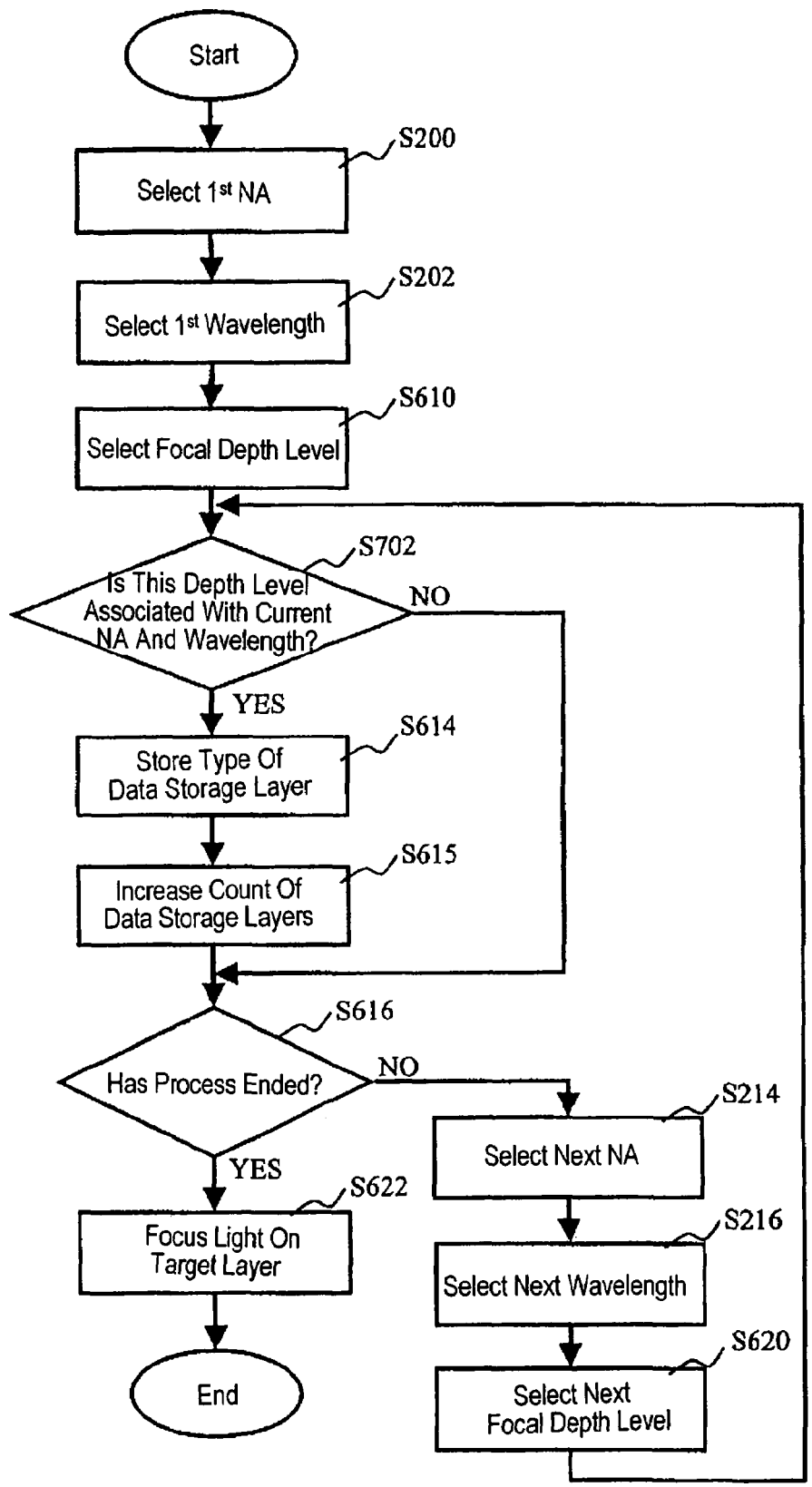
FIG. 42 is a flowchart showing the flow of the process of distinguishing a data storage layer with numerical apertures and wavelengths changed according to the eighth preferred embodiment.

Hereinafter, it will be described with reference to FIGS. 41 and 42 how the optical disc drive 700 of this eighth preferred embodiment operates. FIG. 41 is a flowchart showing the flow of the data storage layer distinguishing process of this eighth preferred embodiment. In FIG. 41, any process step equivalent to the counterpart of the process of the second preferred embodiment described above is identified by the same reference numeral as that used in FIG. 16. In this data storage layer distinguishing process, after the setting changer 704 and wavelength selector 706 have performed Steps S200 and S202, the distinguisher 708 preferably distinguishes the data storage layer 610 in Step S700 by the first numerical aperture and first wavelength that have been selected in Steps S200 and S202, respectively.

The distinguisher 708 preferably receives a signal representing the detected portion of the reflected light from the optical disc 602, on which the light beam has been focused by way of the objective lens 150-1, for example, and preferably distinguishes the data storage layer 610 in accordance with that signal. The distinguisher 708 may distinguish the given data storage layer 610 by the FE signal, TE signal, AS signal, RF signal or a combination thereof. The distinguisher 708 may distinguish among all types of data storage layers 610 either by the first numerical aperture and the first wavelength or by switching the numerical apertures and wavelengths. Optionally, Steps S200 and S202 may be carried out in reverse order. Also, the distinguisher 708 may distinguish all or just some of the data storage layers 610 included in the optical disc 602 loaded in the optical disc drive 700.

In Step S700, the shifter 658 preferably drives and controls the vertical position changer 662 such that the light beam is sequentially focused on one of the multiple data storage layers after another from the deepest one (as measured from the surface 613) toward the surface 613. Alternatively, the shifter 658 may also control the vertical position changer 662 such that the light beam is sequentially focused on one of the multiple data storage layers after another from the shallowest one (as measured from the surface 613) toward the deepest one. The distinguisher 608 preferably distinguishes the respective data storage layers 610 by the waveforms shown in FIG. 38. In accordance with the result obtained by the distinguisher 608 or the waveform of the signal generated by the signal generator 114, the counter 660 preferably counts the number of data storage layers 610. Based on the result of the distinguishing process performed by the distinguisher 708, the focus controller 661 preferably focuses the light beam on a desired one of the data storage layers 610 first in the optical disc loaded.

Hereinafter, it will be described how to distinguish the given data storage layer 610 while switching the numerical apertures and wavelengths. FIG. 42 is a flowchart showing the flow of the process of distinguishing the given data storage layer 610 with the numerical apertures and wavelengths changed. In FIG. 42, any process step equivalent to the counterpart of the process of the second, sixth or seventh preferred embodiment described above is identified by the same reference numeral as that used in FIG. 17 or 39. In this data storage layer distinguishing process, after Step S202 has been performed as described above, Step S610 is carried out by controlling the focusing mechanism 201. Next, in Step S702, the distinguisher 708 preferably determines, in accordance with the signal supplied from the signal generator 114, whether or not the target data storage layer associated with the currently selected numerical aperture and wavelength is located just at the level that the light beam spot has passed. For example, according to the voltage level of the signal detected from the optical disc 602, the distinguisher 708 may determine whether or not the data storage layer associated with the selected numerical aperture and wavelength is located at the level.

If the answer is NO, the process skips steps S614 and S615 so as to jump to Step S616. On the other hand, if the answer is YES, then the process advances to Steps S614 and S615. In Step S616, the shifter 658 preferably determines whether or not the data storage layer distinguishing process has ended. If the answer to the query of Step S616 is NO, the setting changer 704 and wavelength selector 706 preferably perform Steps S214 and S216, respectively. Thereafter, Step S620 is carried out by controlling the focusing mechanism 201 and then the process returns to Step S702. In this data storage layer distinguishing process, the focus controller 661 may keep the focus control either OFF or ON at each level. Optionally, Steps S200, S202 and S610 may be carried out in a different order. Steps S214, S216 and S620 may also be carried out in any other order, too.

In the preferred embodiment described above, the data storage layer distinguishing controller 702 preferably distinguishes the given data storage layer 610 with both the numerical apertures and wavelengths switched. Alternatively, the data storage layer distinguishing controller 702 may distinguish the given data storage layer 610 without switching the wavelengths. For example, the data storage layer distinguishing controller 702 may perform the process of distinguishing the given data storage layer 610 with the wavelength of the variable-wavelength laser diode 222 kept equal to the first wavelength and with the numerical apertures changed. Then, erroneous short wave beam irradiation on the data storage layer 610 can be reduced and the information stored on the data storage layer 610 can be protected.

As described above, according to this eighth preferred embodiment, the data storage layer 610 can be distinguished with the light source section 210 at the first wavelength and the focusing mechanism 201 at the first numerical aperture combined. Thus, a sufficient distance can be maintained between the optical disc 602 and the focusing mechanism 201, and therefore, collision between the focusing mechanism 201 and the optical disc 602 can be minimized.

Embodiment 9

Figure 43:
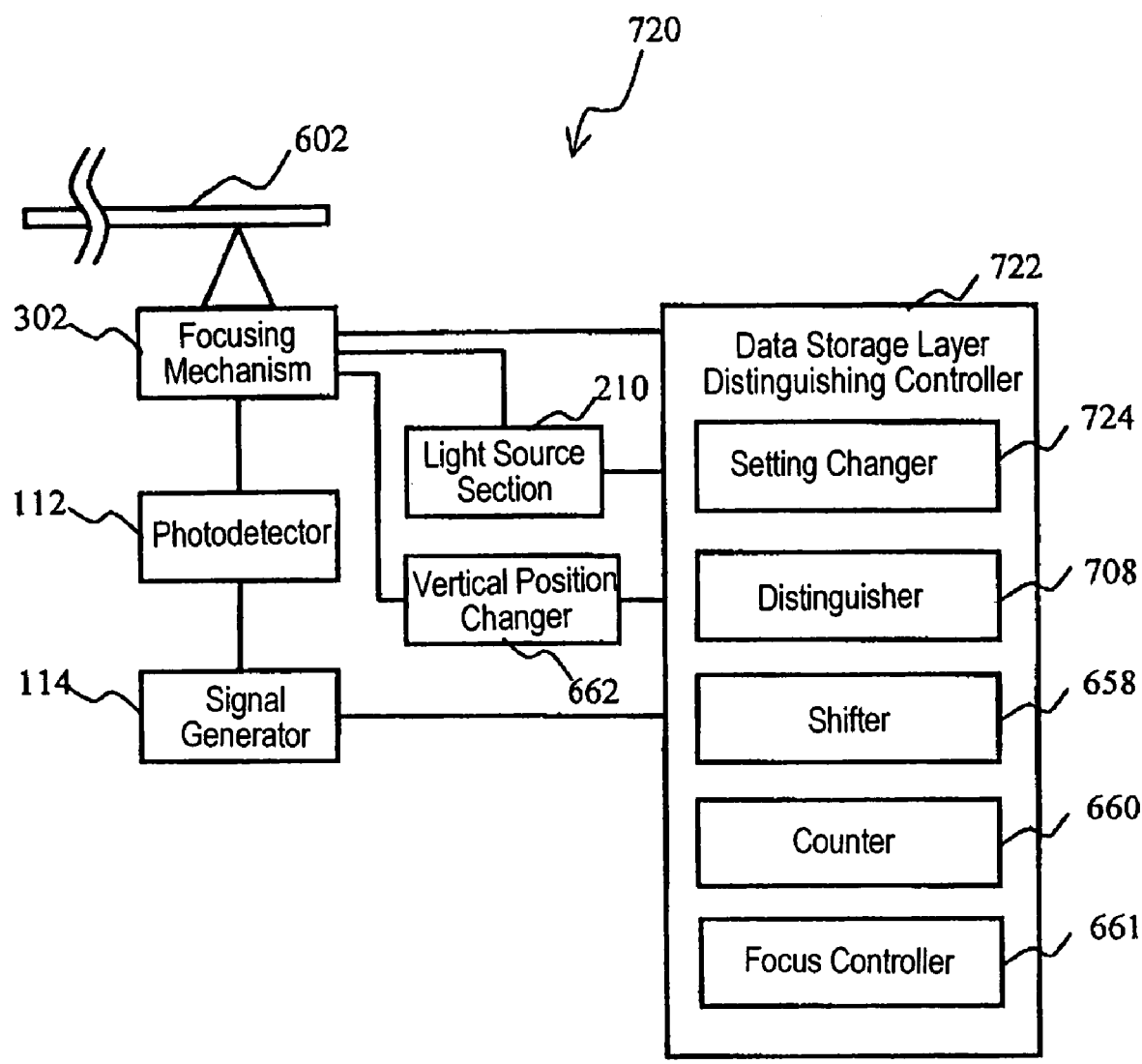
FIG. 43 is a block diagram schematically showing a configuration for an optical disc drive according to a ninth specific preferred embodiment of the present invention.

The sixth or seventh preferred embodiment of the present invention described above may be combined with the third preferred embodiment described above. FIG. 43 is a block diagram schematically showing a configuration for an optical disc drive according to a ninth specific preferred embodiment of the present invention. In FIG. 43, any component of the optical disc drive 720, having the same function as the counterpart of the optical disc drive of the third or eighth preferred embodiment described above, is identified by the same reference numeral as that used in FIG. 18 or 40. As shown in FIG. 43, the optical disc drive 720 of this ninth preferred embodiment preferably includes the focusing mechanism 302, the photodetector 112, the signal generator 114, the light source section 210, the vertical position changer 662, and a data storage layer distinguishing controller 722.

The data storage layer distinguishing controller 722 preferably includes a setting changer 724, the distinguisher 708, the shifter 658, the counter 660 and the focus controller 661. The setting changer 724 preferably sets the wavelength of the light beam to be emitted from the light source section 210 equal to the first wavelength, thereby setting the numerical aperture of the focusing mechanism 302 equal to the first numerical aperture. That is to say, the setting changer 724 preferably controls the light source section 210 such that the light source section 210 outputs a light beam with the first wavelength, thereby setting the numerical aperture of the focusing mechanism 302 equal to the first numerical aperture. Alternatively, the setting changer 724 may also sequentially select one of the multiple different wavelengths after another in the descending order (i.e., beginning with the longest one) so as to sequentially select one of the multiple numerical apertures after another in the ascending order (i.e., beginning with the smallest one).

It should be noted that the detailed configuration of the optical disc drive 720 may be the same as that shown in FIGS. 19 through 21, for example. The microcomputer of this ninth preferred embodiment functions as the data storage layer distinguishing controller 722.

Figure 44:
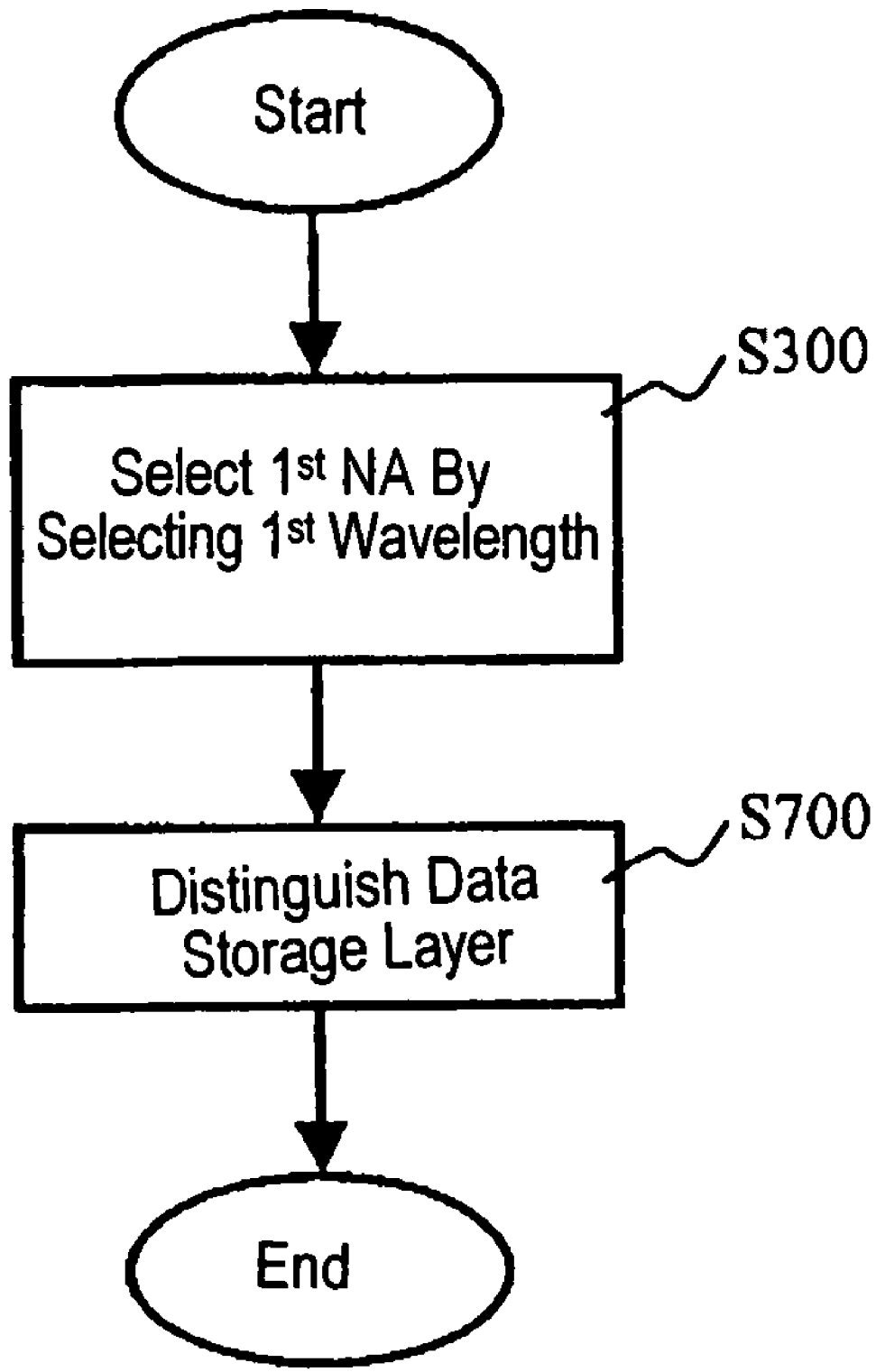
FIG. 44 is a flowchart showing the flow of a data storage layer distinguishing process according to the ninth preferred embodiment.
Figure 45:
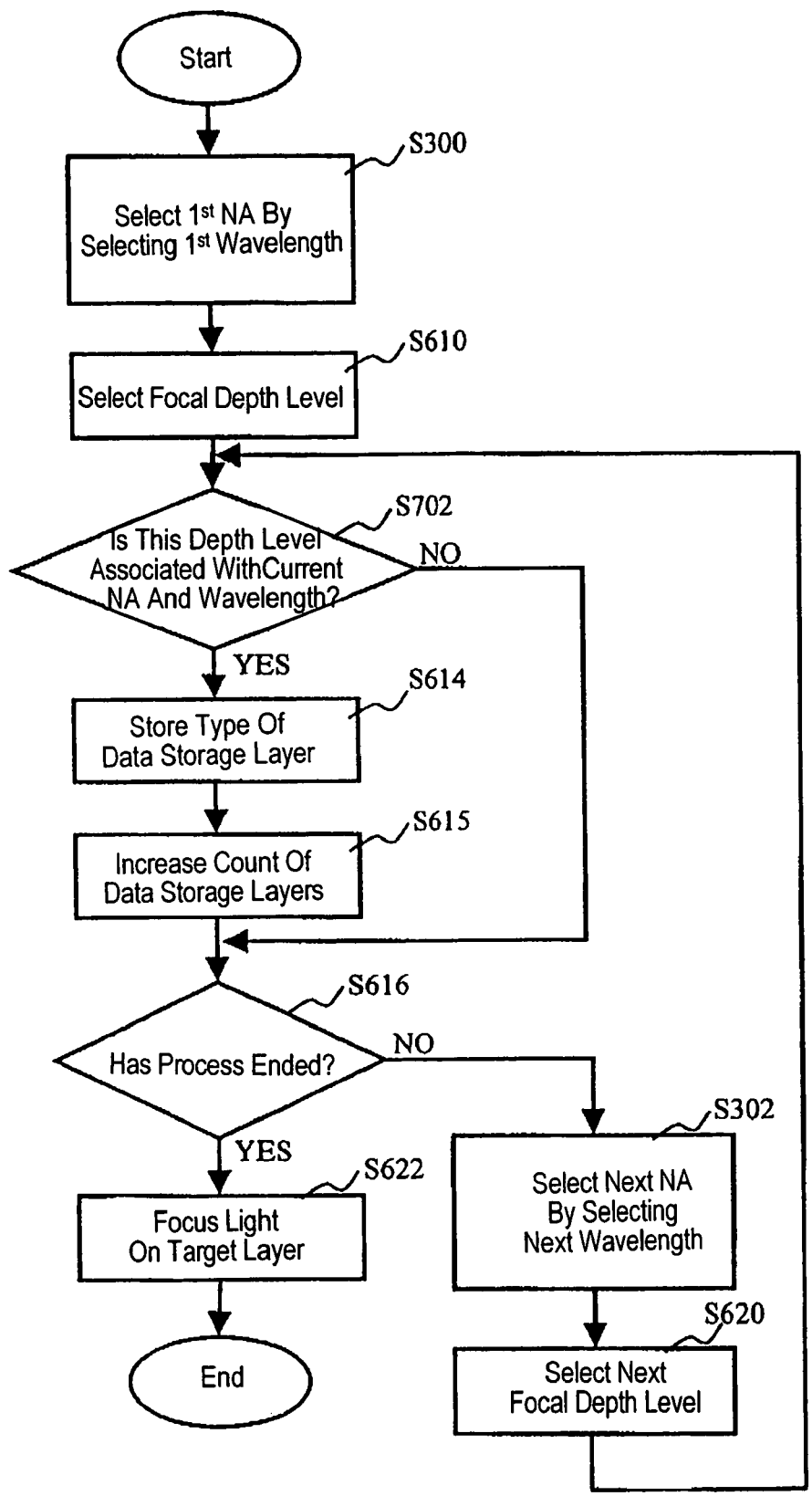
FIG. 45 is a flowchart showing the flow of the process of distinguishing a data storage layer with numerical apertures and wavelengths changed according to the ninth preferred embodiment.

Hereinafter, it will be described with reference to FIGS. 44 and 45 how the optical disc drive 720 of this ninth preferred embodiment operates. FIG. 44 is a flowchart showing the flow of the data storage layer distinguishing process of this ninth preferred embodiment. In FIG. 44, any process step equivalent to the counterpart of the process of the third or eighth preferred embodiment described above is identified by the same reference numeral as that used in FIG. 23 or 41. In this data storage layer distinguishing process, after the setting changer 724 has performed Step S300, the process advances to Step S700.

Hereinafter, it will be described how to distinguish the given data storage layer 610 while switching the numerical apertures and wavelengths. FIG. 45 is a flowchart showing the flow of the process of distinguishing the given data storage layer 610 with the numerical apertures and wavelengths changed. In FIG. 45, any process step equivalent to the counterpart of the process of the third or eighth preferred embodiment described above is identified by the same reference numeral as that used in FIG. 24 or 42. In this data storage layer distinguishing process, after Step S300 has been performed as described above, Steps S610 is carried out by controlling the focusing mechanism 302. Then, the process advances to Step S702.

In Step S616, the distinguisher 708 preferably determines whether or not to end this data storage layer distinguishing process. If the answer to the query of Step S616 is NO, the setting changer 724 preferably performs Step S302. Thereafter, Step S620 is carried out by controlling the focusing mechanism 302 and then the process returns to Step S702. In this data storage layer distinguishing process, the focus controller 661 may keep the focus control either OFF or ON at each level. Optionally, Steps S300 and S610 may be carried out in reverse order. Steps S302 and S620 may also be interchanged as well.

As described above, according to this ninth preferred embodiment, the data storage layer 610 can be distinguished with the numerical aperture of the focusing mechanism 302 set equal to the first numerical aperture by setting the wavelength of the light beam to be emitted from the light source section 302 equal to the first wavelength. Thus, a sufficient distance can be maintained between the optical disc 602 and the focusing mechanism 302, and therefore, collision between the focusing mechanism 302 and the optical disc 602 can be minimized.

Embodiment 10

Figure 46:
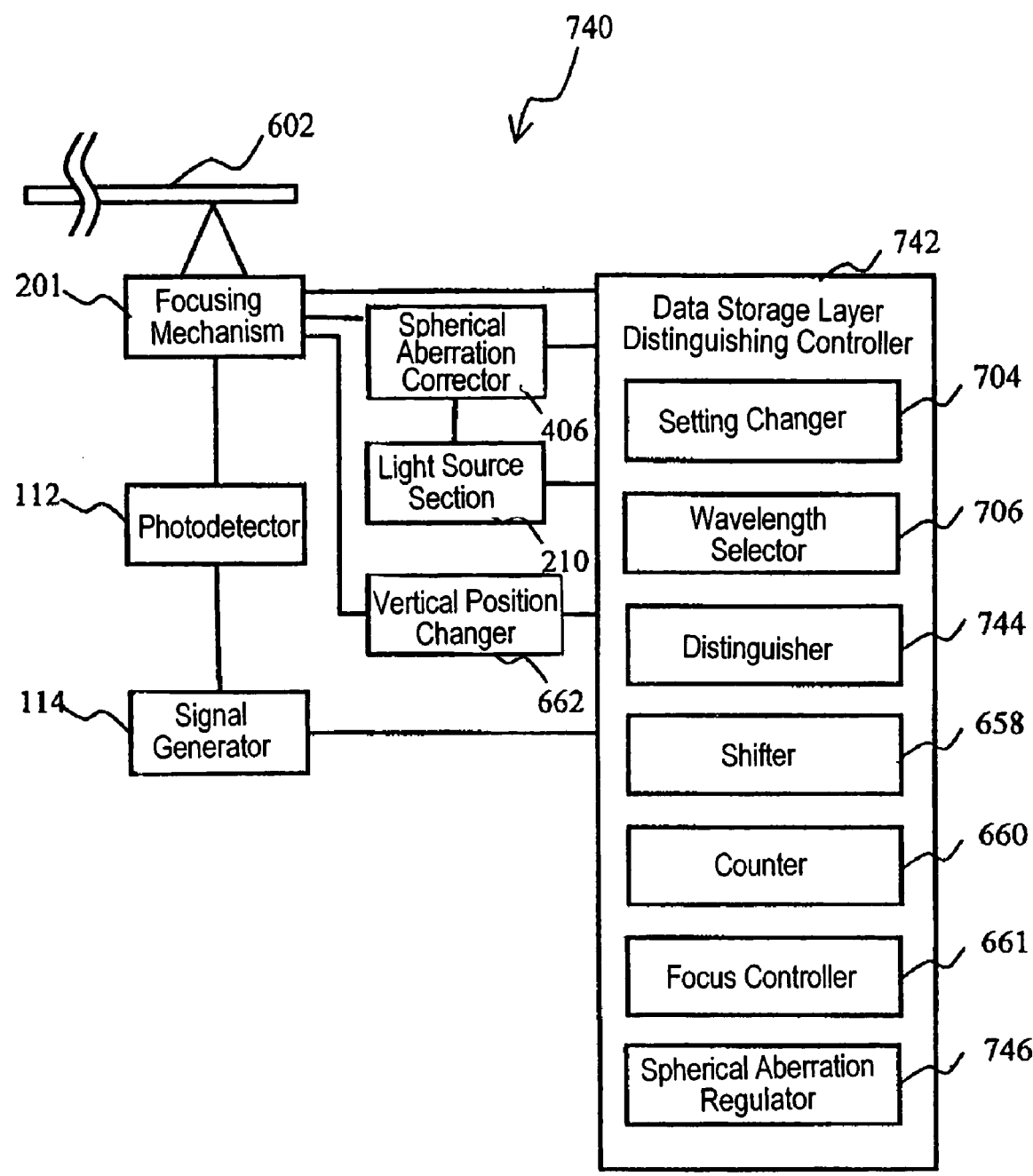
FIG. 46 is a block diagram schematically showing a configuration for an optical disc drive according to a tenth specific preferred embodiment of the present invention.

The eighth preferred embodiment of the present invention described above may be combined with the fourth preferred embodiment described above. FIG. 46 is a block diagram schematically showing a configuration for an optical disc drive according to a tenth specific preferred embodiment of the present invention. In FIG. 46, any component of the optical disc drive 740, having the same function as the counterpart of the optical disc drive of the fourth or eighth preferred embodiment described above, is identified by the same reference numeral as that used in FIG. 25 or 40. As shown in FIG. 46, the optical disc drive 740 of this tenth preferred embodiment preferably includes the focusing mechanism 201, the photodetector 112, the signal generator 114, the light source section 210, a data storage layer distinguishing controller 742, a spherical aberration corrector 406, and the vertical position changer 662. The data storage layer distinguishing controller 742 preferably includes a setting changer 704, a wavelength selector 706, a distinguisher 744, the shifter 658, the counter 660, the focus controller 661 and a spherical aberration regulator 746.

If the setting changer 704 sets the numerical aperture of the focusing mechanism 201 equal to a first numerical aperture, then the spherical aberration regulator 746 preferably outputs a control signal that sets the magnitude of correction to be made by the spherical aberration corrector 406 equal to a first correction value corresponding to the deepest level of the data storage layer as measured from the surface 613. Alternatively, the spherical aberration regulator 746 may also set the magnitude of correction to be made by the spherical aberration corrector 406 equal to a second correction value corresponding to a level that is deeper than at least one of multiple levels of the data storage layers as measured from the surface 613.

The multiple different depth levels as measured from the surface 613 may fall within at least one of the ranges of 1.2+0.3 mm to 1.2−0.1 mm, 0.6+0.53 mm to 0.6−0.5 mm, 100+5 μm to 100−5 μm, and 75+5 μm to 75−5 μm or may fall within any other range. The second correction value may or may not correspond to any of these different depth levels. Also, the spherical aberration regulator 746 may also sequentially select spherical aberration correction values in the order of the depths (i.e., a spherical aberration correction value corresponding to the deepest layer from the surface 613 first). The distinguisher 744 preferably operates just in the same way as the distinguisher 708 of the eighth preferred embodiment described above, thereby determining whether or not the given data storage layer 610 is associated with the currently selected numerical aperture, wavelength and spherical aberration correction value.

It should be noted that the detailed configuration of the optical disc drive 740 may be the same as that shown in FIGS. 26 and 27. Alternatively, the optical disc drive 740 may also have the configuration shown in FIGS. 3 through 5. In that case, the spherical aberration correcting lens 422 and spherical aberration correcting actuator 420 are preferably provided for at least one of the optical heads 140, 142 and 144 and a beam expander 414 is preferably provided so as to drive the spherical aberration correcting actuator 420. The microcomputer of this tenth preferred embodiment preferably functions as the data storage layer distinguishing controller 742.

Figure 47:
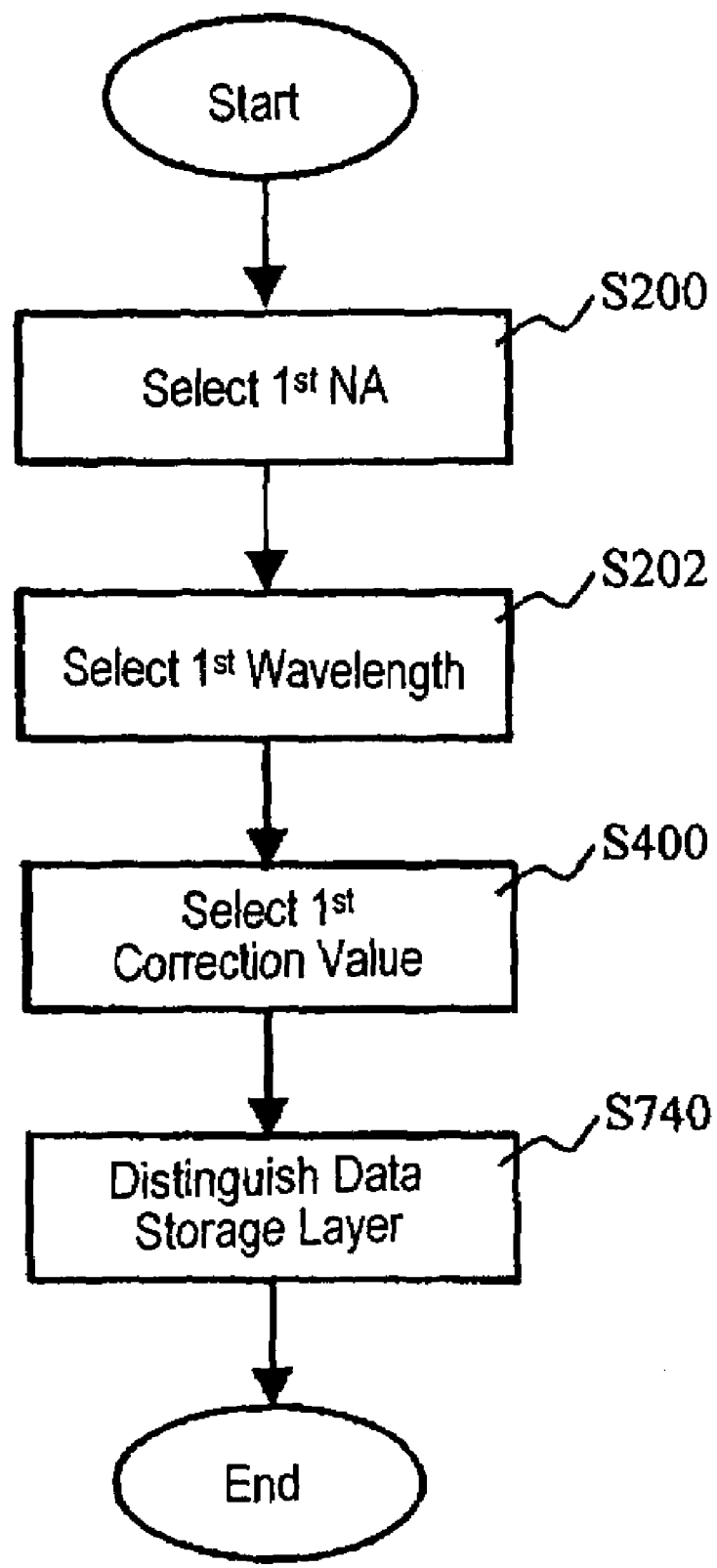
FIG. 47 is a flowchart showing the flow of a data storage layer distinguishing process according to the tenth preferred embodiment.
Figure 48:
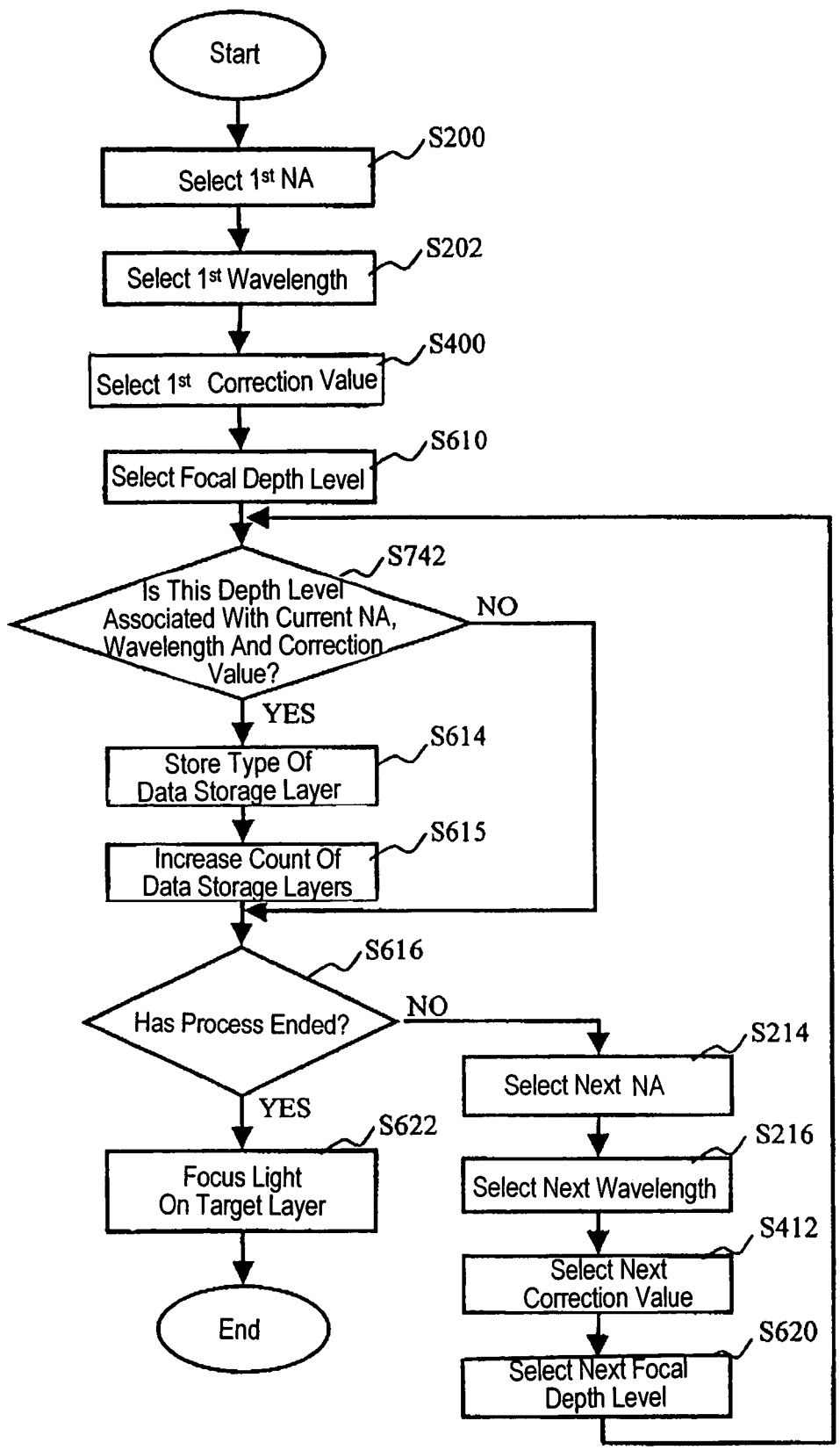
FIG. 48 is a flowchart showing the flow of the process of distinguishing a data storage layer with numerical apertures, wavelengths and spherical aberration correction values changed according to the tenth preferred embodiment.

Hereinafter, it will be described with reference to FIGS. 47 and 48 how the optical disc drive 740 of this tenth preferred embodiment operates. FIG. 47 is a flowchart showing the flow of the data storage layer distinguishing process of this tenth preferred embodiment. In FIG. 47, any process step equivalent to the counterpart of the process of the fourth preferred embodiment described above is identified by the same reference numeral as that used in FIG. 30. In this data storage layer distinguishing process, after the setting changer 704, wavelength selector 706 and spherical aberration regulator 746 have performed Steps S200, S202 and S400, respectively, the distinguisher 744 preferably distinguishes the given data storage layer 610 in Step S740 by the first numerical aperture, first wavelength and first correction value that have been selected in Steps S200, S202 and S400, respectively. These process steps S200, S202 and S400 do not have to be carried out in this order but may be done in any other order.

Hereinafter, it will be described how to distinguish the given data storage layer 610 while switching the numerical apertures, wavelengths and spherical aberration correction values. FIG. 48 is a flowchart showing the flow of the process of distinguishing the given data storage layer 610 with the numerical apertures, wavelengths and spherical aberration correction values changed. In FIG. 48, any process step equivalent to the counterpart of the process of the fourth or eighth preferred embodiment described above is identified by the same reference numeral as that used in FIG. 31 or 42. In this data storage layer distinguishing process, after Step S400 has been performed as described above, Step S610 is carried out by controlling the focusing mechanism 201. Next, in Step S742, the distinguisher 744 determines, in accordance with the signal supplied from the signal generator 114, whether or not there is the data storage layer associated with the currently selected numerical aperture, wavelength and spherical aberration correction value at the depth level that the light beam spot has just passed. For example, the distinguisher 744 may determine, by the voltage level of the detection signal obtained from the optical disc 602, whether or not there is the data storage layer associated with the currently selected numerical aperture, wavelength and spherical aberration correction value.

If the answer to the query of Step S742 is NO, the process skips steps S614 and S615 so as to jump to Step S616. On the other hand, if the answer is YES, then the process advances to Steps S614 and S615. In Step S616, the shifter 658 preferably determines whether or not the data storage layer distinguishing process has ended. If the answer to the query of Step S616 is NO, the setting changer 704, wavelength selector 706 and spherical aberration regulator 746 preferably perform Steps S214, S216 and S412, respectively. Thereafter, Step S620 is carried out by controlling the focusing mechanism 201 and then the process returns to Step S742. In this data storage layer distinguishing process, the focus controller 661 may keep the focus control either OFF or ON at each depth level. Optionally, Steps S200, S202, S400 and S610 may be carried out in a different order. Steps S214, S216, S412 and S620 may also be carried out in any other order, too.

As described above, according to this tenth preferred embodiment, the data storage layer 610 is distinguished with the wavelength of the light beam emitted from the light source section 210 set equal to the first wavelength, the numerical aperture of the focusing mechanism 201 set equal to the first numerical aperture, and the spherical aberration correction to be made by the spherical aberration corrector 406 set equal to the first correction value. Thus, a sufficient distance can be maintained between the optical disc 602 and the focusing mechanism 201, and therefore, collision between the focusing mechanism 201 and the optical disc 602 can be minimized.

Embodiment 11

Figure 49:
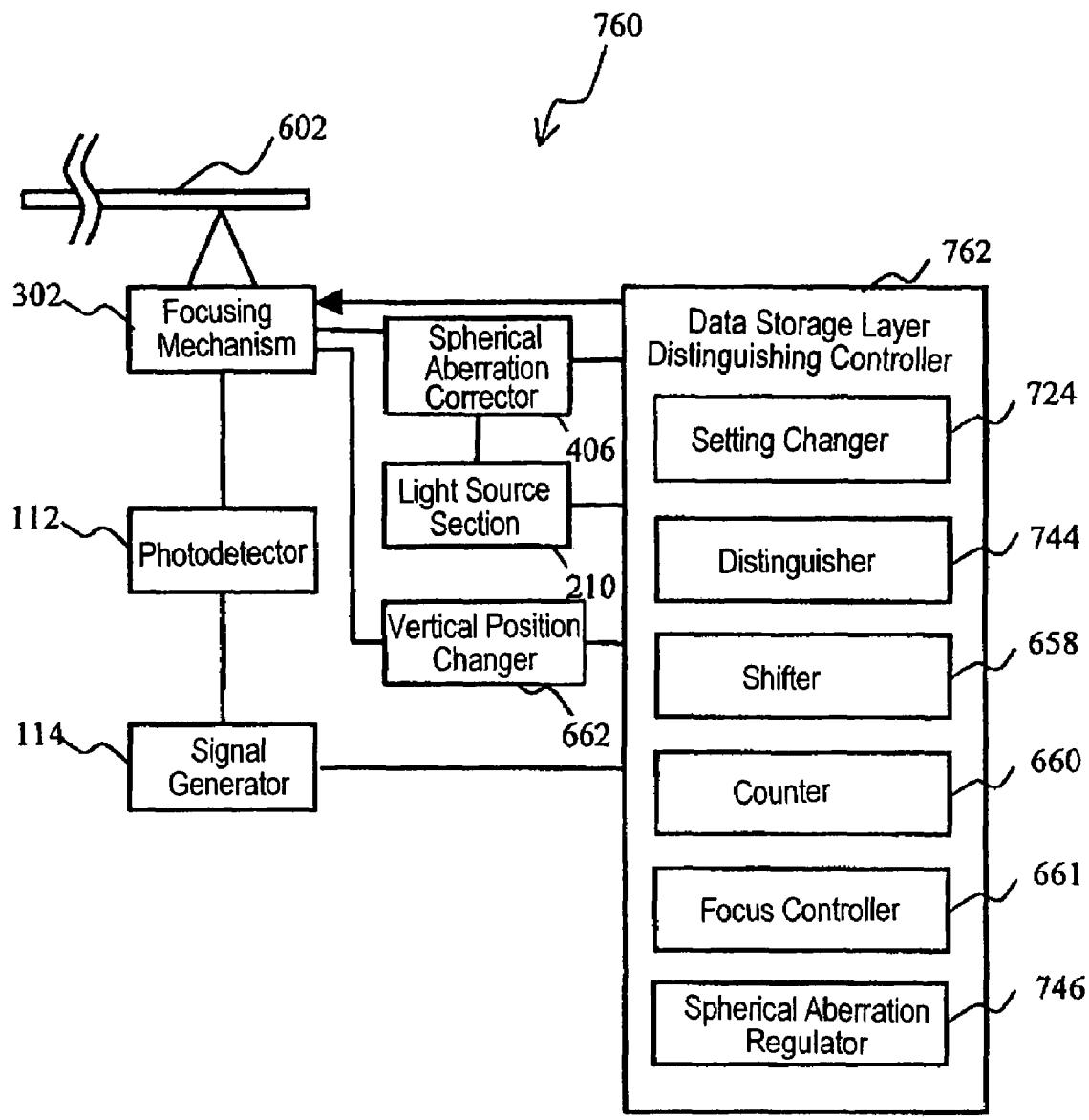
FIG. 49 is a block diagram schematically showing a configuration for an optical disc drive according to an eleventh specific preferred embodiment of the present invention.

The ninth preferred embodiment of the present invention described above may be combined with the fifth preferred embodiment described above. FIG. 49 is a block diagram schematically showing a configuration for an optical disc drive according to an eleventh specific preferred embodiment of the present invention. As shown in FIG. 49, the optical disc drive 760 of this eleventh preferred embodiment preferably includes the focusing mechanism 302, the photodetector 112, the signal generator 114, the light source section 210, a data storage layer distinguishing controller 762, a spherical aberration corrector 406, and the vertical position changer 662. The data storage layer distinguishing controller 762 preferably includes a setting changer 724, the distinguisher 744, the shifter 658, the counter 660, the focus controller 661 and the spherical aberration regulator 746.

The optical disc drive 760 of this eleventh preferred embodiment operates substantially in the same way as the counterpart of the tenth preferred embodiment described above except that the optical disc drive 760 defines the numerical aperture by setting the wavelength of the light beam. That is to say, in this eleventh preferred embodiment, Steps S200 and S202 shown in FIGS. 47 and 48 are replaced with Step S300 and Steps S214 and S216 are replaced with Step S302.

Embodiment 12

Figure 50:
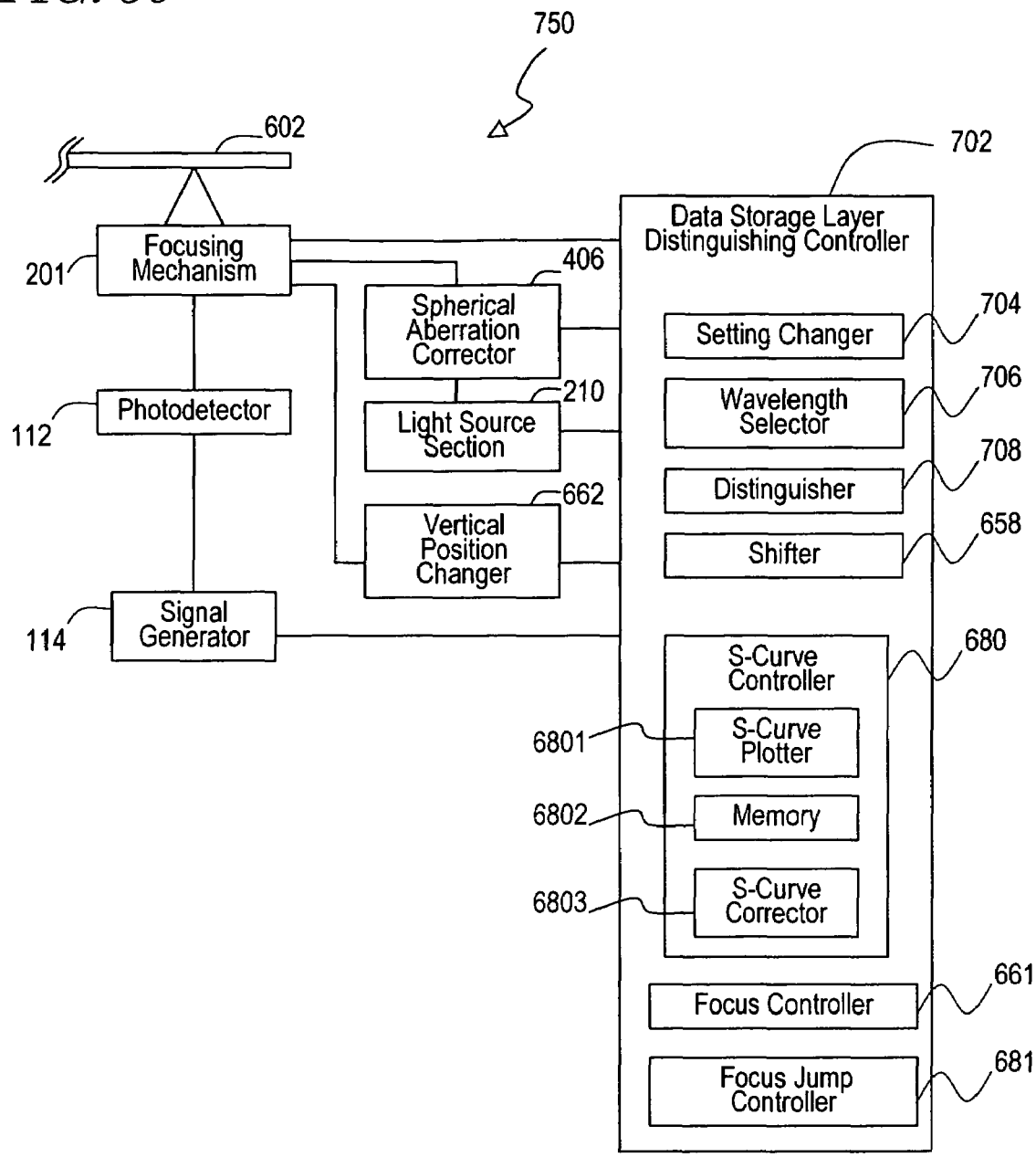
FIG. 50 is a block diagram schematically showing a configuration for an optical disc drive according to a twelfth specific preferred embodiment of the present invention.

FIG. 50 is a block diagram schematically showing a configuration for an optical disc drive according to a twelfth specific preferred embodiment of the present invention. In FIG. 50, any component of the optical disc drive 750, having the same function as the counterpart of the optical disc drive of the eighth, ninth or tenth preferred embodiment described above, is identified by the same reference numeral as that used in FIG. 46. As shown in FIG. 50, the optical disc drive 750 of this twelfth preferred embodiment preferably includes the focusing mechanism 201, photodetector 112, signal generator 114, spherical aberration corrector 406, light source section 210, vertical position changer 662 and a data storage layer distinguishing controller 702.

The data storage layer distinguishing controller 702 preferably includes the setting changer 704, wavelength selector 706, distinguisher 708, shifter 658, an S-curve controller 680, the focus controller 661 and a focus jump controller 681.

The S-curve controller 680 preferably includes an S-curve plotter 6801, a memory 6802 and an S-curve corrector 6803. The S-curve plotter 6801 preferably plots an S-curve for each of multiple numerical apertures. A signal representing the amplitude of the S-curve plotted or the magnitude of offset is preferably stored in the memory 6802. The S-curve corrector 6803 preferably adjusts, in response to a signal representing the amplitude or offset stored, the amplitude and balance of the focus error signal to be actually input to the focus controller 661 for the purpose of focus control.

Just like the setting changer 606 of the sixth and seventh preferred embodiments, the setting changer 704 preferably outputs a control signal that defines the numerical aperture of the focusing mechanism 201. The control operation of setting the numerical aperture of the focusing mechanism 201 may be carried out independently of the control operation of setting the wavelength of the light beam. Just like the distinguisher 608 of the eighth and ninth preferred embodiments, the distinguisher 708 preferably determines whether or not the data storage layer 610 of the optical disc 602 loaded (see FIG. 35) is associated with the currently selected numerical aperture and wavelength.

If the setting changer 704 sets the numerical aperture of the focusing mechanism 201 equal to the first numerical aperture, then the wavelength selector 706 preferably controls the light source section 210 such that the wavelength of the light beam emitted from the light source section 210 is set equal to the first wavelength described above. Alternatively, the wavelength selector 706 may also control the light source section 210 such that the wavelength of the light beam emitted from the light source section 210 is set equal to the second wavelength described above. Optionally, the wavelength selector 706 may sequentially select one of the multiple different wavelengths after another in the descending order (i.e., the longest wavelength first).

In this case, every time each numerical aperture and its associated wavelength are selected, the shifter 658 preferably brings the focusing mechanism 201 either toward, or away from, the optical disc 602. And by getting the resultant S-curve signal detected by an A/D converter, the local maximum or minimum value of the S-curved FE signal can be detected and the amplitude and offset of the S-curve can be obtained.

It should be noted that the detailed configuration of the optical disc drive 750 may be the same as that shown in FIGS. 13 through 15. The microcomputer of this twelfth preferred embodiment functions as the data storage layer distinguishing controller 702.

Hereinafter, it will be described with reference to FIGS. 51 and 52 how the optical disc drive 750 of this preferred embodiment operates.

Figure 51:
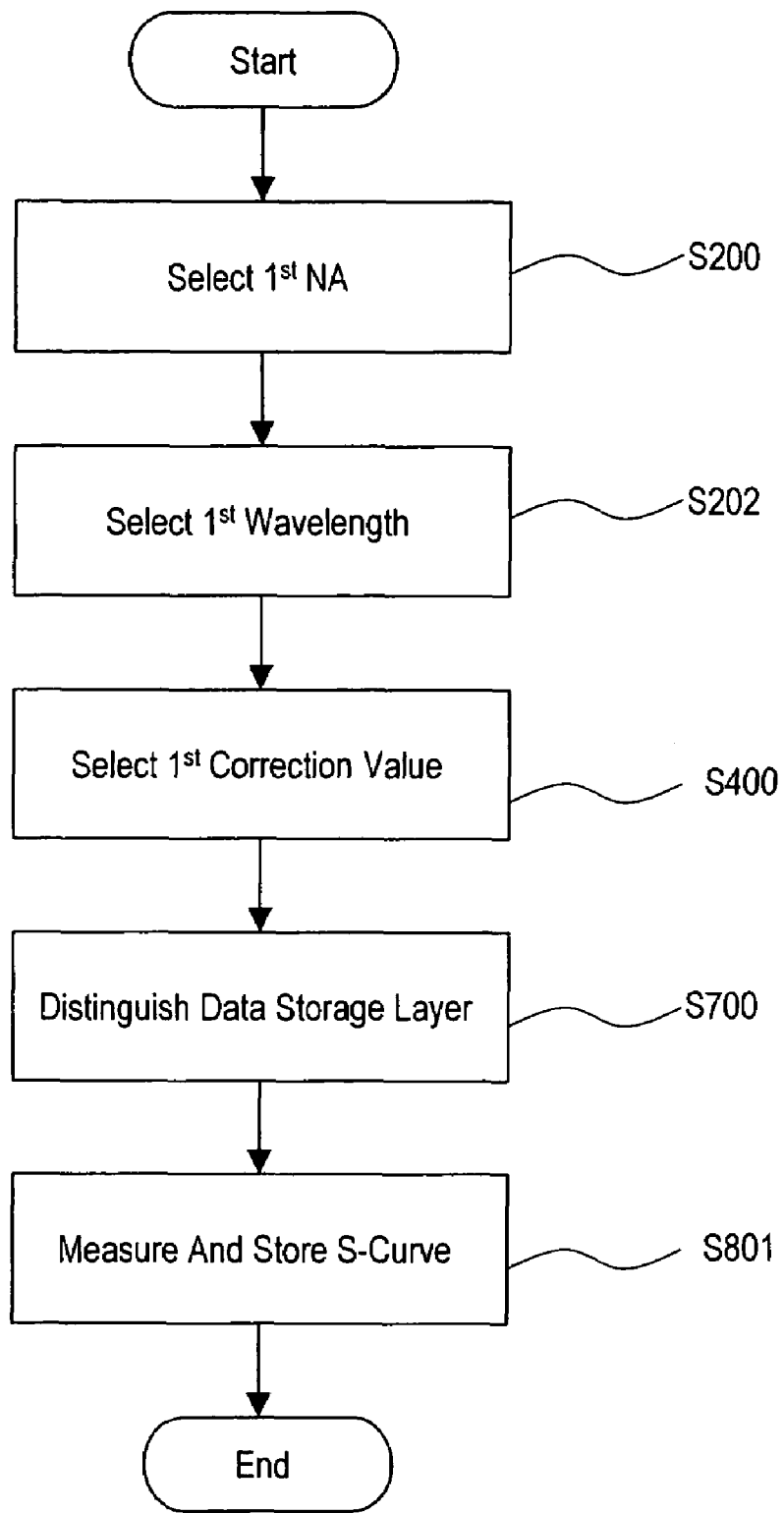
FIG. 51 is a flowchart showing the flow of a data storage layer distinguishing process according to the twelfth preferred embodiment.
Figure 52:
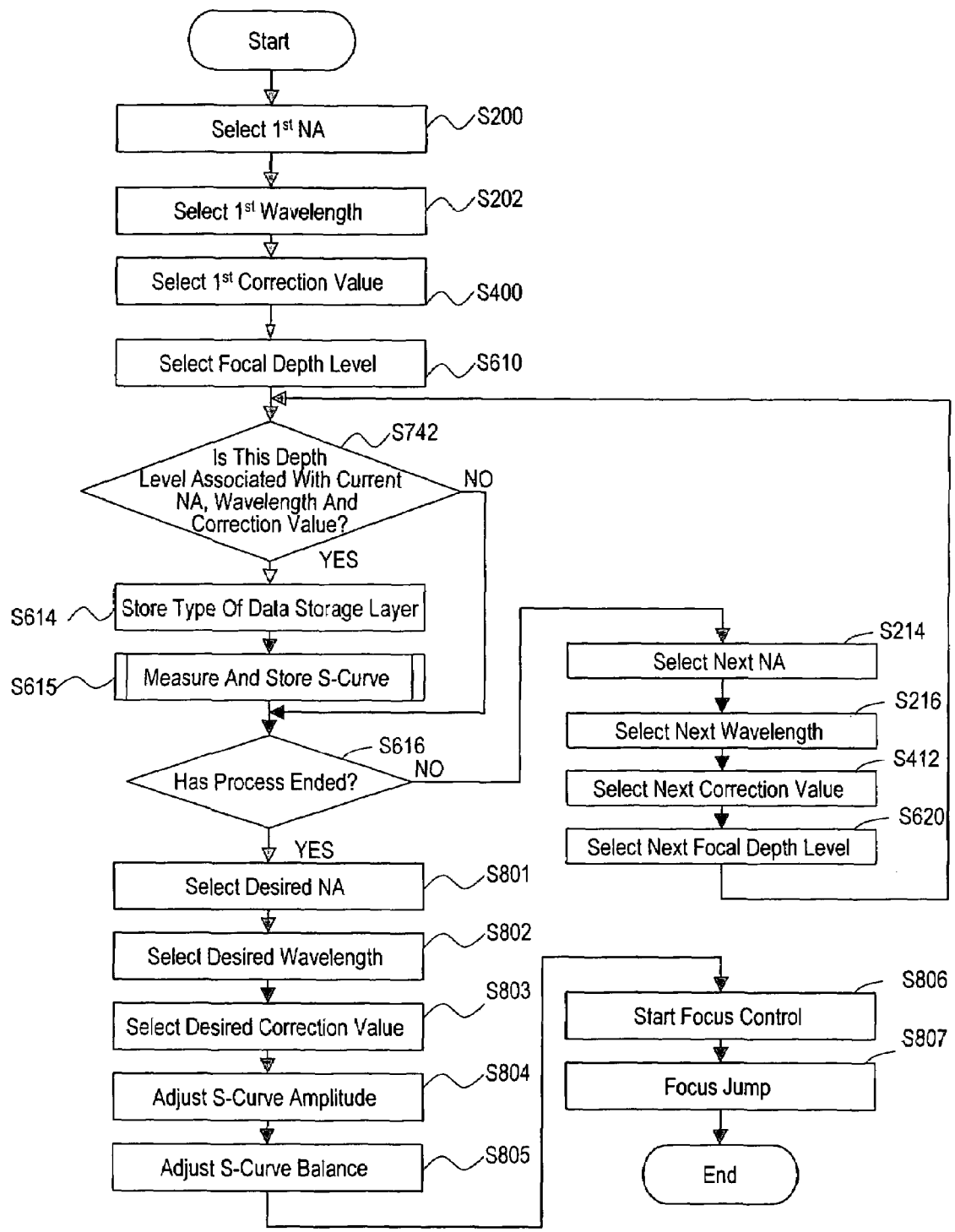
FIG. 52 is a flowchart showing the flow of the process of distinguishing a data storage layer with numerical apertures, wavelengths and spherical aberration correction values changed according to the twelfth preferred embodiment.

FIGS. 51 and 52 are flowcharts showing two possible flows of the data storage layer distinguishing process of this twelfth preferred embodiment. In FIGS. 51 and 52, any process step equivalent to the counterpart of the process of the second or eighth preferred embodiment described above is identified by the same reference numeral as that used in FIG. 16 or 41.

In this data storage layer distinguishing process, after the setting changer 704 and wavelength selector 706 have performed Steps S200 and S202, respectively, the spherical aberration regulator 404 preferably controls the spherical aberration corrector 406 in Step S400 such that the magnitude of spherical aberration correction to be made is set equal to the first correction value. Then, the distinguisher 708 preferably distinguishes the data storage layer 610 in Step S700 by the first numerical aperture and first wavelength that have been'selected in Steps S200 and S202, respectively.

The distinguisher 708 shown in FIG. 50 preferably receives a signal representing the detected portion of the reflected light from the optical disc 602, on which the light beam has been focused by way of the objective lens, for example, and preferably distinguishes the data storage layer 610 in accordance with that signal.

The distinguisher. 708 may distinguish the given data storage layer 610 (e.g., discover the layer number of the given data storage layer 610 to locate it in the depth direction) by the FE signal, TE signal, AS signal, RF signal or a combination thereof. The distinguisher 708 may distinguish among all types of data storage layers 610 either by the first numerical aperture and the first wavelength or by switching the numerical apertures and wavelengths. Optionally, Steps S200 and S202 may be carried out in reverse order.

Also, the distinguisher 708 may distinguish all or just some of the data storage layers 610 included in the optical disc 602 loaded in the optical disc drive 740.

In Step S700, the shifter 658 shown in FIG. 50 preferably drives and controls the vertical position changer 662 such that the light beam is sequentially focused on one of the multiple data storage layers after another from the deepest one (as measured from the surface 613) toward the surface 613. Alternatively, the shifter 658 may also control the vertical position changer 662 such that the light beam is sequentially focused on one of the multiple data storage layers after another from the shallowest one (as measured from the surface 613) toward the deepest one. The distinguisher 708 preferably distinguishes the respective data storage layers 610 by the waveforms shown in FIG. 53.

Figure 53:
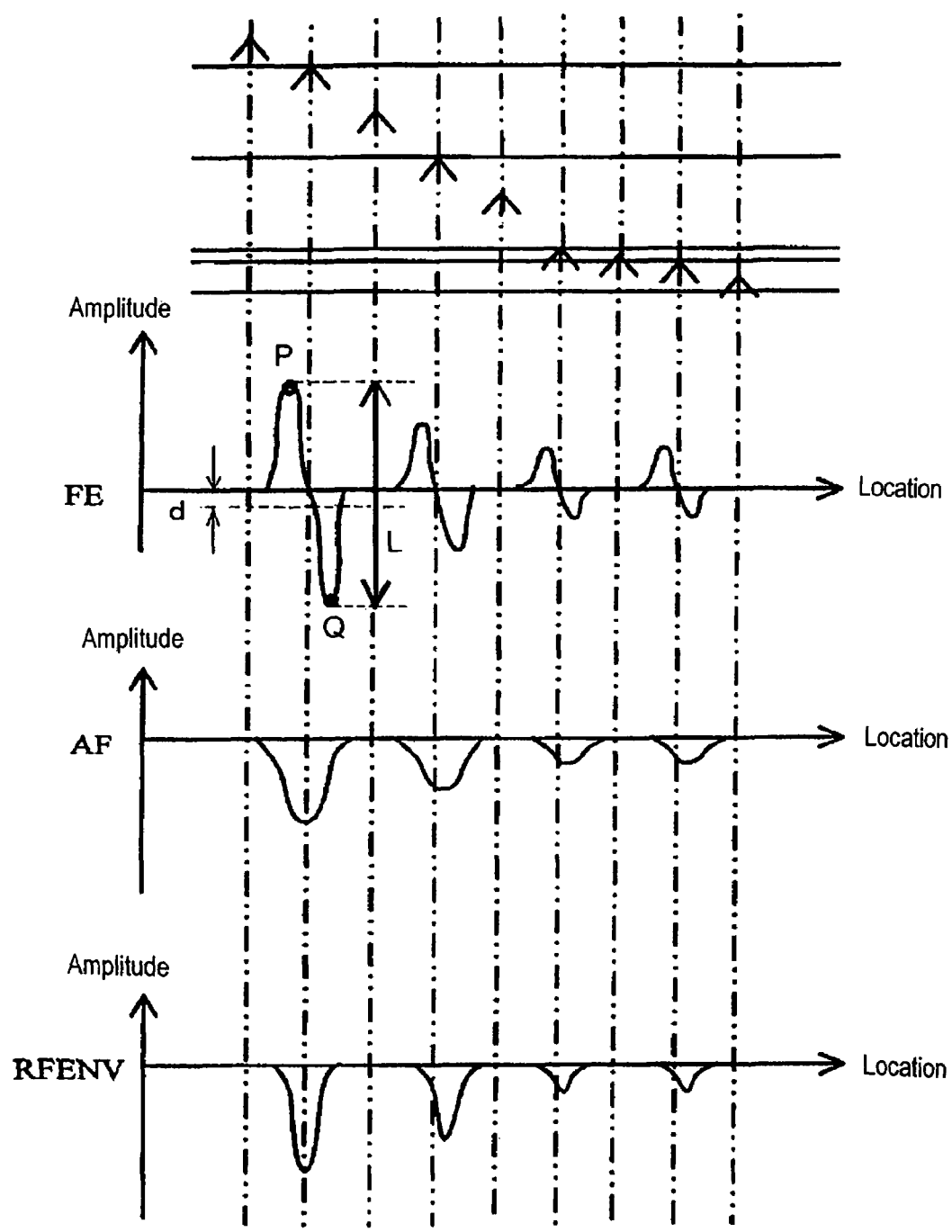
FIG. 53 shows how to distinguish a given data storage layer according to the twelfth preferred embodiment.

Also, the S-curve plotter 6801 shown in FIG. 50 preferably obtains the local maximum point P and local minimum point Q of the FE signal on the data storage layer associated with the numerical aperture and wavelength that were selected as shown in FIG. 53, thereby deriving the amplitude L and offset d from the local maximum and minimum points P and Q. The measuring of these parameters that characterize the S-curve of such an FE signal will be simply referred to herein as "S-curve plotting".

The amplitude L and offset d thus obtained are preferably stored in the memory 6802 shown in FIG. 50. The S-curve corrector 6803 preferably corrects the parameters of the S-curved FE signal to be input to the focus controller 661, including the amplitude and balance of the FE signal, thereby ensuring constant focusing performance.

After the S-curve corrector 6803 has corrected the FE signal, the focus controller 661 preferably focuses the light beam on the desired data storage layer first based on the result of decision made by the distinguisher 608.

Hereinafter, it will be described how to distinguish the given data storage layer 610 while switching the numerical apertures and wavelengths. FIG. 52 is a flowchart showing the flow of the process of distinguishing the given data storage layer 610 with the numerical apertures and wavelengths changed. In FIG. 52, any process step equivalent to the counterpart of the process of the second, sixth or seventh preferred embodiment described above is identified by the same reference numeral as that used in FIG. 17 or 39.

In this data storage layer distinguishing process, after Step S400 has been performed as described above, Step S610 is carried out by controlling the focusing mechanism 201. Next, in Step S742, the distinguisher 708 shown in FIG. 50 preferably determines, in accordance with the signal supplied from the signal generator 114, whether or not the target data storage layer associated with the currently selected numerical aperture, wavelength and correction value is located just at the depth level that the light beam spot has passed. For example, according to the voltage level of the signal detected from the optical disc 602, the distinguisher 708 may determine whether or not the data storage layer associated with the selected numerical aperture, wavelength and correction value is located at that depth level.

If the answer to the query of Step S742 is NO, the process skips steps S614 and S615 so as to jump to Step S616. On the other hand, if the answer to the query of Step S742 is YES, then the process advances to Steps S614 and S615. In Step S616, the shifter 658 preferably determines whether or not the data storage layer distinguishing process has ended. If the answer to the query of Step S616 is NO, the setting changer 704, wavelength selector 706 and spherical aberration corrector 406 preferably perform Steps S214, S216 and S412, respectively. Thereafter, Step S620 is carried out by controlling the focusing mechanism 201 and then the process returns to Step S742. In this data storage layer distinguishing process, Steps S200, S202, S400 and S610 may be carried out in a different order. Steps S214, S216, S412 and S620 may also be carried out in any other order, too.

After the data storage layer 610 to be accessed has been distinguished by switching the numerical apertures and wavelengths in this manner, desired numerical aperture, wavelength and spherical aberration correction value, associated with that data storage layer 610, are preferably defined in Steps S801, S802 and S803, respectively.

Thereafter, in Step S804, the amplitude of the S-curved signal measured and stored is preferably corrected into a predetermined value such that the offset becomes zero. Subsequently, in Step S805, the balance of the S-curved signal is preferably adjusted. Then, the focus control is preferably started in Step S806 and a focus jump operation is preferably performed in Step S807.

If the optical disc loaded in the optical disc drive 750 has three data storage layers L0, L1 and L2, for example, the FE signal will show three S-curves when the focal point of the light beam crosses the three data storage layers. These portions will be referred to herein as "S-curved signals". The S-curve controller 680 preferably measures the parameter values (including amplitudes and offsets) of the S-curved signals obtained from the respective data storage layers and then stores those parameter values in the memory 6802 of the optical disc drive 750.

When the focus jump controller 681 shown in FIG. 50 shifts the focal point of the light beam from one data storage layer to another, the FE signal is preferably corrected in accordance with the amplitudes and offsets of the S-curved signals stored in the memory 6802 for the respective data storage layers. In this preferred embodiment, using this corrected FE signal, accelerating and decelerating pulses are applied for the purpose of focus jumping, thereby driving the lens actuator.

In the following example, the focus jump operation is supposed to be carried out to shift the focal point from the vicinity of the shallowest data storage layer L2 to the deepest data storage layer L0 to make the basic idea of the present invention more easily understandable.

Figure 54:
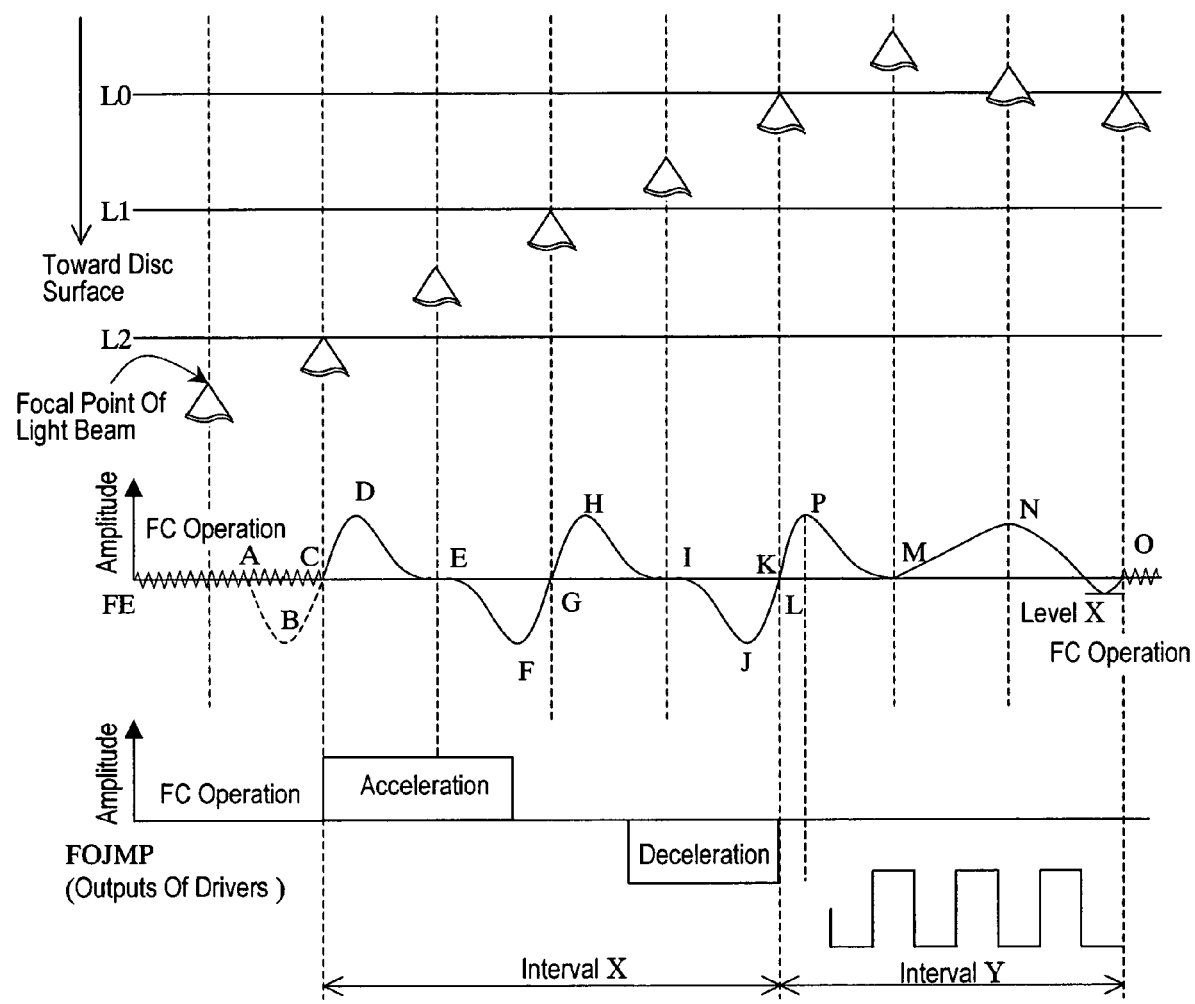
FIG. 54 shows how to perform focus jump operations according to the twelfth preferred embodiment.

First, referring to FIG. 54, shown is a relationship between the control signal supplied in shifting the focal point from the data storage layer L2 to the data storage layer L0 and the focal point of the light beam. As the focal point of the light beam, formed by the focusing mechanism 201 of the optical disc drive 750 of this preferred embodiment at point A that is closer to the protective layer of the optical disc 602, is shifted deeper toward the data storage layer L2, the quantity of light reflected from the data storage layer L2 increases. As a result, the FE signal with approximately zero amplitude increases its amplitude in the negative domain. The amplitude of the FE signal reaches its peak at point B, and then decreases. And when the focal point reaches the data storage layer L2 (at point C), the amplitude of the FE signal becomes equal to zero. Optionally, a focus control may be once carried out on the data storage layer L2 at this point in time, and then the following processes may be performed. It should be noted that the waveform of the FE signal as represented by the solid zigzag line to the point C shows such a situation where a focus control is being carried out on the data storage layer L2.

Next, as the focal point is shifted from the data storage layer L2 deeper toward the data storage layer L1, the FE signal with the approximately zero amplitude increases its amplitude in the positive domain. The amplitude of the FE signal reaches its peak at point D, gradually decreases, and then becomes equal to zero at point E. As the focal point comes even closer to the data storage layer L1, the quantity of light reflected from the data storage layer L1 increases. Thus, the FE signal with approximately zero amplitude increases its amplitude in the negative domain. The amplitude of the FE signal reaches its peak at point F, and then decreases. And when the focal point reaches the data storage layer L1 (at point G), the amplitude of the FE signal becomes equal to zero.

Thereafter, as the focal point is shifted from the data storage layer L1 deeper toward the data storage layer L0, the FE signal with the approximately zero amplitude increases its amplitude in the positive domain. The amplitude of the FE signal reaches its peak at point H, decreases gradually and then becomes equal to zero at point I. As the focal point comes even closer to the data storage layer L0, the quantity of light reflected from the data storage layer L0 increases. Thus, the FE signal with approximately zero amplitude increases its amplitude in the negative domain. The amplitude of the FE signal reaches its local minimum at point J, and then decreases. And when the focal point reaches the data storage layer L0 (at point K), the amplitude of the FE signal becomes equal to zero.

Next, the focal point goes beyond the data storage layer L0. As the focal point is further shifted even deeper than the data storage layer L0, the FE signal with the approximately zero amplitude increases its amplitude in the positive domain. The amplitude of the FE signal reaches its peak at point P, decreases gradually and then becomes equal to zero at point M, where the focal point starts being shifted in the opposite direction (i.e., back toward the incident plane of the optical disc 602). Then, the FE signal with the approximately zero amplitude increases its amplitude in the positive domain again. The amplitude of the FE signal reaches its peak at point N, decreases gradually and finally reaches a focus controllable level at point O. Then, the focus jump operation ends and a focus control operation starts instead.

The point M is the deepest position (i.e., most distant) from the incident plane of the optical disc 602. Accordingly, when the focal point reaches the point M, the convergent lens is located closest to the optical disc 602. In the optical disc drive of this preferred embodiment, however, the convergent lens never collides with the optical disc 602.

Next, it will be described what control signals are generated to perform the focus jump operation described above. In shifting the focal point from the data storage layer L2 toward the data storage layer L0, the microcomputer of the optical disc drive 750 applies an acceleration signal and a deceleration signal to the circuit for driving the lens actuator in the focusing mechanism 201, thereby shifting the focal point within the interval X. It should be noted that in shifting the focal point from the data storage layer L2 toward the data storage layer L0 within the interval X, the same control signals are used as in shifting the focal point from the data storage layer L0 toward the data storage layer L2 but the polarities of the acceleration and deceleration signals for use in this focus jump operation are opposite to those of the acceleration and deceleration signals for use in the focus jump operation described above. Thus, the control signal to be applied while the focal point is being shifted within the interval Y will be described.

When the focal point reaches the point K, the microcomputer stops applying the deceleration signal and the optical disc drive 750 enters a standby state to generate no control signals. However, even when the deceleration signal is no longer applied, the convergent lens continues moving for a while due to inertia force and the focal point also continues being shifted beyond the data storage layer L0 at a substantially constant velocity. As a result, the amplitude of the FE signal also increases in the positive domain and reaches its peak at the point P.

Thereafter, when the focal point passes the point P corresponding to that peak, the microcomputer generates a decelerating pulse train to decrease the focus shifting velocity. As a result, the convergent lens is accelerated in the opposite direction (i.e., back toward the incident plane of the optical disc 602) and the focal point decreases its shifting velocity.

Then, the convergent lens will stop moving before the FE signal crosses the zero level at the point M. However, the microcomputer will keep on generating the decelerating pulse train even after that. Consequently, the focal point is shifted toward the data storage layer L0 again and the amplitude of the FE signal increases in the positive domain again. Subsequently, the amplitude of the FE signal reaches its peak at point N and then gradually decreases. The microcomputer will still keep on generating the decelerating pulses until the level of the FE signal reaches the focus controllable level. After that, the microcomputer will start a focus control operation on the data storage layer L0.

Once the amplitude of the FE signal crosses the zero level (at the point M) after having reached its peak (at the point P), it is normally impossible to perform a focus control operation on the data storage layer L0. However, if the focal point of the light beam is shifted in the opposite direction after that, then the FE signal will clearly reach another peak and then cross the zero level again. It is also evident that a predetermined range including that zero cross point is a focus controllable range. Consequently, even after the focal point has reached the point M where no focus control is normally available on the data storage layer L0, the optical disc drive of this preferred embodiment can still perform the focus control on the data storage layer L0 by shifting the focal point in the opposite direction and monitoring the level of the FE signal. It should be noted that to perform the focus control operation with even more certainty, the optical disc drive stores the peak values of the FE signal and compares the peak value obtained by shifting the focal point in the opposite direction with an associated one of the stored peak values of the FE signal, thereby determining whether or not the focal point has been shifted back to the focus controllable range.

Hereinafter, it will be described with reference to FIG. 55 exactly how the optical disc drive 750 of this preferred embodiment performs the focus jump operation of shifting the focal point deeper into the optical disc 602.

Figure 55:
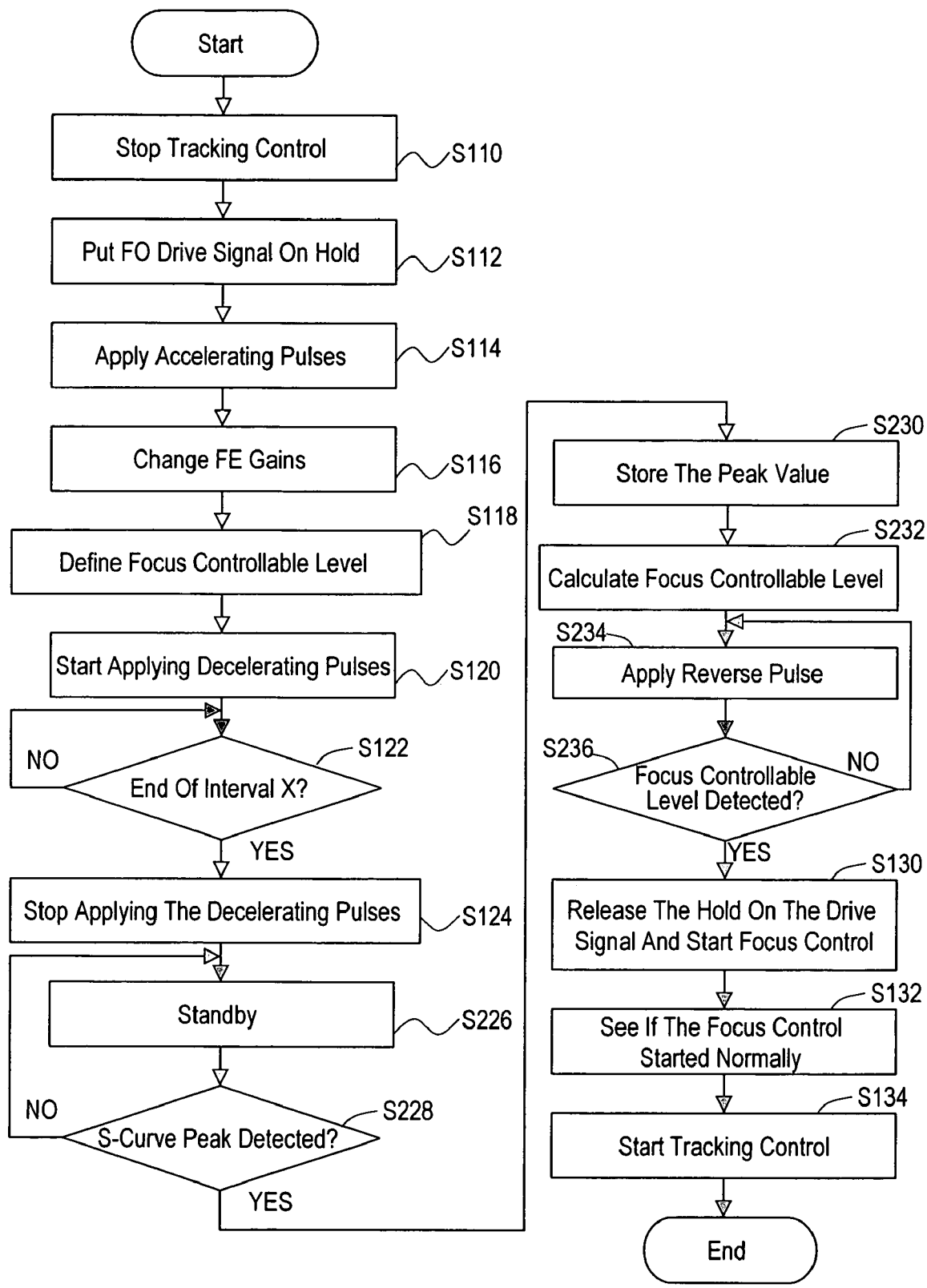
FIG. 55 is a flowchart showing the flow of another data storage layer distinguishing process according to the twelfth preferred embodiment.

First, the microcomputer of the optical disc drive 750 stops performing its tracking control operation in Step S110 shown in FIG. 55 and puts a focus control drive signal on hold in Step S112. Next, in Step S114, the microcomputer generates an accelerating pulse train and applies it to the focus actuator by way of the driver circuit. Subsequently, in Step S116, the microcomputer changes the gain setting of the gain controller 164 to a value that is associated with the target data storage layer L2. Then, in Step S118, the microcomputer defines a focus controllable level for the target data storage layer L2. In this manner, the S-signal and focus controllable level of the target data storage layer L2 can be detected accurately. It should be noted that the gain setting and focus controllable level are pre-defined for each data storage layer and stored on a nonvolatile memory (not shown), for example.

Next, in Step S120, the microcomputer generates a decelerating pulse train and applies it to the focus actuator by way of the driver circuit. Then, in Step S122, the microcomputer determines whether or not the interval X has ended, i.e., whether or not the focal point has reached the point M, by monitoring the level of the FE signal of which the waveform is already known to the microcomputer. More specifically, the microcomputer recognizes the first zero cross point of the FE signal changing from negative into positive as the point C and then recognizes the second zero cross point of the FE signal changing from negative into positive again as the point G. As a result, the microcomputer can also recognize a position corresponding to a local minimum value as the point J after that. Alternatively, the microcomputer may also sense the end of the interval X by any other signal such as the envelope of an AS or RF signal.

On deciding that the focal point has reached the point M, the microcomputer stops applying the decelerating pulse train in Step S124.

On finishing applying the decelerating pulses in Step S124, the microcomputer enters a standby state in Step S226 to start to apply both accelerating and decelerating pulse trains and will maintain its state for a certain period of time to detect the FE signal. This standby state lasts until the amplitude of the FE signal reaches the S-curve peak at the point P shown in FIG. 54. If the microcomputer has detected the S-curve peak in the FE signal in Step S228, then the microcomputer stores the peak value in Step S230, and then calculates the focus controllable level of the target data storage layer L0 in Step S232. Thereafter, in Step S234, the microcomputer applies a reverse pulse to the driver circuit such that the focal point is shifted back toward the data storage layer L0 until the focus controllable level is detected. It should be noted that once the microcomputer has sensed the level of the FE signal reach one of the stored peak values, the microcomputer regards the FE signal as having a focus controllable level in Step S236. Thereafter, the microcomputer performs Steps S130, S132 and S134. In that next step S130, the microcomputer stops applying the accelerating and decelerating pulse train, releases the hold on the focus control drive signal, and starts the focus control operation. As a result, the focus control operation can be performed with good stability. Next, in Step S132, the microcomputer sees, by the level of the TE or RF signal, for example, if the focus control operation has been started normally. Then, in Step S134, the microcomputer starts the tracking control operation. Thereafter, the microcomputer reads data by searching for a predetermined track or sector address.

It should be noted that the focus jump operation to be performed by bringing the convergent lens toward the optical disc 602 includes not only the focus jump from the data storage layer L2 to the data storage layer L0 but also a focus jump from the data storage layer L2 to the data storage layer L1 and a focus jump from the data storage layer L1 to the data storage layer L0. Each of the latter two focus jump operations may be carried out just as described above.

As described above, the optical disc drive 750 of this preferred embodiment can correct the FE signal based on the data obtained while distinguishing the data storage layer, and therefore, can perform the focus jump operation appropriately after that.

It should be noted that the optical disc recognition controller and the data storage layer distinguishing controller of the first through twelfth preferred embodiments of the present invention described above may be implemented by making a processor (not shown) read and execute a program stored on a computer-readable storage medium (not shown) such as a ROM or a RAM. That is to say, the optical disc recognition controller and data storage layer distinguishing controller are implementable as software or firmware programs. Alternatively, the optical disc recognition controller and data storage layer distinguishing controller may be naturally implemented as hardware components either partially or entirely.

Various preferred embodiments of the present invention described above provide an optical disc drive that can minimize the collision between some focusing means such as an objective lens and an optical disc.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2003-082401 filed Mar. 25, 2003 and No. 2004-072514 filed Mar. 15, 2004, the entire contents of which are hereby incorporated by reference.

What is claimed is:

1. An optical disc drive for accessing at least three types of optical discs, which are associated with multiple different numerical apertures and multiple different wavelengths, the optical disc drive comprising:

light source means for selectively emitting one of a plurality of light beams with multiple different wavelengths; and focusing means for focusing a light beam on a data storage layer of a given optical disc at a changeable numerical aperture;

detecting means for detecting light that has been reflected from the given optical disc, on which the light beam was focused by the focusing means;

setting means for setting the numerical aperture of the focusing means equal to a first one of the multiple different numerical apertures, and for setting the wavelength of the light beam equal to a first one of the multiple different wavelengths, the first numerical aperture being smaller than any of the other numerical apertures, the first wavelength being longer than any of the other wavelengths; and recognizing means for recognizing the type of the given optical disc by a signal representing a reflected and detected portion of the light from the optical disc on which the light beam of the first wavelength was focused at the first numerical aperture that had been selected by the setting means, wherein the at least three types of optical discs include light beam passage layers with multiple different thicknesses to pass the light beam, and wherein the optical disc drive further comprises:

spherical aberration correcting means for correcting a spherical aberration produced on the spot of the light beam that has been focused on the data storage layer of the given optical disc; and spherical aberration regulating means for setting the magnitude of correction to be made by the spherical aberration correcting means equal to a fixed predetermined value when the setting means sets the numerical aperture of the focusing means equal to the first numerical aperture.

2. The optical disc drive of claim 1, wherein the multiple different thicknesses include at least one of the ranges of: 1.2+0.3 mm to 1.2−0.1 mm; 0.6+0.53 mm to 0.6−0.5 mm; 100+5 µm to 100−5 µm; and 75+5 µm to 75−5 µm.

3. An optical disc drive for accessing at least three types of data storage layers, which are associated with multiple different numerical apertures and multiple different wavelengths, the optical disc drive comprising:

focusing means for focusing a light beam on a data storage layer of a given optical disc at a changeable numerical aperture;

detecting means for detecting light that has been reflected from the given data storage layer, on which the light beam was focused by the focusing means;

setting means for setting the numerical aperture of the focusing means equal to a first one of the multiple different numerical apertures, and for setting the wavelength of the light beam equal to a first one of the multiple different wavelengths, the first numerical aperture being smaller than any of the other numerical apertures, the first wavelength being longer than any of the other wavelengths; and distinguishing means for distinguishing the data storage layer of the given optical disc by a signal representing a reflected and detected portion of the light from the optical disc on which the light beam of the first wavelength was focused at the first numerical aperture that had been selected by the setting means, wherein the at least three types of data storage layers are located at mutually different depths as measured from a principal surface of the given optical disc, and wherein the optical disc drive further comprises:

vertical position changing means for moving the focusing means perpendicularly to the data storage layers; and shifting means for getting the light beam focused on the deepest one of the data storage layers first, the second deepest one next, and so forth toward the surface of the given optical disc, by driving the vertical position changing means while the distinguishing means is distinguishing the given data storage layer.

4. The optical disc drive of claim 3, further comprising:

focusing state detecting means for generating a signal representing a focusing state of the light beam on the given data storage layers; and focus control means for getting the light beam focused on one of the at least three types of data storage layers by driving the vertical position changing means in response to the signal generated by the focusing state detecting means, wherein in accordance with a result obtained by the distinguishing means, the focus control means gets the light beam focused on the one of the at least three types of data storage layers earlier than any of the other data storage layers.

5. The optical disc drive of claim 4, further comprising:

spherical aberration correcting means for correcting a spherical aberration differently according to the given data storage layer; and spherical aberration regulating means for adjusting the magnitude of correction to be made by the spherical aberration correcting means according to the one of the at least three types of data storage layers when the focus control means gets the light beam focused on the data storage layer.

6. The optical disc drive of claim 3, further comprising:

focusing state detecting means for generating a signal representing a focusing state of the light beam on the given data storage layer of the optical disc;

focus control means for getting the light beam focused on the one of the at least three types of the data storage layers by driving the vertical position changing means in response to the signal generated by the focusing state detecting means; and storage means for bringing the focusing means closer to, or away from, the optical disc with the numerical apertures of the focusing means switched sequentially and for storing the signal of the focusing state detecting means to be output as the focusing states are changed, wherein in accordance with the output signal of the focusing state detecting means as stored in the storage means, the focus control means corrects the amplitude and/or balance of the output signal of the focusing state detecting means in getting the light beam focused.

7. The optical disc drive of claim 3, further comprising:

focusing state detecting means for generating a signal representing a focusing state of the light beam on the given data storage layer of the optical disc;

focus control means for getting the light beam focused on the one of the at least three types of the data storage layers by driving the vertical position changing means in response to the signal generated by the focusing state detecting means;

storage means for bringing the focusing means closer to, or away from, the optical disc with the numerical apertures of the focusing means switched sequentially and for storing the signal of the focusing state detecting means to be output as the focusing states are changed; and interlayer jump means for shifting the focal point of the light beam from any of the data storage layers of the optical disc to another in accordance with the output signal of the focusing state detecting means, wherein in accordance with the output signal of the focusing state detecting means as stored in the storage means, the interlayer jump means corrects the amplitude and/or balance of the output signal of the focusing state detecting means in shifting the focal point from one layer to another.

8. An optical disc drive for accessing at least two types of optical discs, which are associated with multiple different numerical apertures, the optical disc drive comprising:

focusing means for focusing a light beam on a data storage layer of a given optical disc at a changeable numerical aperture;

detecting means for detecting light that has been reflected from the given optical disc, on which the light beam was focused by the focusing means;

setting means for setting the numerical aperture of the focusing means equal to a first one of the multiple different numerical apertures, the first numerical aperture being smaller than any of the other numerical apertures;

recognizing means for recognizing the type of the given optical disc by a signal representing a reflected and detected portion of the light from the optical disc on which the light beam was focused at the first numerical aperture that had been selected by the setting means light source means for selectively emitting one of a plurality of light beams with multiple different wavelengths corresponding to the multiple different numerical apertures;

wavelength selecting means for setting the wavelength of the light beam emitted from the light source means equal to a first one of the multiple different wavelengths when the setting means sets the numerical aperture of the focusing means equal to the first numerical aperture, the first wavelength being longer than any of the other wavelengths, wherein the focusing means focuses the light beam that has been emitted from the light source means; and wherein the at least two types of optical discs include light beam passage layers with multiple different thicknesses to pass the light beam, and wherein the optical disc drive further comprises:

spherical aberration correcting means for correcting a spherical aberration produced on the spot of the light beam that has been focused on the data storage layer of the given optical disc; and spherical aberration regulating means for setting the magnitude of correction to be made by the spherical aberration correcting means equal to a first correction value when the setting means sets the numerical aperture of the focusing means equal to the first numerical aperture, the first correction value being associated with the largest one of the multiple different thicknesses.

9. The optical disc drive of claim 8, wherein the setting means selects one of the multiple different numerical apertures after another in an ascending order by beginning with the smallest, first numerical aperture, and
   wherein the setting means or the wavelength selecting means selects one of the multiple different wavelengths after another in a descending order by beginning with the longest, first wavelength, and
   wherein the spherical aberration regulating means selects one of multiple correction values, associated with the multiple different thicknesses, after another in a descending order by beginning with the largest, first correction value, and
   wherein the recognizing means determines, by the signal representing the reflected and detected portion of the light from the optical disc on which the light beam was focused at the selected numerical aperture, wavelength and correction value, whether the given optical disc is a type associated with the numerical aperture, wavelength and correction value currently selected.

10. The optical disc drive of claim 8, wherein the multiple different thicknesses include at least one of the ranges of: 1.2+0.3 mm to 1.2−0.1 mm; 0.6+0.53 mm to 0.6−0.5 mm; 100+5 μm to 100−5 μm; and 75+5 μm to 75−5 μm.

11. An optical disc drive for accessing at least two types of data storage layers, which are associated with multiple different numerical apertures, the optical disc drive comprising:
   focusing means for focusing a light beam on a data storage layer of a given optical disc at a changeable numerical aperture;
   detecting means for detecting light that has been reflected from the given data storage layer, on which the light beam was focused by the focusing means;
   setting means for setting the numerical aperture of the focusing means equal to a first one of the multiple different numerical apertures, the first numerical aperture being smaller than any of the other numerical apertures; and
   distinguishing means for distinguishing the data storage layer of the given optical disc by a signal representing a reflected and detected portion of the light from the optical disc on which the light beam was focused at the first numerical aperture that had been selected by the setting means;
   wherein the at least two types of data storage layers are located at mutually different depths as measured from a principal surface of the given optical disc, and
   wherein the optical disc drive further comprises:
   vertical position changing means for moving the focusing means perpendicularly to the data storage layers; and
   shifting means for getting the light beam focused on the deepest one of the data storage layers first, the second deepest one next, and so forth toward the surface of the given optical disc, by driving the vertical position changing means while the distinguishing means is distinguishing the given data storage layer.

12. The optical disc drive of claim 11, further comprising:
   focusing state detecting means for generating a signal representing a focusing state of the light beam on the given data storage layer; and
   focus control means for getting the light beam focused on a desired one of the data storage layers by driving the vertical position changing means in response to the signal generated by the focusing state detecting means,
   wherein in accordance with a result obtained by the distinguishing means, the focus control means gets the light beam focused on the desired data storage layer earlier than any of the other data storage layers.

13. The optical disc drive of claim 12, further comprising:
   spherical aberration correcting means for correcting a spherical aberration differently according to the given data storage layer; and
   spherical aberration regulating means for adjusting the magnitude of correction to be made by the spherical aberration correcting means according to the desired data storage layer when the focus control means gets the light beam focused on the desired data storage layer.

14. The optical disc drive of claim 11, further comprising:
   focusing state detecting means for generating a signal representing a focusing state of the light beam on the given data storage layer of the optical disc;
   focus control means for getting the light beam focused on a desired one of the data storage layers by driving the vertical position changing means in response to the signal generated by the focusing state detecting means; and
   storage means for bringing the focusing means closer to, or away from, the optical disc with the numerical apertures of the focusing means switched sequentially and for storing the signal of the focusing state detecting means to be output as the focusing states are changed,
   wherein in accordance with the output signal of the focusing state detecting means as stored in the storage means, the focus control means corrects the amplitude and/or balance of the output signal of the focusing state detecting means in getting the light beam focused.

15. The optical disc drive of claim 11, further comprising:
   focusing state detecting means for generating a signal representing a focusing state of the light beam on the given data storage layer of the optical disc;
   focus control means for getting the light beam focused on a desired one of the data storage layers by driving the vertical position changing means in response to the signal generated by the focusing state detecting means;
   storage means for bringing the focusing means closer to, or away from, the optical disc with the numerical apertures of the focusing means switched sequentially and for storing the signal of the focusing state detecting means to be output as the focusing states are changed; and
   interlayer jump means for shifting the focal point of the light beam from any of the data storage layers of the optical disc to another in accordance with the output signal of the focusing state detecting means,
   wherein in accordance with the output signal of the focusing state detecting means as stored in the storage means, the interlayer jump means corrects the amplitude and/or balance of the output signal of the focusing state detecting means in shifting the focal point from one layer to another.

* * * * *